US008521893B2

(12) United States Patent
Park et al.

(10) Patent No.: US 8,521,893 B2
(45) Date of Patent: Aug. 27, 2013

(54) MULTI-RATE PROXIMITY BASED PEER DISCOVERY METHODS AND APPARATUS

(75) Inventors: Vincent D. Park, Budd Lake, NJ (US); George Tsirtsis, London (GB); Thomas Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 871 days.

(21) Appl. No.: 12/163,316

(22) Filed: Jun. 27, 2008

(65) Prior Publication Data

US 2009/0323648 A1    Dec. 31, 2009

(51) Int. Cl.
*G06F 15/16* (2006.01)
(52) U.S. Cl.
USPC ........... 709/230; 370/343; 715/733; 715/764; 455/432.3
(58) Field of Classification Search
USPC ......... 709/223, 230; 370/338, 343; 715/733, 715/764
See application file for complete search history.

(56) References Cited

U.S. PATENT DOCUMENTS

| 5,126,657 A | | 6/1992 | Nelson |
| 5,128,657 A | * | 7/1992 | Girard ............................ 340/654 |
| 6,664,978 B1 | * | 12/2003 | Kekic et al. ................... 715/733 |
| 2006/0046709 A1 | | 3/2006 | Krumm et al. |
| 2006/0245402 A1 | | 11/2006 | Fujii et al. |
| 2009/0040996 A1 | * | 2/2009 | Laroia et al. .................. 370/343 |
| 2009/0327933 A1 | * | 12/2009 | Dunn ............................. 715/764 |
| 2010/0323692 A1 | * | 12/2010 | Cortes Gomez ........... 455/432.3 |

FOREIGN PATENT DOCUMENTS

| CN | 1715951 A | 1/2006 |
| CN | 1934829 A | 3/2007 |
| EP | 1551134 A1 | 7/2005 |
| EP | 1612999 A1 | 1/2006 |
| JP | 2001156787 A | 6/2001 |
| JP | 2004200841 A | 7/2004 |
| JP | 2004252928 A | 9/2004 |
| JP | 2005537761 A | 12/2005 |
| JP | 2005537762 A | 12/2005 |
| JP | 2006010687 A | 1/2006 |
| JP | 2006217178 A | 8/2006 |
| JP | 2006246068 A | 9/2006 |
| WO | WO0192992 A2 | 12/2001 |
| WO | 2004023241 A2 | 3/2004 |
| WO | 2004023827 A1 | 3/2004 |
| WO | WO2005064863 | 7/2005 |

OTHER PUBLICATIONS

International Search Report and Written Opinion—PCT/US2009/048937, International Search Authority—European Patent Office—Oct. 27, 2009.
Taiwan Search Report—TW098121868—TIPO—Sep. 7, 2012.

* cited by examiner

*Primary Examiner* — Tammy Nguyen
(74) *Attorney, Agent, or Firm* — James K. O'Hare

(57) ABSTRACT

Various embodiments relate to wireless communications devices which support multiple modes of peer discovery operation. In some embodiments, the multiple modes of peer discovery operation include different modes which are associated with different rates of transmitting peer discovery information. In some embodiments, the multiple modes of peer discovery operation include different modes which are associated with different rates of monitoring peer discovery information. In various embodiments, a communications device determines whether or not to switch between different peer discovery modes of operation as a function of proximity to a location of interest. Proximity determinations may be, and sometimes are, based upon geographic position comparisons. Alternatively or in addition, proximity determinations may be, and sometimes are, based upon received signal strength measurements.

39 Claims, 31 Drawing Sheets

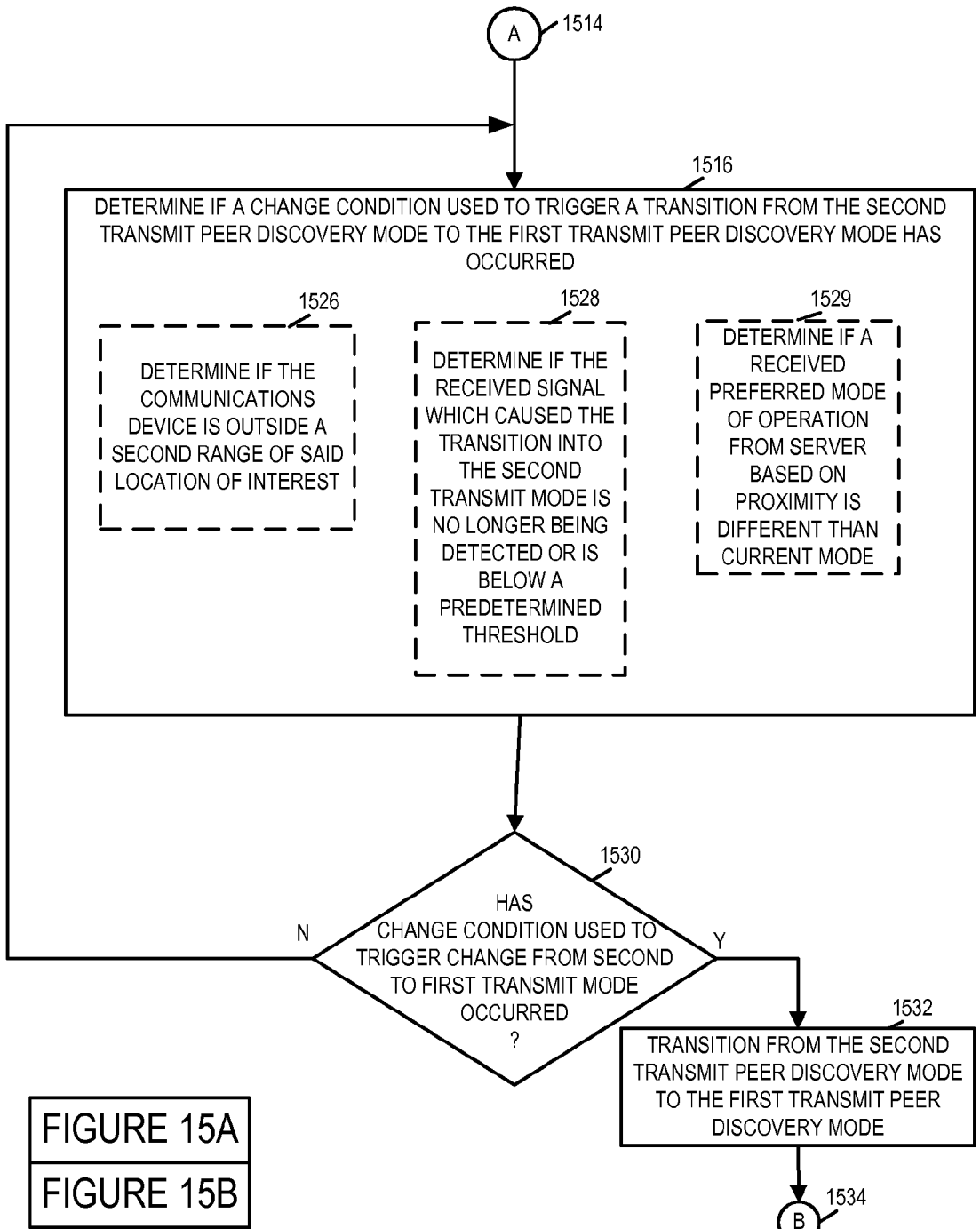

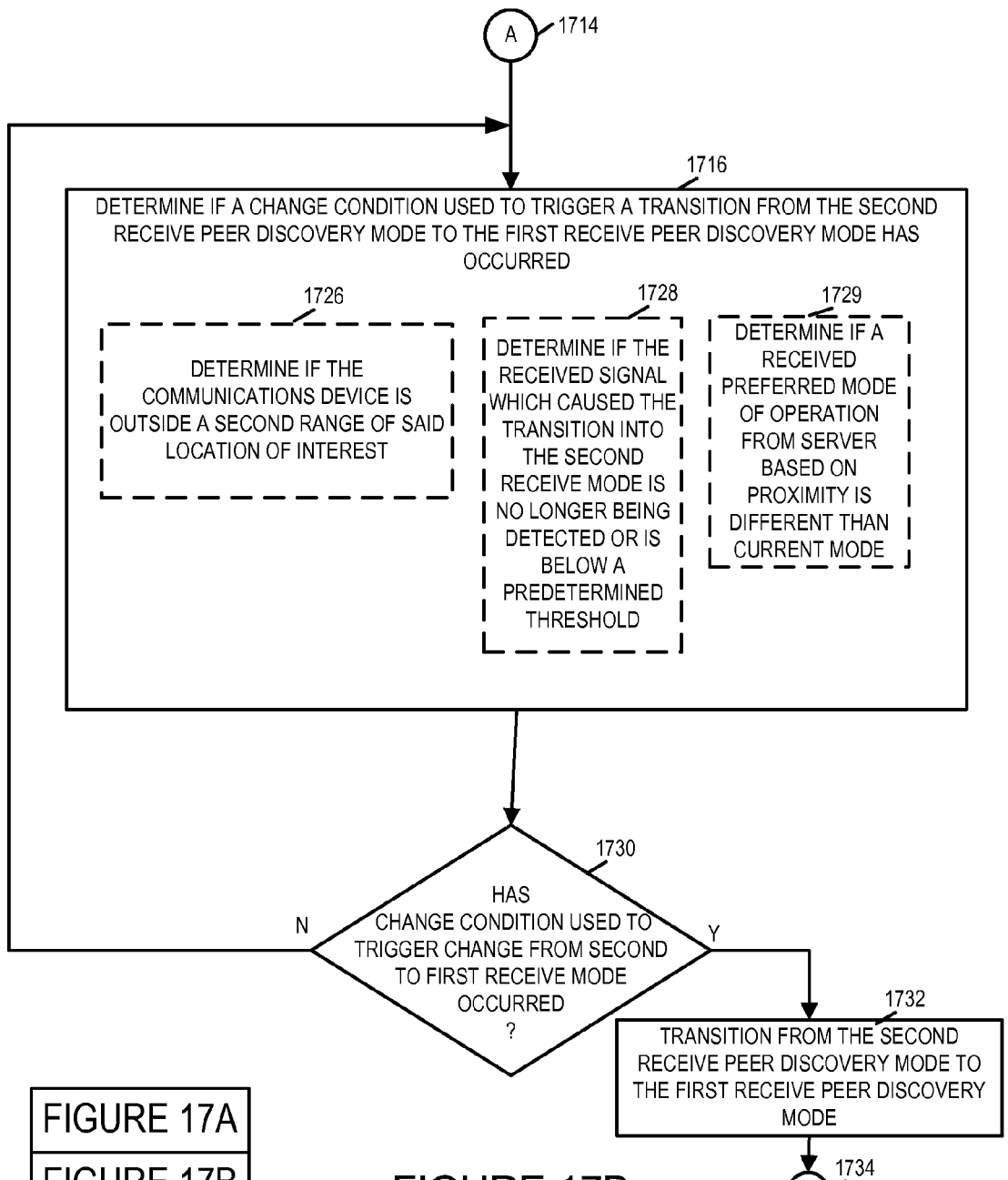

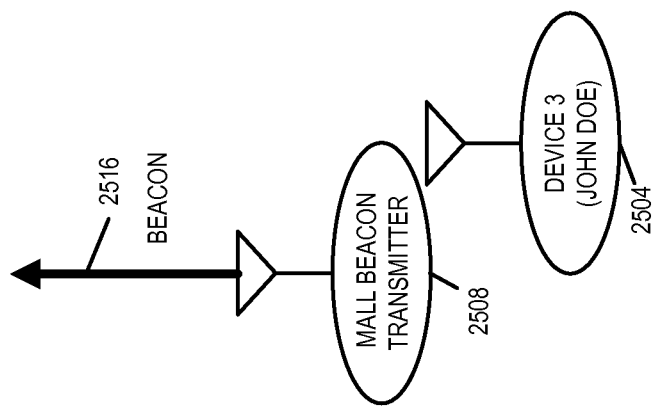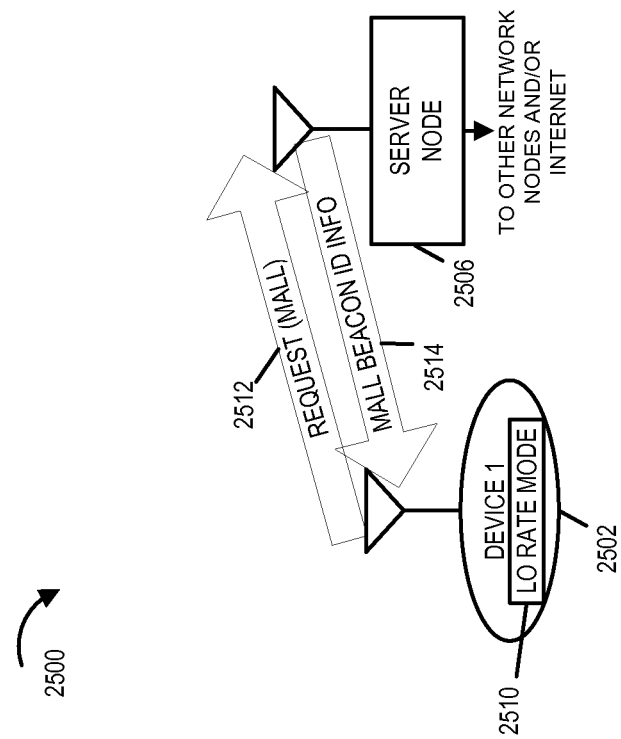
FIGURE 25

MULTI-RATE PROXIMITY BASED PEER DISCOVERY METHODS AND APPARATUS

FIELD

Various embodiments relate to wireless communications, and more particularly, to methods and apparatus related to the communication of peer discovery information.

BACKGROUND

In a wireless network, e.g., an ad hoc peer to peer wireless network, it can be beneficial for a wireless communications device, e.g., a mobile node, to support the ability to transmit, e.g., broadcast, various types of discovery information, e.g., device discovery information, network discovery information and/or service discovery information. The broadcasting of such information can be used by other peer devices currently in its local vicinity to form a situational awareness. This exchange of wireless device broadcast discovery information among peers can be particularly useful in a network lacking centralized coordination and/or control. Different wireless communications devices may have different capabilities and/or needs with regard to the transmission and/or reception of discovery information. In addition, an individual wireless communications device may, at different times, have different capabilities and/or needs with regard to the transmission and/or reception of discovery information. Broadcasting and/or receiving discovery information may be considered overhead signaling, and resources such as power and spectrum over time expended for discovery information signaling may be unavailable for traffic signaling. The power expended by a mobile wireless communications device for transmitting and/or receiving discovery information and the reserve battery power remaining are important considerations in implementing a structure supporting the communication of discovery information.

At times a wireless communications device may be isolated with respect to other devices of interest; while at other times a wireless device may be in the local proximity of other devices of interest. It is wasteful to be expending power on discovery operations if the wireless device is isolated. Based on the above discussion there is a need for methods and apparatus that support the communication of a wide range of different types of discovery information in an efficient manner. Methods and apparatus that allow for flexibility in the transmission and/or reception of discovery information would be beneficial. There is a need for methods and apparatus that take into consideration proximity information when making decisions about expending resources for discovery operations.

SUMMARY

Various embodiments relate to wireless communications devices which support multiple modes of peer discovery operation. In some embodiments, the multiple modes of peer discovery operation include different modes which are associated with different rates of transmitting peer discovery information. In some embodiments, the multiple modes of peer discovery operation include different modes which are associated with different rates of monitoring peer discovery information. In various embodiments, a communications device determines whether or not to switch between different peer discovery modes of operation as a function of proximity to a location of interest, e.g., a position of a buddy, entity, or point of interest with respect to its own current location. Proximity determinations may be, and sometimes are, based upon geographic position comparisons. Alternatively or in addition, proximity determinations may be, and sometimes are, based upon received signal strength measurements.

In some embodiments, a communications device communicates its current location to a server node, and downloads information about locations of interest from the server node. In some such embodiments, prior to downloading information about locations of interest, the communications device sends the server information used to identify the locations of interest for which it is requesting to receive position information.

In some embodiments, a server makes a proximity determination for a communications device and indicates to the communications device a preferred peer discovery mode of operation.

In some embodiments, one of the multiple rates of transmitting and/or monitoring discovery information is a zero rate. For instance, based on proximity information, a communications device may effectively start/stop transmitting and/or monitoring peer discovery information.

An exemplary method of operating a communications device which supports multiple peer discovery modes including a first transmit peer discovery mode during which peer discovery signals are transmitted at a first rate and a second transmit peer discovery mode during which peer discovery signals are transmitted at a second rate, said second rate being higher than the first rate, comprises: while operating in said first transmit peer discovery mode, determining as a function of proximity to a location of interest if a change condition used to trigger a change from the first transmit peer discovery mode to the second transmit peer discovery mode occurred. The exemplary method further comprises, upon detecting that a change condition used to trigger a change from the first transmit peer discovery mode to the second transmit peer discovery mode has occurred, transitioning from the first transmit peer discovery mode to the second transmit peer discovery mode An exemplary communications device in accordance with some embodiments supports multiple peer discovery modes including a first transmit peer discovery mode during which peer discovery signals are transmitted at a first rate and a second transmit peer discovery mode during which peer discovery signals are transmitted at a second rate, said second rate being higher than the first rate. The exemplary communications device includes: a first proximity condition detection module configured to determine if a proximity based change condition used to trigger a change from the first transmit peer discovery mode to the second transmit peer discovery mode occurred, while said device is in said first transmit peer discovery mode of operation; and a first mode transition control module for controlling said communications device to transition from the first transmit peer discovery mode to the second transmit peer discovery mode when said first proximity condition detection module detects that said proximity based change condition has occurred.

An exemplary method of operating a communications device which supports multiple peer discovery modes including a first receive peer discovery mode during which peer discovery signals are monitored at a first rate and a second receive peer discovery mode during which peer discovery signals are monitored at a second rate, said second rate being higher than the first rate, comprises: while operating in said first receive peer discovery mode, determining as a function of proximity to a location of interest if a change condition used to trigger a change from the first receive peer discovery mode to the second receive peer discovery mode occurred.

The exemplary method further comprises: upon detecting that said change condition used to trigger a change from the first receive peer discovery mode to the second receive peer discovery mode has occurred, transitioning from the first receive peer discovery mode to the second receive peer discovery mode.

An exemplary communications device in accordance with some embodiments supports multiple peer discovery modes including a first receive peer discovery mode during which peer discovery signals are monitored at a first rate and a second receive peer discovery mode during which peer discovery signals are monitored at a second rate, said second rate being higher than the first rate. The exemplary communications device includes: a first proximity condition detection module configured to determine if a proximity based change condition used to trigger a change from the first mode to the second mode occurred, while said device is in said first receive peer discovery mode of operation; and a first mode transition control module for controlling said communications device to transition from the first mode to the second mode when said first proximity condition detection module detects that said proximity based change condition has occurred.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIGS. 25-27 are used to describe features in one exemplary embodiment where a wireless communications device supporting multiple peer discovery modes determines mode transition decisions as a function of proximity based on received signal strength measurements.

DETAILED DESCRIPTION

Figure 1:
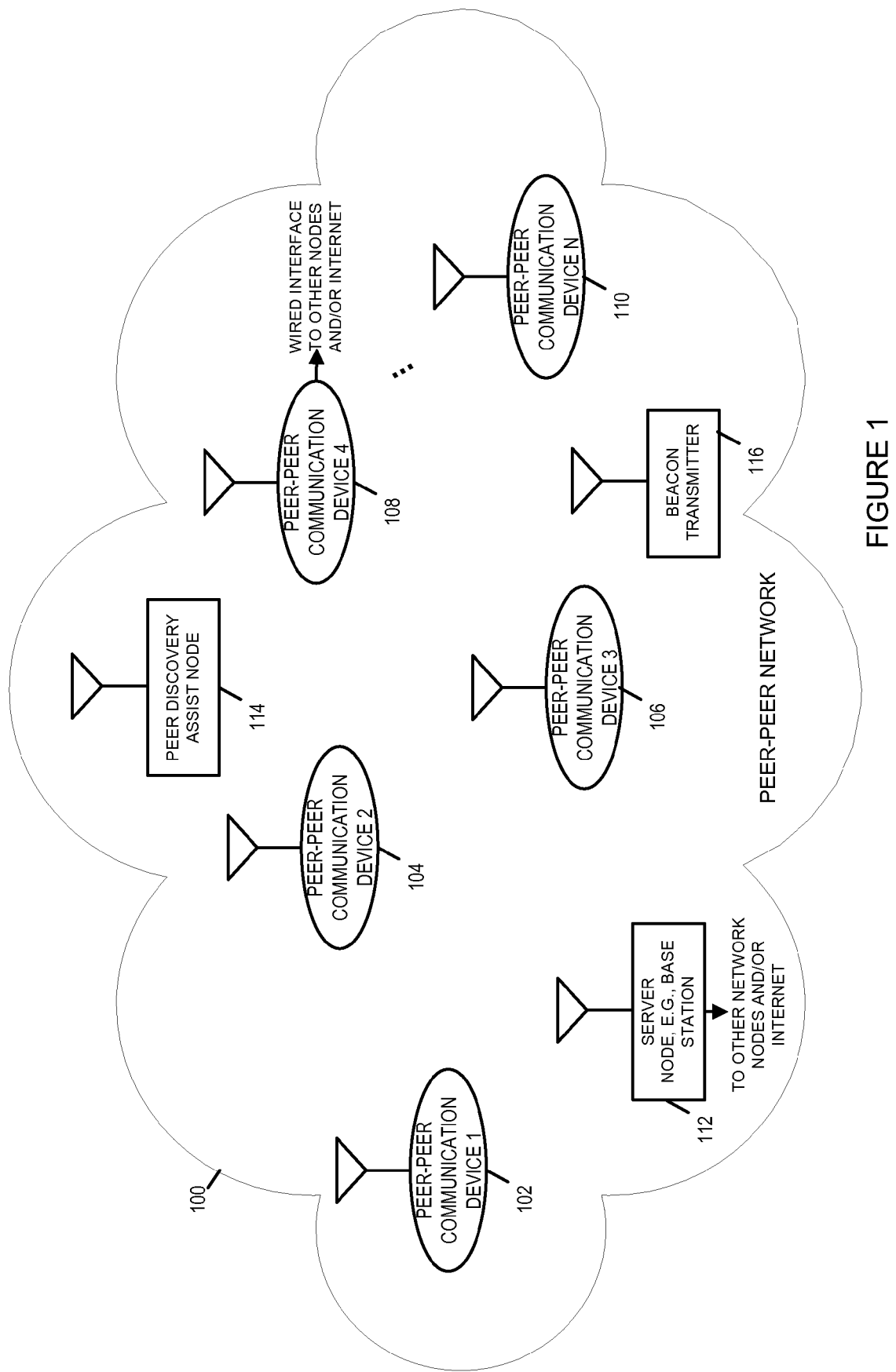
FIG. 1 is a drawing of an exemplary peer to peer network in accordance with an exemplary embodiment.

FIG. 1 is a drawing of an exemplary peer to peer network 100 in accordance with an exemplary embodiment. Peer to peer network 100 includes a plurality of wireless peer to peer communications devices (peer to peer communications device 1 102, peer to peer communications device 2 104, peer to peer communications device 3 106, peer to peer communications device 4 108, . . . , peer to peer communications device N 110). Some of the peer to peer communications devices, e.g., peer to peer communications device 4 108, also include a wired interface which couples the device to other nodes and/or the Internet. The peer to peer communications devices (102, 104, 106, 108, 110) store information defining a peer discovery transmission structure including transmission units to be used for low rate discovery transmissions and additional transmission units to be used for high rate discovery transmissions.

Peer to peer network 100 also includes a peer discovery assist node 114, a server node 112, e.g., a base station, and a beacon transmitter 116. Peer discovery assist node 114 can, and sometimes does, receives portions of one or more sets of peer discovery information from one or more peer to peer communications devices at a first rate and transmits the information over an airlink at a second rate which is faster than the first rate. Similarly, server node 112 can, and sometimes does, receives portions of one or more sets of peer discovery information from a peer to peer communications device at a first rate and transmits the information over an airlink at a second rate which is faster than the first rate. Server node 112 includes both a wireless interface and a wired interface. The wired interface of the server 112 couples the server to other network nodes and/or the Internet. Beacon transmitter 116 transmits a beacon signal, e.g., an OFDM beacon signal having a high power concentration on one or a few tones, which is easily detectable and intended to be utilized by the peer to peer devices in its vicinity to establish a timing reference with respect to the peer to peer timing structure being utilized in the region.

Figure 2:
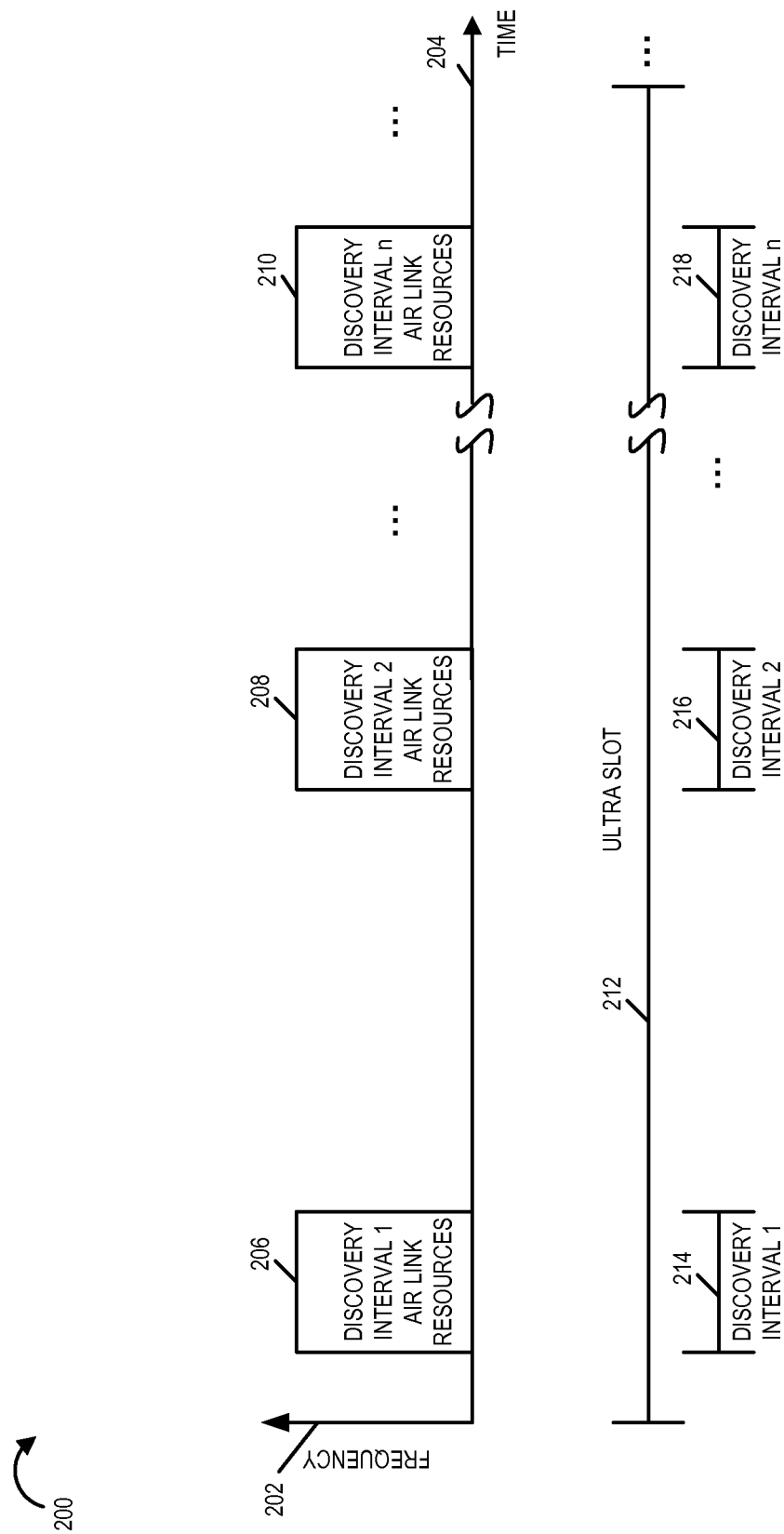
FIG. 2 illustrates discovery intervals and corresponding discovery interval air link resources within a recurring peer to peer timing structure in accordance with an exemplary embodiment.

FIG. 2 includes a drawing 200 illustrating discovery intervals (discovery interval 1 214, discovery interval 2 216, . . . , discovery interval n 218) within a recurring peer to peer timing structure including an ultra slot 212. In the recurring peer to peer timing structure the ultra slot repeats. Vertical axis 202 represents frequency, e.g., OFDM tones, while horizontal axis 204 represents time. Corresponding to each of discovery intervals (discovery interval 1 214, discovery interval 2 216, . . . , discovery interval n 218) there is a corresponding block of discovery interval air link resources (discovery interval 1 air link resources 206, discovery interval 2 air link resources 208, . . . , discovery interval n air link resources 210). Each block of discovery interval air link resources, e.g., discovery interval 1 air link resources 206, is, e.g., a block of OFDM tone-symbols, where each OFDM tone-symbol represents one OFDM tone for the duration of one OFDM symbol transmission time interval.

Figure 3:
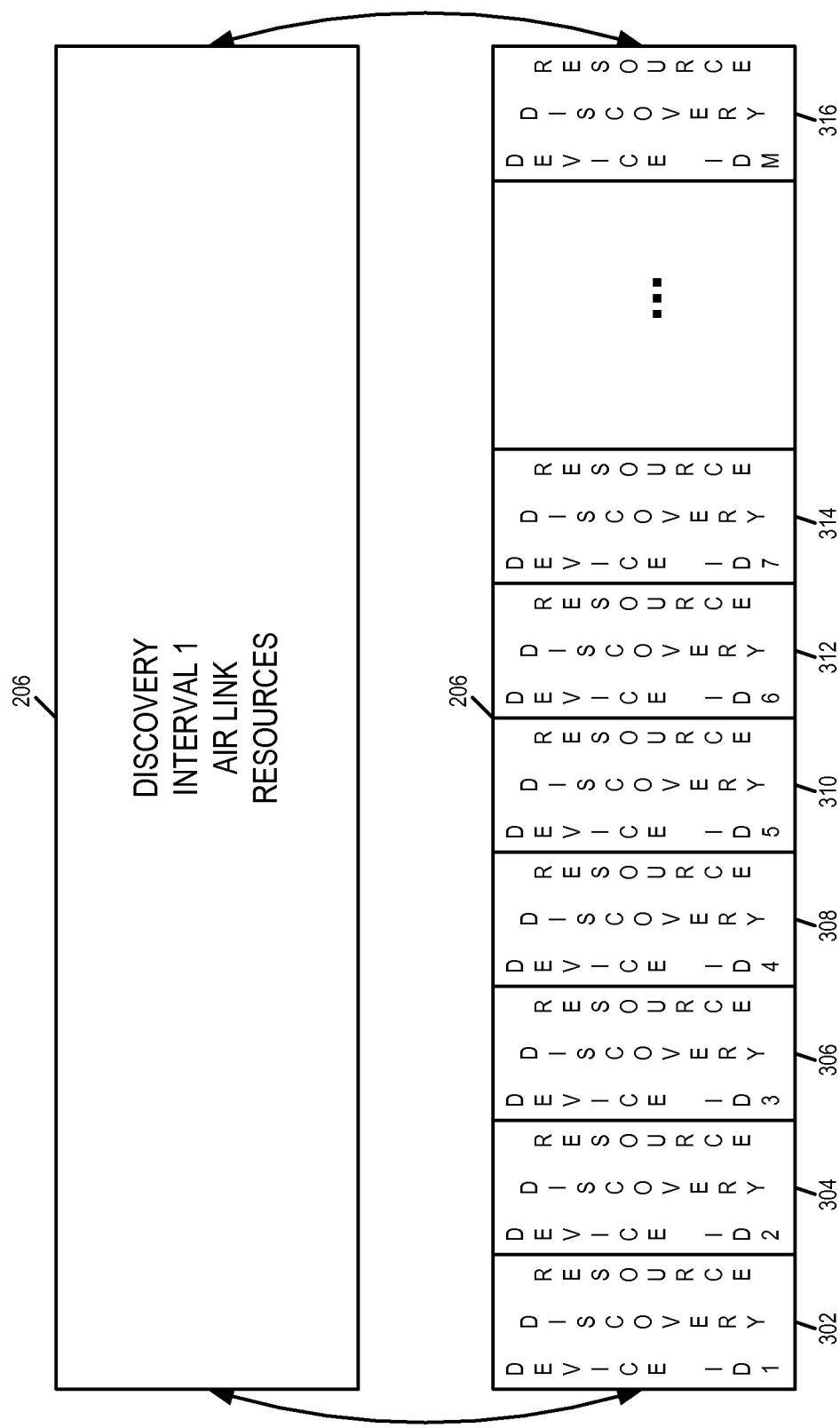
FIG. 3 illustrates a more detailed representation of a first exemplary discovery interval's air link resources.

FIG. 3 shows a more detailed representation of discovery interval 1 air link resources 206 in accordance with one exemplary embodiment. Discovery interval 1 air link resources 206 include a plurality of discovery air link resources corresponding to different device identifiers. Discovery interval 1 air link resources includes device ID 1 discovery resource 302, followed by device ID 2 discovery resource 304, followed by device ID 3 discovery resource 306, followed by device ID 4 discovery resource 308, followed by device ID 5 discovery resource 310, followed by device ID 6 discovery resource 312, followed by device ID 7 discovery resource 314, . . . , and device ID M discovery resource 316.

Figure 4:
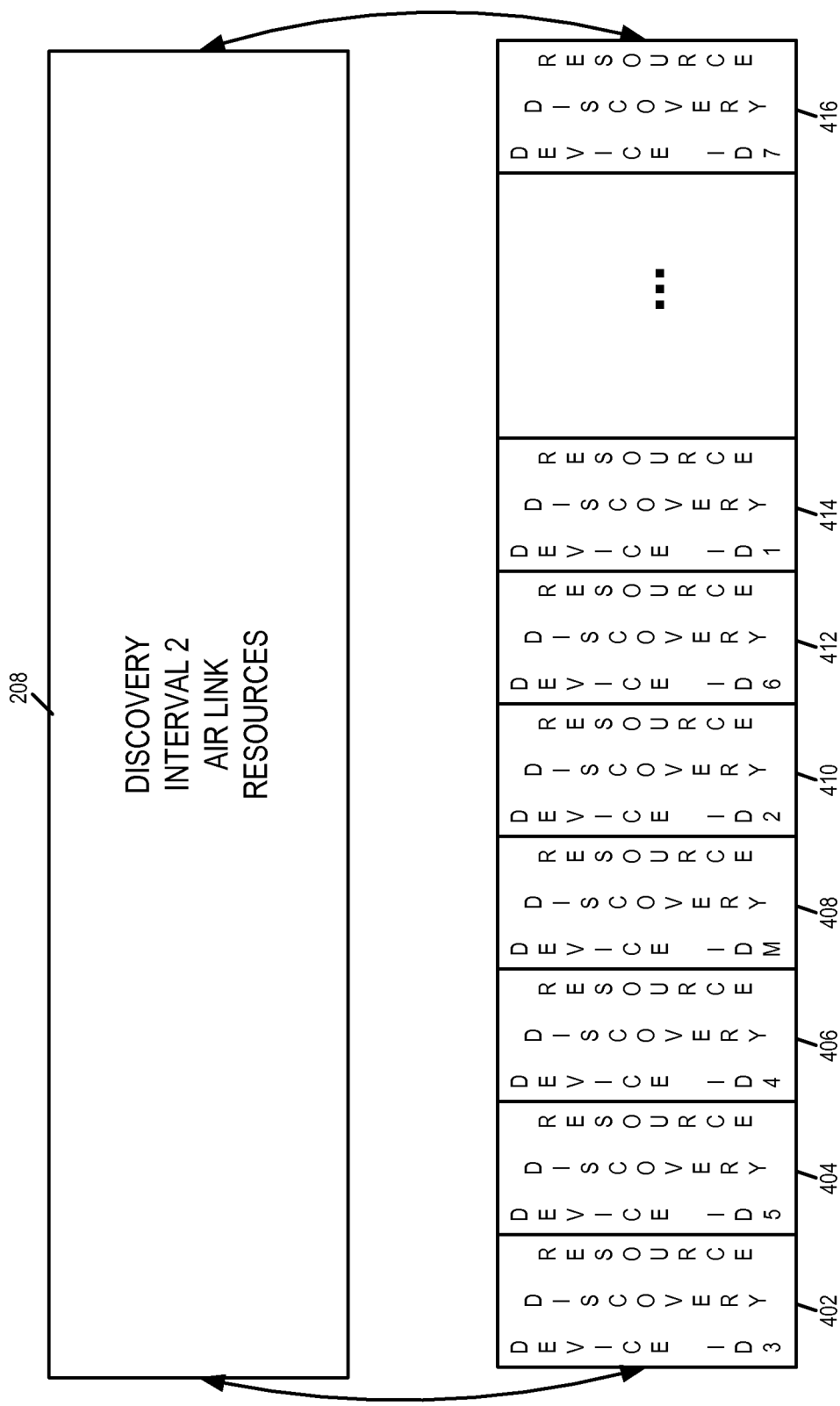
FIG. 4 illustrates a more detailed representation of a second exemplary discovery interval's air link resources.

FIG. 4 shows a more detailed representation of discovery interval 2 air link resources 208 in accordance with one exemplary embodiment. Discovery interval 2 air link resources 208 include a plurality of discovery air link resources corresponding to different device identifiers. Discovery interval 2 air link resources 208 includes device ID 3 discovery resource 402, followed by device ID 5 discovery resource 404, followed by device ID 4 discovery resource 406, followed by device ID M discovery resource 408, followed by device ID 2 discovery resource 410, followed by device ID 6 discovery resource 412, followed by device ID 1 discovery resource 414, . . . , and device ID 7 discovery resource 416. It may be observed that the order of the discovery resources associated with different device identifiers has changed from discovery interval 1 206 to discovery interval 2 208 in this exemplary embodiment. The ordered change in accordance with a predetermined hopping sequence employed in the peer to peer timing/frequency structure being utilized. In some other embodiments, the relative position of air link resources associated with a particular device identifier does not change from one interval to the next.

Figure 5:
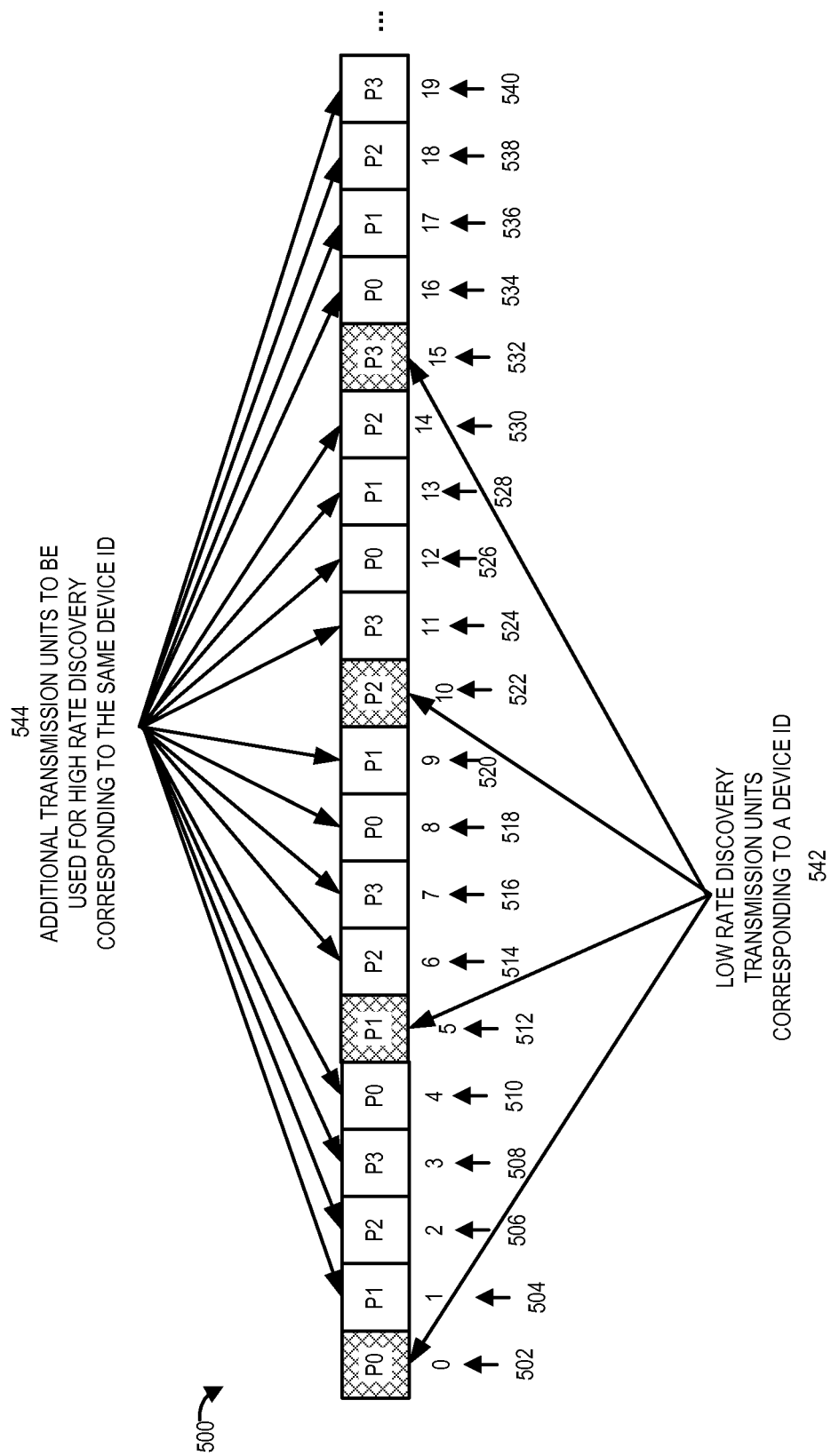
FIG. 5 illustrates a plurality of ordered transmission units available for transmitting discovery information corresponding to a device identifier which are part of a peer discovery transmission structure.

FIG. 5 is a drawing 500 illustrating a plurality of ordered transmission units available for transmitting discovery information which are part of a peer discovery transmission structure. The plurality of illustrated ordered transmission units include transmission unit 0 502, transmission unit 1 504, transmission unit 2 506, transmission unit 3 508, transmission unit 4 510, transmission unit 5 512, transmission unit 6 514, transmission unit 7 516, transmission unit 8 518, transmission unit 9 520, transmission unit 10 522, transmission unit 11 524, transmission unit 12 526, transmission unit 13 528, transmission unit 14 530, transmission unit 15 532, transmission unit 16 534, transmission unit 17 536, transmission unit 18 538 and transmission unit 19 540, which are part of a peer discovery transmission structure, and which are associated with a particular device identifier. For example, consider that the transmission units in drawing 500 of FIG. 5 belong to device ID 2. Continuing with the example, transmission unit 0 502 may be device ID 2 discovery resource 304 of discovery interval 1 air link resources 206 and transmission unit 1 504 may be device ID 2 discovery resource 410 of discovery interval 2 of air link resources 208, as illustrated in FIGS. 2, 3 and 4.

The plurality of ordered transmission units available for transmitting peer discovery information includes low rate discovery transmission units corresponding to a device identifier as indicated by grouping 542 and additional transmission units to be used for high rate discovery corresponding to the same device identifier as indicated by grouping 544. In this example, the set of low rate discovery transmission units corresponding to the device identifier 542 are illustrated with crosshatch shading and include transmission units 502, 512, 522 and 532. The set of additional transmission units to be used for high rate discovery corresponding to the device identifier are illustrated without shading and include transmission units 504, 506, 508, 510, 514, 516, 518, 520, 524, 526, 528, 530, 534, 536, 538 and 540.

Figure 6:
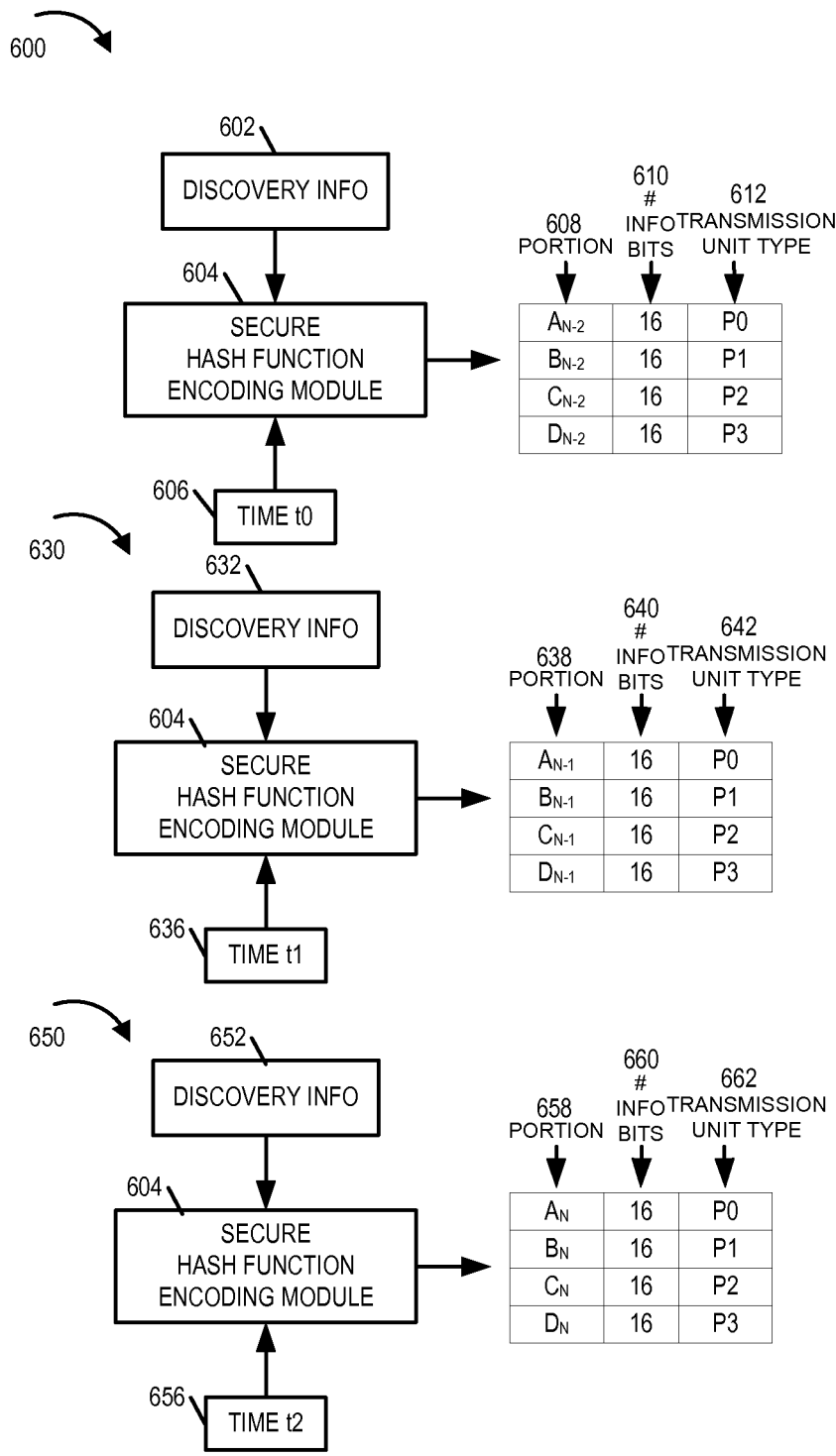
FIG. 6 illustrates a securing hash function encoding module processing input discovery information to generate encoded information.

FIG. 6 illustrates a securing hash function encoding module 604 processing input discovery information which generates encoded information. The output encoded information is mapped to portions, each portion being communicated via a transmission unit.

Drawing 600 illustrates that the secure hash function encoding module 604 receives discovery information 602 and time value t0 606 and generates a set of output information including a plurality of portions ($A_{N-2}$, $B_{N-2}$, $C_{N-2}$, $D_{N-2}$) as indicated by column 608. In this example, each portion corresponds to 16 information bits as indicated by column 610. Column 612 indicates that there is a correspondence between different encoded output portions and transmission unit types. More particularly, portion $A_{N-2}$ is to be communicated using a P0 transmission unit type in the recurring timing structure; portion $B_{N-2}$ is to be communicated using a P1 transmission unit type in the recurring timing structure; portion $C_{N-2}$, is to be communicated using a P2 transmission unit type in the recurring timing structure; and portion $D_{N-2}$, is to be communicated using a P3 transmission unit type in the recurring timing structure.

Drawing 630 illustrates that the secure hash function encoding module 604 receives discovery information 632 and time value t1 636 and generates a set of output information including a plurality of portions ($A_{N-1}$, $B_{N-1}$, $C_{N-1}$, $D_{N-1}$) as indicated by column 638. In this example, each portion corresponds to 16 information bits as indicated by column 640. Column 642 indicates that there is a correspondence between different encoded output portions and transmission unit types. More particularly, portion $A_{N-1}$ is to be communicated using a P0 transmission unit type in the recurring timing structure; portion $B_{N-1}$ is to be communicated using a P1 transmission unit type in the recurring timing structure; portion $C_{N-1}$, is to be communicated using a P2 transmission unit type in the recurring timing structure; and portion $D_{N-1}$, is to be communicated using a P3 transmission unit type in the recurring timing structure.

Drawing 650 illustrates that the secure hash function encoding module 604 receives discovery information 652 and time value t2 656 and generates a set of output information including a plurality of portions ($A_N$, $B_N$, $C_N$, $D_N$) as indicated by column 658. In this example, each portion corresponds to 16 information bits as indicated by column 660. Column 662 indicates that there is a correspondence between different encoded output portions and transmission unit types. More particularly, portion $A_N$ is to be communicated using a P0 transmission unit type in the recurring timing structure; portion $B_N$ is to be communicated using a P1 transmission unit type in the recurring timing structure; portion $C_N$, is to be communicated using a P2 transmission unit type in the recurring timing structure; and portion $D_N$ is to be communicated using a P3 transmission unit type in the recurring timing structure.

Input discovery information 602 may be the same or different from input discovery information 632. Similarly, input discovery information 632 may be the same or different from input discovery information 652. In each case, the secure hashing function encoding module 604 may, and in some instances does, include additional inputs, e.g., a key, as needed for operation.

Figure 7:
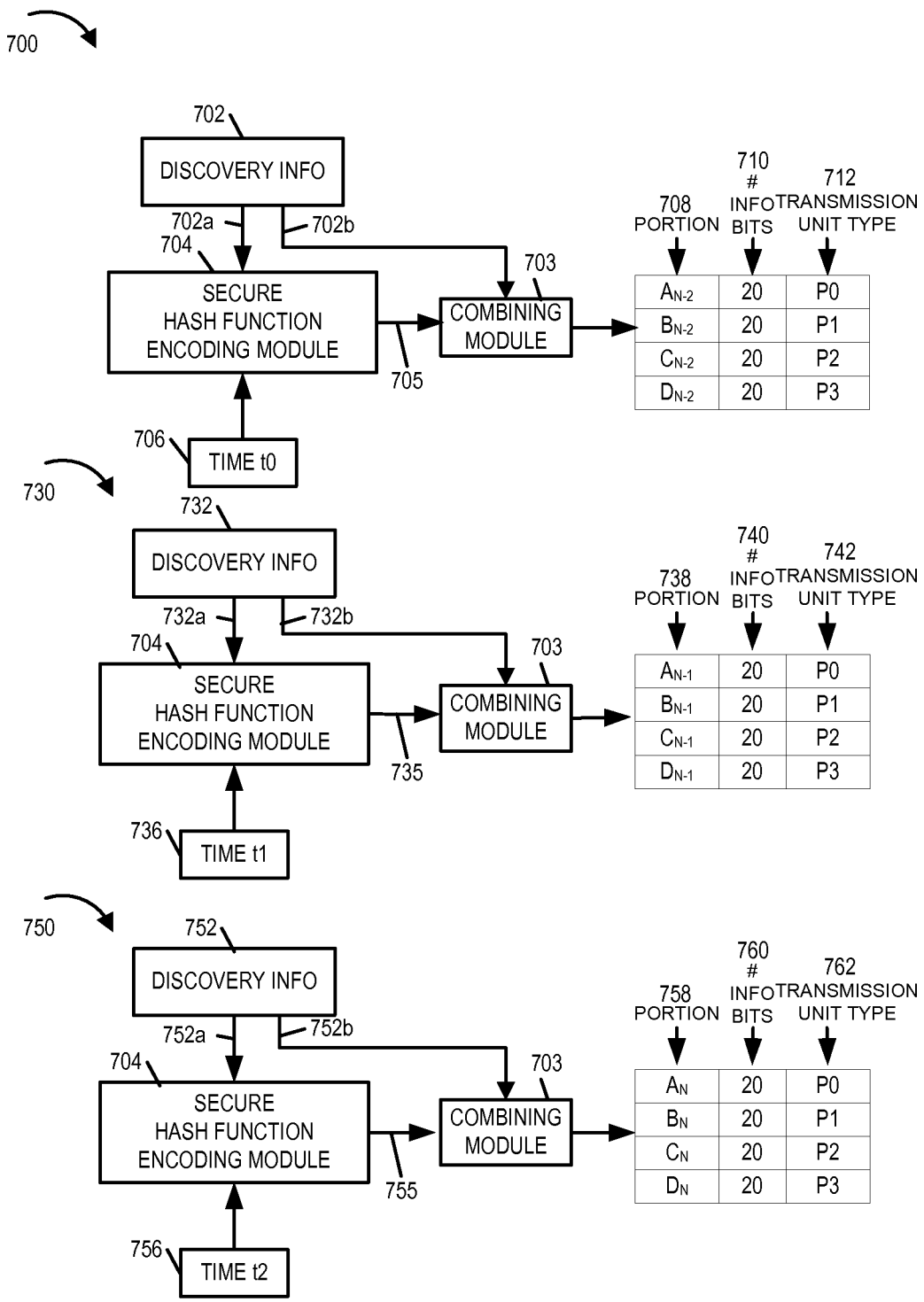
FIG. 7 illustrates a securing hash function encoding module processing some input discovery information, e.g., discovery identification information, which generates secure encoded information.

FIG. 7 illustrates a securing hash function encoding module 704 processing some input discovery information, e.g. discovery identification information, which generates secure encoded information. The output secure encoded information is combined by combining module 703 with additional discovery information, e.g., bits representing type information and/or flags. The result of the combination is mapped to portions, each portion being communicated via a transmission unit.

FIG. 7 thus illustrates a variation on the exemplary embodiment shown in FIG. 6. In the example of FIG. 7 some discovery information which is communicated is not subjected to secure hash function encoding. For example, bits representing type information and/or bits representing flags may be, and sometimes are, not subjected to secure hash function encoding. In the example of FIG. 7, discovery information (702, 732, 752) includes discovery information (702a, 732a, 752a), respectively, which is subjected to secure hash function encoding and discovery information (702b, 732b, 752b), respectively, which is not subjected to secure hash function encoding.

Drawing 700 illustrates that the secure hash function encoding module 704 receives discovery information 702a and time value t0 706 and generates secure encoded information 705. Combining module 703 receives secure encoded information 705 and discovery information 702b and generates a set of output information including a plurality of portions ($A_{N-2}$, $B_{N-2}$, $C_{N-2}$, $D_{N-2}$) as indicated by column 708. In this example, each portion corresponds to 20 information bits as indicated by column 710. Column 712 indicates that there is a correspondence between different encoded output portions and transmission unit types. More particularly, portion $A_{N-2}$ is to be communicated using a P0 transmission unit type in the recurring timing structure; portion $B_{N-2}$ is to be communicated using a P1 transmission unit type in the recurring timing structure; portion $C_{N-2}$, is to be communicated using a P2 transmission unit type in the recurring timing structure; and portion $D_{N-2}$, is to be communicated using a P3 transmission unit type in the recurring timing structure.

Drawing 730 illustrates that the secure hash function encoding module 704 receives discovery information 732a and time value t1 736 and generates secure encoded information 735. Combining module 703 receives secure encoded information 735 and discovery information 732b and generates a set of output information including a plurality of portions ($A_{N-1}$, $B_{N-1}$, $C_{N-1}$, $D_{N-1}$) as indicated by column 738. In this example, each portion corresponds to 20 information bits as indicated by column 740. Column 742 indicates that there is a correspondence between different encoded output portions and transmission unit types. More particularly, portion $A_{N-1}$ is to be communicated using a P0 transmission unit type in the recurring timing structure; portion $B_{N-1}$ is to be communicated using a P1 transmission unit type in the recurring timing structure; portion $C_{N-1}$, is to be communicated using a P2 transmission unit type in the recurring timing structure; and portion $D_{N-1}$, is to be communicated using a P3 transmission unit type in the recurring timing structure.

Drawing 750 illustrates that the secure hash function encoding module 704 receives discovery information 752a and time value t2 756 and generates secure encoded information 755. Combining module 703 receives secure encoded information 755 and discovery information 752b and generates a set of output information including a plurality of portions ($A_N$, $B_N$, $C_N$, $D_N$) as indicated by column 758. In this example, each portion corresponds to 20 information bits as indicated by column 760. Column 762 indicates that there is a correspondence between different encoded output portions and transmission unit types. More particularly, portion $A_N$ is to be communicated using a P0 transmission unit type in the recurring timing structure; portion $B_N$ is to be communicated using a P1 transmission unit type in the recurring timing structure; portion $C_N$, is to be communicated using a P2 transmission unit type in the recurring timing structure; and portion $D_N$, is to be communicated using a P3 transmission unit type in the recurring timing structure.

Input discovery information 702 may be the same or different from input discovery information 732. Similarly, input discovery information 732 may be the same or different from input discovery information 752. In each case, the secure hashing function encoding module 704 may, and in some instances does, include additional inputs, e.g., a key, as needed for operation.

Figure 8:
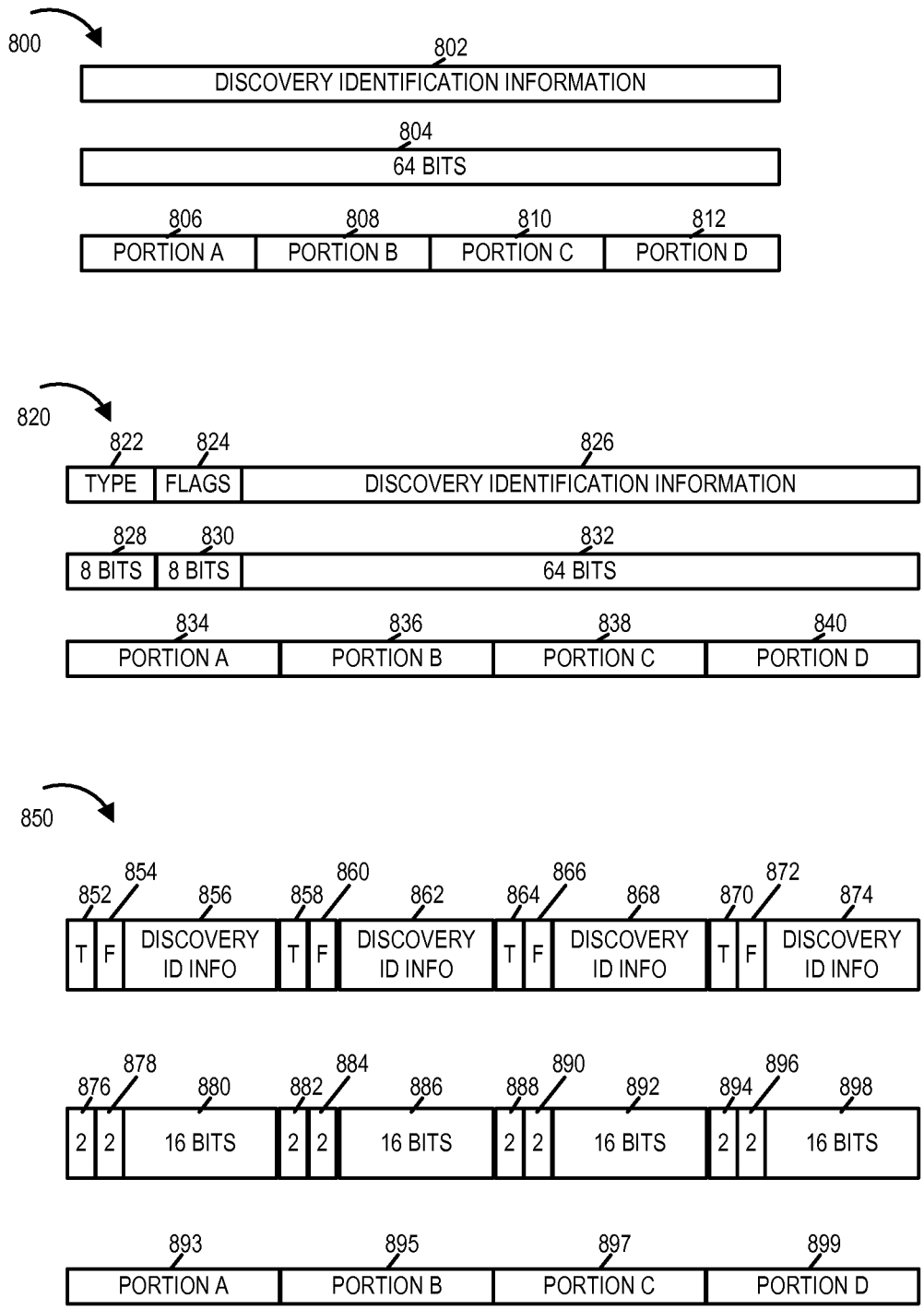
FIG. 8 illustrates 3 exemplary formats for discovery information being conveyed using four output portions corresponding to input discovery information.

FIG. 8 illustrates 3 exemplary formats for discovery information being conveyed using four output portions. Drawing 800 illustrates a first exemplary format in which output discovery identification information 802 to be transmitted includes 64 bits as indicated by block 804 and includes 4 portions (portion A 806, portion B 808, portion C 810, and portion D 812. This format is an exemplary format corresponding to the examples of FIG. 6. For example, the four output portions (portion A 806, portion B 808, portion C 810, portion D 812) of drawing 800 of FIG. 8 are the set of $\{A_{n-2}, B_{n-2}, C_{n-2}$ and $D_{n-2}\}$, or the set of four output portions are $\{A_{n-1}, B_{n-1}, C_{n-1}$ and $D_{n-1}\}$, or the set $\{A_n, B_n, C_n$ and $D_n\}$ of FIG. 6.

Drawing 820 illustrates a second exemplary format in which output discovery identification information 834 to be transmitted includes 80 bits and includes 4 output portions (portion A 834, portion B 836, portion C 838, and portion D 840). This format is an exemplary format corresponding to the examples of FIG. 7. For example, the four output portions (portion A 834, portion B 836, portion C 840, portion D 842) of drawing 820 of FIG. 8 are the set of $\{A_{n-2}, B_{n-2}, C_{n-2}$ and $D_{n-2}\}$, or the set of four output portions are $\{A_{n-1}, B_{n-1}, C_{n-1}$ and $D_{n-1}\}$, or the set $\{A_n, B_n, C_n$ and $D_n\}$ of FIG. 7. In example of drawing 820, the output discovery information to be communicated includes a type field 822 which is 8 bits wide as indicated by 828 and a flags field 824 which is 8 bits wide as indicated by block 830 and a discovery identification information field 826 which is 64 bits wide as indicated by block 832. In the example of drawing 820 the type field 822 and the flags field 824 are included as part of portion A 834, while the discovery identification information 826 is communicated using bits in portion A 834, portion B 836, portion C 838 and portion D 840.

Drawing 850 illustrates a third exemplary format in which output discovery identification information 834 to be transmitted includes 80 bits and includes 4 output portions (portion A 893, portion B 895, portion C 897, and portion D 899). This format is an exemplary format corresponding to the examples of FIG. 7. For example, the four output portions (portion A 893, portion B 895, portion C 897, portion D 899) of drawing 850 of FIG. 8 are the set of $\{A_{n-2}, B_{n-2}, C_{n-2}$ and $D_{n-2}\}$, or the set of four output portions are $\{A_{n-1}, B_{n-1}, C_{n-1}$ and $D_{n-1}\}$, or the set $\{A_n, B_n, C_n$ and $D_n\}$ of FIG. 7. In the example of drawing 850, the discovery information to be communicated in portion A 893 includes a type field 852 which is 2 bits wide as indicated by block 876, a flags field 854 which is 2 bits wide as indicated by block 878 and a discovery identification information field 856 which is 16 bits wide as indicated by block 880. The discovery information to be communicated in portion B 895 includes a type field 858 which is 2 bits wide as indicated by block 882, a flags field 860 which is 2 bits wide as indicated by block 884 and a discovery identification information field 862 which is 16 bits wide as indicated by block 886. The discovery information to be communicated in portion C 897 includes a type field 864 which is 2 bits wide as indicated by block 888, a flags field 866 which is 2 bits wide as indicated by block 890 and a discovery identification information field 868 which is 16 bits wide as indicated by block 892. The discovery information to be communicated in portion D 899 includes a type field 870 which is 2 bits wide as indicated by 894, a flags field 872 which is 2 bits wide as indicated by block 896 and a discovery identification information field 874 which is 16 bits wide as indicated by block 898.

Type information conveyed in a type field includes, e.g., information indicating a format of other discovery information being conveyed, e.g., other upper layer discovery information. For example, a type value conveyed in the type field is used to identify how to process the discovery information being conveyed, e.g., different type values map to different formats which can be used and/or different encoding which can be used and/or different encryptions which can be used. Type field information can be, and sometimes is, used to convey what the contents of processed, e.g., hashed, discovery information represents.

Flags are used to indicate one or more binary conditions, e.g., capabilities or features. In some embodiments, flags are used to identify a device type, e.g., a router. In some embodiments, a portion of the discovery information to be conveyed is included in every transmission portion. In some embodiments, a portion of the discovery information to be conveyed is split over a set of associated peer discovery transmission portions. Some portions of discovery information, e.g. a subset of flags may be sufficiently time critical to include in every transmission portion. In some embodiments, to be able to interpret some discovery information being communicated, a receiving device needs to have already received a type value; thus in such an embodiment, the frequency at which Type is conveyed can, and sometimes does, impact the ability to react to partial sets of discovery information. In some such embodiments, a type field is included in each discovery transmission portion to facilitate rapid recovery of discovery information being conveyed in a received transmitted portion.

Other embodiments, may include other fields in addition to or in place of those described with respect to FIG. 8, e.g., a header field, a CRC field, etc.

Figure 9:
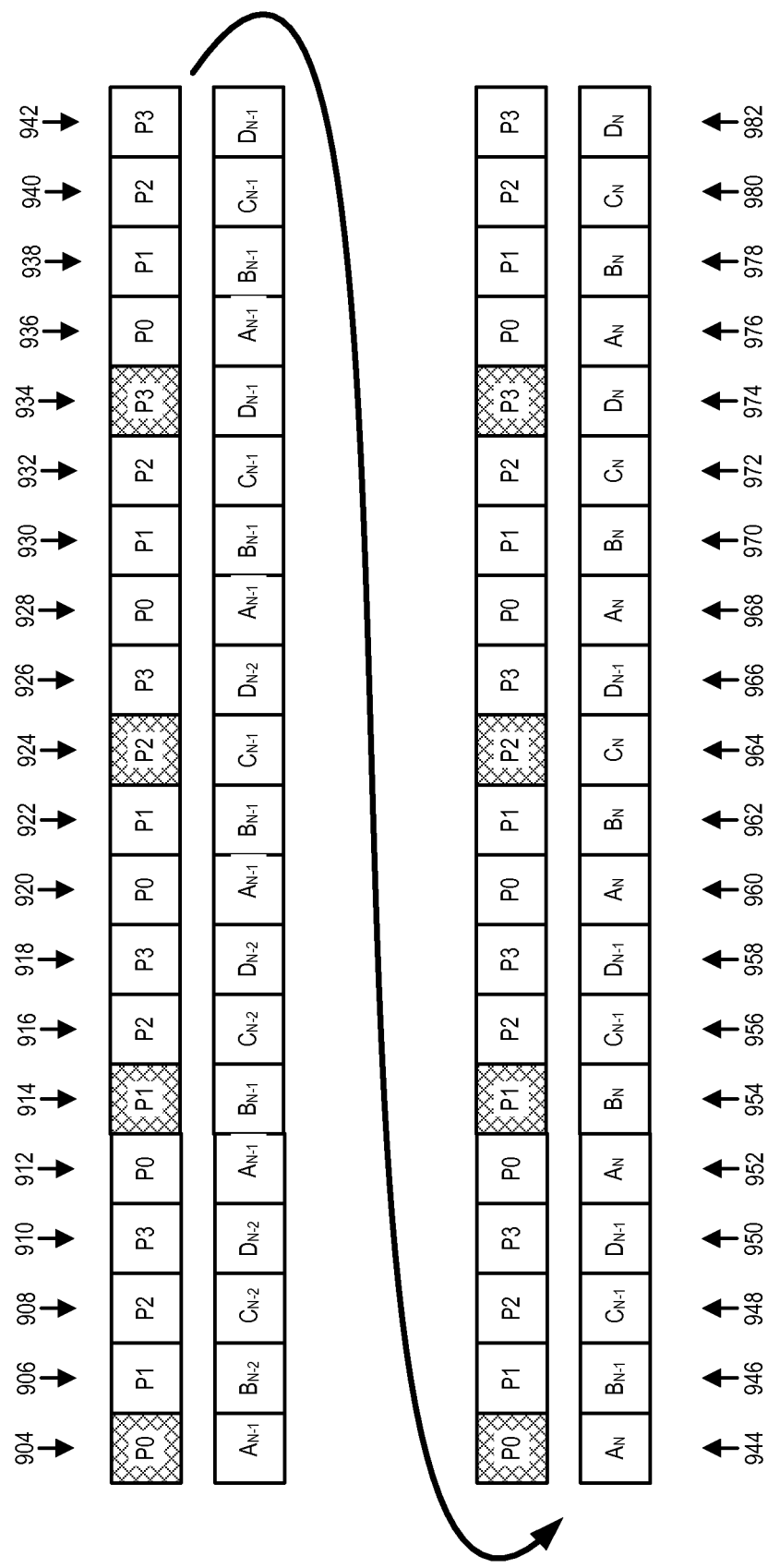
FIG. 9 illustrates mapping of generated portions to ordered transmission units for conveying discovery information associated with a device identifier in accordance with one exemplary embodiment.

FIG. 9 illustrates mapping of the generated portions of FIG. 6 or FIG. 7 to ordered transmission units for conveying discovery information associated with a wireless communications device identifier in accordance with one exemplary embodiment using a particular mapping pattern. An ordered sequence of transmission units (904, 906, 908, 910, 912, 914, 916, 918, 920, 922, 924, 926, 928, 930, 932, 934, 936, 938, 940, 942, 944, 946, 948, 950, 952, 954, 956, 958, 960, 962, 964, 966, 968, 970, 972, 974, 976, 978, 980, 982) which are of the type (P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3), respectively, and which convey information ($A_{N-1}, B_{N-2}, C_{N-2}, D_{N-2}, A_{N-1}, B_{N-1}, C_{N-2}, D_{N-2}, A_{N-1}, B_{N-1}, C_{N-1}, D_{N-2}, A_{N-1}, B_{N-1}, C_{N-1}, D_{N-1}, A_{N-1}, B_{N-1}, C_{N-1}, D_{N-1}, A_N, B_{N-1}, C_{N-1}, D_{N-1}, A_N, B_N, C_{N-1}, D_{N-1}, A_N, B_N, C_N, D_N, A_N, B_N, C_N, D_N, A_N, B_N, C_N, D_N$), respectively. It may be observed that transmission units (904, 914, 924, 934, 944, 954, 964, and 974) are low rate discovery transmission units as indicated by crosshatch shading, while transmission units (906, 908, 910, 912, 916, 918, 920, 922, 926, 928, 930, 932, 936, 938, 940, 942, 946, 948, 950, 952, 956, 958, 960, 962, 966, 968, 970, 972, 976, 978, 980 and 982) are additional transmission units to be used for high rate discovery. It should be noted, that an additional transmission unit for high rate discovery of a given type is designated to carry the information portion that has been previously transmitted via a low rate discovery transmission unit of the same type, when it carries a transmission unit.

If a first peer to peer communications device having the identifier corresponding to the set of transmission units is in high rate discovery information transmit mode, it transmits using each of the transmission units. However, if first the peer to peer communications device is in low rate discovery transmit mode it transmits using the low rate discovery resources, but refrains from transmitting on the additional transmission resources designated for high rate discovery. The structure of FIG. 9 illustrates the dissemination of the same portions of discovery information from a first peer to peer communications irrespective of the transmit mode, but facilitates a more rapid potential recovery of the information by a second peer to peer device if high rate mode is used. In addition, this illustrated structure of FIG. 9 advantageously facilitates a peer discovery assist node or base station being able to: (i)

receive and detect discovery signals being communicated from a first peer to peer communications device transmitting discovery signals using low discovery rate transmission units but not additional transmission units designated for high discovery rate, and (ii) then broadcast such received information using the additional transmission units designated for high rate discovery, e.g., filling in the otherwise unused additional transmission units designated for high rate discovery. A second peer to peer communications device attempting to detect peer discovery information from the first peer discovery device can receive and process discovery transmission units which occur on each of the transmission units associated with the device identifier. The second peer to peer communications device need not know the transmission source of a particular additional transmission unit signal, e.g., the first communications device or the assist node.

Figure 10:
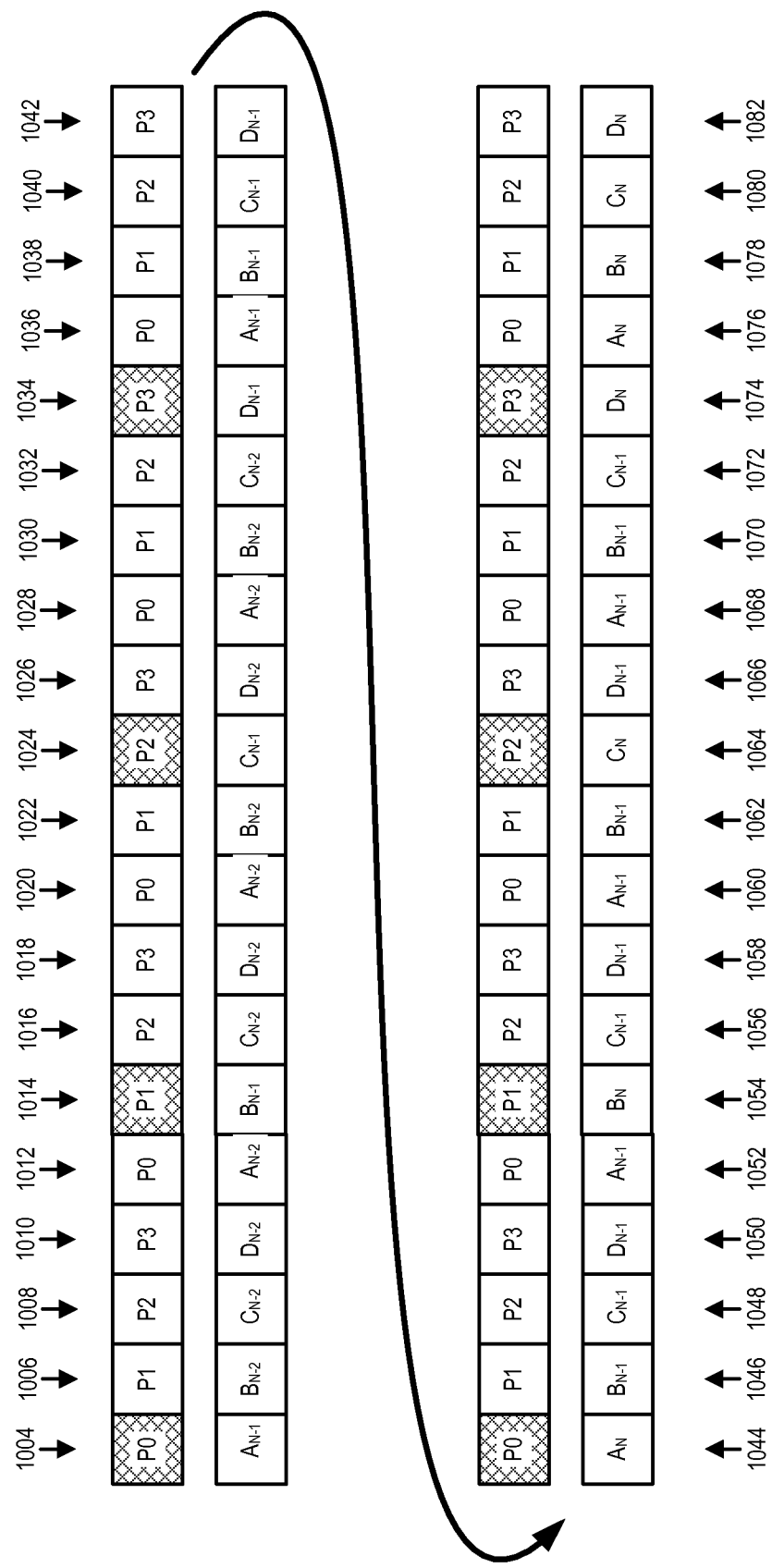
FIG. 10 illustrates mapping of generated portions to ordered transmission units for conveying discovery information associated with a device identifier in accordance with another exemplary embodiment.

FIG. 10 illustrates mapping of the generated portions of FIG. 6 or FIG. 7 to ordered transmission units for conveying discovery information associated with a wireless communications device identifier in accordance with another exemplary embodiment. An ordered sequence of transmission units (1004, 1006, 1008, 1010, 1012, 1014, 1016, 1018, 1020, 1022, 1024, 1026, 1028, 1030, 1032, 1034, 1036, 1038, 1040, 1042, 1044, 1046, 1048, 1050, 1052, 1054, 1056, 1058, 1060, 1062, 1064, 1066, 1068, 1070, 1072, 1074, 1076, 1078, 1080, 1082) which are of the type (P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3), respectively, and which convey information ($A_{N-1}$, $B_{N-2}$, $C_{N-2}$, $D_{N-2}$, $A_{N-2}$, $B_{N-1}$, $C_{N-2}$, $D_{N-2}$, $A_{N-2}$, $B_{N-2}$, $C_{N-1}$, $D_{N-2}$, $A_{N-2}$, $B_{N-2}$, $C_{N-2}$, $D_{N-1}$, $A_{N-1}$, $B_{N-1}$, $C_{N-1}$, $D_{N-1}$, $A_N$, $B_{N-1}$, $C_{N-1}$, $D_{N-1}$, $A_{N-1}$, $B_N$, $C_{N-1}$, $D_{N-1}$, $A_{N-1}$, $B_{N-1}$, $C_N$, $D_{N-1}$, $A_{N-1}$, $B_{N-1}$, $C_{N-1}$, $D_N$, $A_N$, $B_N$, $C_N$, $D_N$), respectively. It may be observed that transmission units (1004, 1014, 1024, 1034, 1044, 1054, 1064, and 1074) are low rate discovery transmission units as indicated by crosshatch shading, while transmission units (1006, 1008, 1010, 1012, 1016, 1018, 1020, 1022, 1026, 1028, 1030, 1032, 1036, 1038, 1040, 1042, 1046, 1048, 1050, 1052, 1056, 1058, 1060, 1062, 1066, 1068, 1070, 1072, 1076, 1078, 1080 and 1082) are additional transmission units to be used for high rate discovery. It should be noted, that an additional transmission unit for high rate discovery is designated to carry an information portion that has been previously transmitted via a low rate discovery transmission unit, when it carries a transmission unit. In this example, the information carried on the additional resources associated with high rate discovery does not change until a complete set of low rate discovery information has been transmitted.

Figure 11:
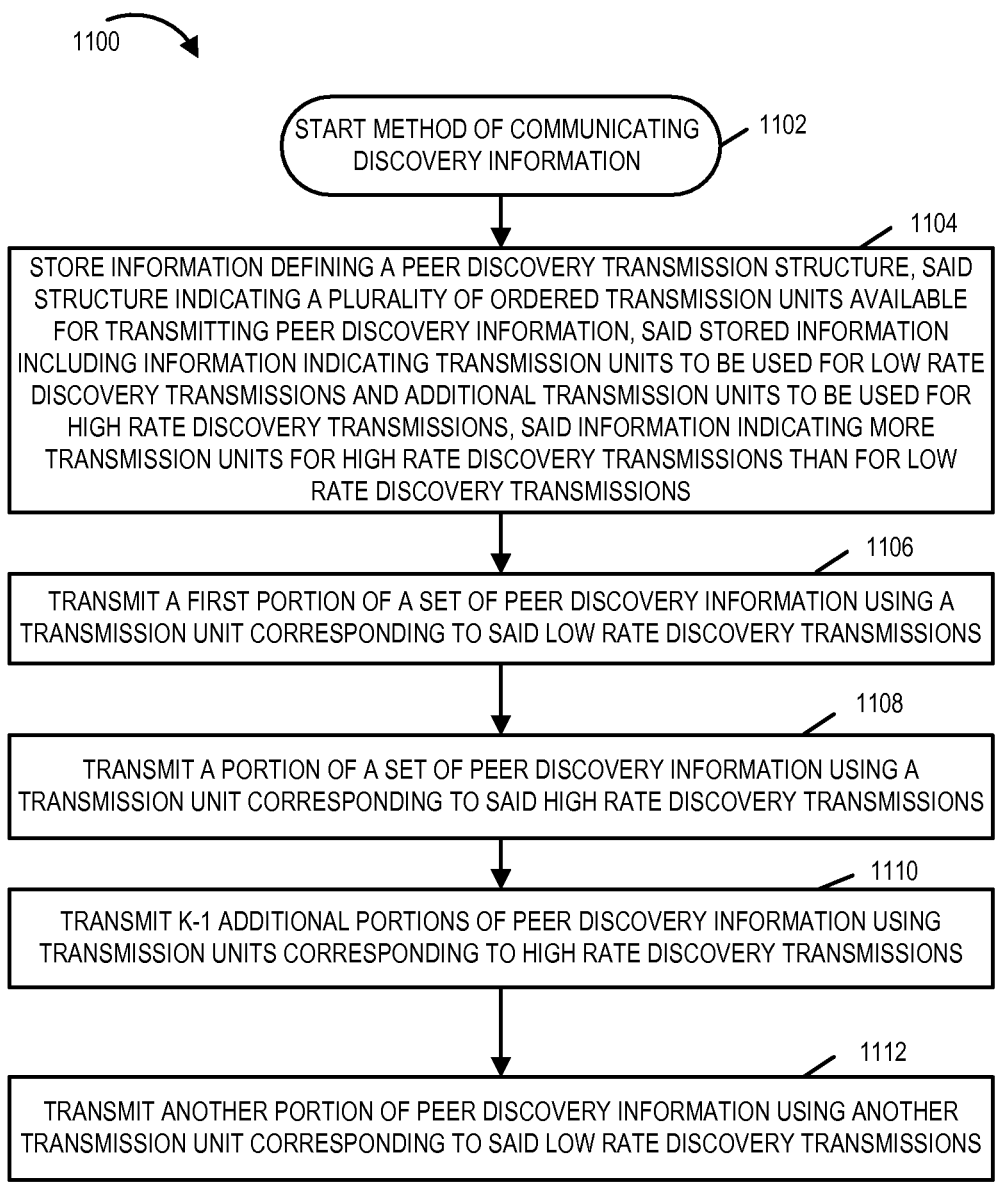
FIG. 11 is a flowchart of an exemplary method of operating a communications device, e.g., a wireless terminal, to communicate discovery information.

FIG. 11 is a flowchart 1100 of an exemplary method of operating a communications device, e.g. a wireless terminal, to communicate discovery information, e.g., to broadcast peer discovery information. Operation starts in step 1102 and proceeds to step 1104. In step 1104, the communications device stores information defining a peer discovery transmission structure, said structure indicating a plurality of ordered transmission units available for transmitting peer discovery information, said stored information including information indicating transmission units to be used for low rate discovery transmissions and additional transmission units to be used for high rate discovery transmissions, said information indicating more transmission units for high rate discovery transmissions than for low rate discovery transmissions. For example, in some exemplary embodiments, there are 4 additional transmission units for each low rate discovery transmission unit in the peer discovery transmission structure. See FIG. 5. Other peer discovery structures may have different ratios between the number of additional transmission units associated with high rate discovery and the number of number of transmission units associated with low rate discovery. Operation proceeds from step 1104 to step 1106.

In step 1106, the communications device transmits a first portion of a set of peer discovery information using a transmission unit corresponding to said low rate discovery transmissions. In some embodiments, the set of peer discovery information including the first portion includes a total of K portions, where K is a positive integer greater than or equal to 2. In some examples there are 4 portions in a set of peer discovery information. For example one set of 4 is the set {portion $A_N$, portion $B_N$, portion $C_N$, portion $D_N$}. Operation proceeds from step 1106 to step 1108.

In step 1108, the communications device transmits a portion of a set of peer discovery information using a transmission unit corresponding to said high rate discovery transmissions. In some embodiments, the transmitted portion of step 1108 is a previously transmitted portion. The repeating of previously transmitted portions has benefits relating to security in combination with proxying. In some embodiments, the transmitted portion of step 1108 is not a previously transmitted portion. Operation proceeds from step 1108 to step 1110.

In step 1110 the communications device transmits K-1 additional portions of peer discovery information using transmission units corresponding to high rate discovery transmissions. Operation proceeds from step 1110 to step 1112

Then, in step 1112, the communications device transmits another portion of peer discovery information using another transmission unit corresponding to said low rate discovery transmissions.

A first example in accordance with the method of flowchart 1100 will now be described. In a first example, consider FIG. 9, and assume that the communications device stores peer discovery transmission structure information in accordance with the pattern of FIG. 9 (step 1104). Also assume that the communications device is in a high rate discovery transmit mode and is transmitting using each of the illustrated discovery transmission units indicated in FIG. 9. The first portion transmitted in step 1106 is, e.g., portion $A_N$ in the set of {$A_N$, $B_N$, $C_N$, $D_N$} and is transmitted using the low rate discovery transmission resource indicated by arrow 944. In this example assume that a set of discovery information has K portions, where K=4. The previously transmitted portion transmitted in step 1108 is, e.g., portion $B_{N-1}$, which belongs to the set of {$A_{N-1}$, $B_{N-1}$, $C_{N-1}$, $D_{N-1}$} and is transmitted using the high rate discovery transmission resource indicated by arrow 946. In this example, the previously transmitted portion of step 1108 corresponds to different set of peer discovery information than the set which includes the first portion of step 1106. Continuing with the example, the K-1 additional portions transmitted in step 1110 are, e.g., the three portions $C_{N-1}$, $D_{N-1}$, $A_N$ transmitted using transmission units corresponding to high rate discovery transmissions as indicated by arrows 948, 950, and 952. Continuing with the example, the another portion transmitted in step 1112 is, e.g., portion $B_N$ which is transmitted using another transmission unit corresponding to low rate discovery transmissions as indicated by arrow 954.

A second example in accordance with the method of flowchart 1100 will now be described. In the second example, consider FIG. 9, and assume that the communications device stores peer discovery transmission structure information in accordance with the pattern of FIG. 9 (step 1104). Also assume that the communications device is in a high rate discovery transmit mode and is transmitting using each of the illustrated discovery transmission units indicated in FIG. 9. The first portion transmitted in step 1106 is, e.g., portion $D_{N-1}$ in the set of $\{A_{N-1}, B_{N-1}, C_{N-1}, D_{N-1}\}$ and is transmitted using the low rate discovery transmission resource indicated by arrow 934. In this example assume that a set of discovery information has K portions, where K=4. The previously transmitted portion transmitted in step 1108 is, e.g., portion $A_{N-1}$, which belongs to the set of $\{A_{N-1}, B_{N-1}, C_{N-1}, D_{N-1}\}$ and is transmitted using the high rate discovery transmission resource indicated by arrow 936. In this example, the previously transmitted portion of step 1108 corresponds to the same set of peer discovery information as the set which includes the first portion of step 1106. Continuing with the example, the K-1 additional portions transmitted in step 1110 are, e.g., the three portions $B_{N-1}, C_{N-1}, D_{N-1}$ transmitted using transmission units corresponding to high rate discovery transmissions as indicated by arrows 938, 940, and 942. In this example, the first portion, the previously transmitted portion and the K-1 additional portions are all from the same set of peer discovery information. Continuing with the example, the another portion transmitted in step 1112 is, e.g., portion $A_N$ which is transmitted using another transmission unit corresponding to low rate discovery transmissions as indicated by arrow 944.

A third example in accordance with the method of flowchart 1100 will now be described. In the third example, consider FIG. 10, and assume that the communications device stores peer discovery transmission structure information in accordance with the pattern of FIG. 10 (step 1104). Also assume that the communications device is in a high rate discovery transmit mode and is transmitting using each of the illustrated discovery transmission units indicated in FIG. 10. The first portion transmitted in step 1106 is, e.g., portion $A_N$ in the set of $\{A_N, B_N, C_N, D_N\}$ and is transmitted using the low rate discovery transmission resource indicated by arrow 1044. In this example assume that a set of discovery information has K portions, where K=4. The previously transmitted portion transmitted in step 1108 is, e.g., portion $B_{N-1}$, which belongs to the set of $\{A_{N-1}, B_{N-1}, C_{N-1}, D_{N-1}\}$ and is transmitted using the high rate discovery transmission resource indicated by arrow 1046. In this example, the previously transmitted portion of step 1108 corresponds to a different set of peer discovery information as the set which includes the first portion of step 1106. Continuing with the example, the K-1 additional portions transmitted in step 1110 are, e.g., the three portions $C_{N-1}, D_{N-1}, A_{N-1}$ transmitted using transmission units corresponding to high rate discovery transmissions as indicated by arrows 1048, 1050, and 1052. In this example, the previously transmitted portion and the K-1 additional portions are all from the same set of peer discovery information. In addition, said previously transmitted portion and said N-1 additional portions are transmitted consecutively using transmission units corresponding to high rate peer discovery transmissions following transmission of said first portion. Continuing with the example, the another portion transmitted in step 1112 is, e.g., portion $B_N$ which is transmitted using another transmission unit corresponding to low rate discovery transmissions as indicated by arrow 1054.

A fourth example in accordance with the flowchart 1100 of FIG. 11 will now be described. Multiple peer discovery related advertisements are sent with some being communicated at a low rate using low rate peer discovery transmissions and some being sent at a high rate using high rate peer discovery transmissions. For example, a first peer discovery related advertisement is communicated at a low rate using the transmissions of steps 1106 and 1112, while a second peer discovery related advertisement is communicated using the transmissions of steps 1108 and 1110.

Figure 12A:
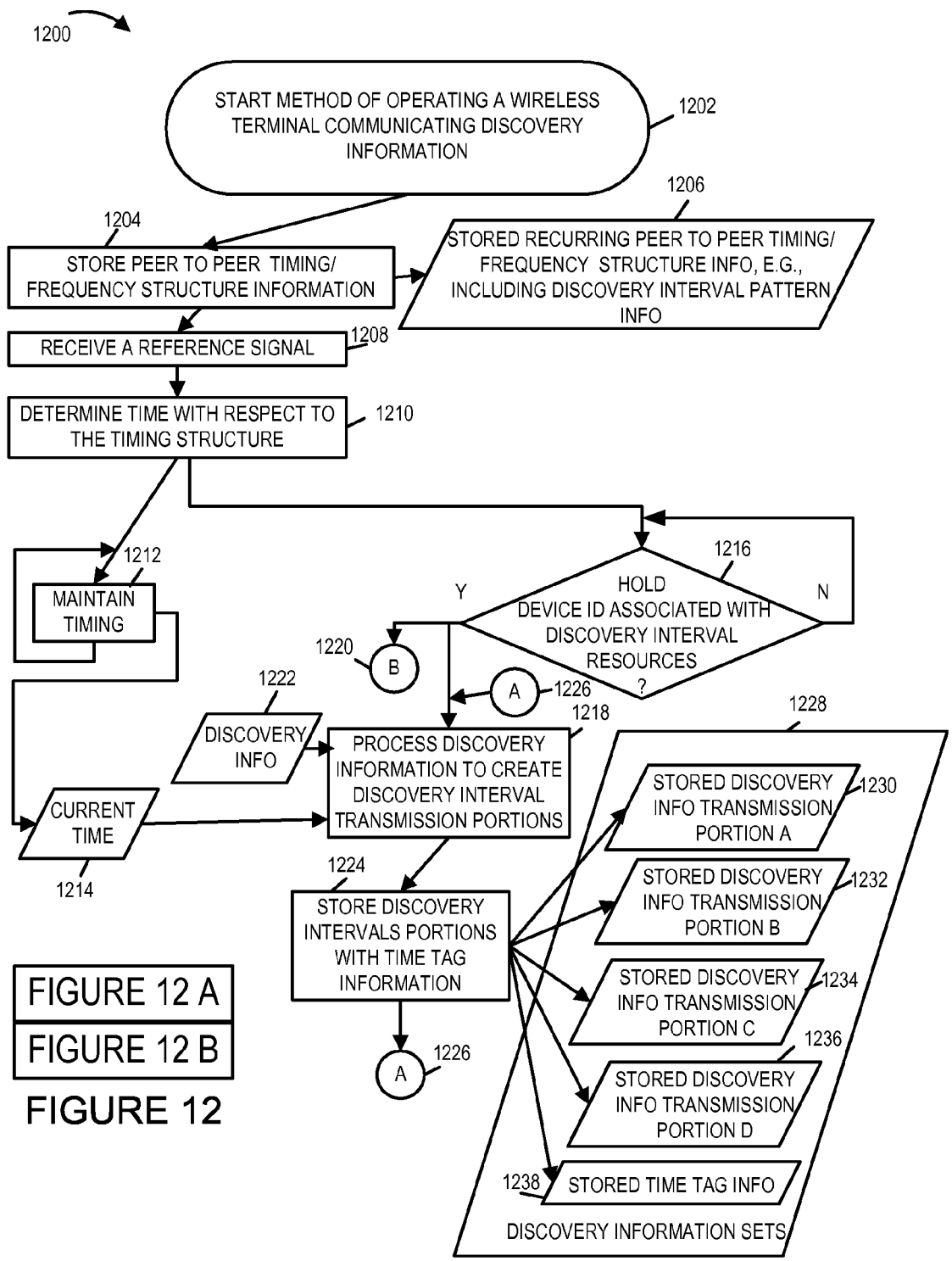
FIG. 12, comprising the combination of FIG. 12A and FIG. 12B, is a flowchart of an exemplary method of operating a wireless terminal, e.g., a mobile node supporting peer to peer communications, to communicate discovery information, in accordance with an exemplary embodiment.
Figure 12B:
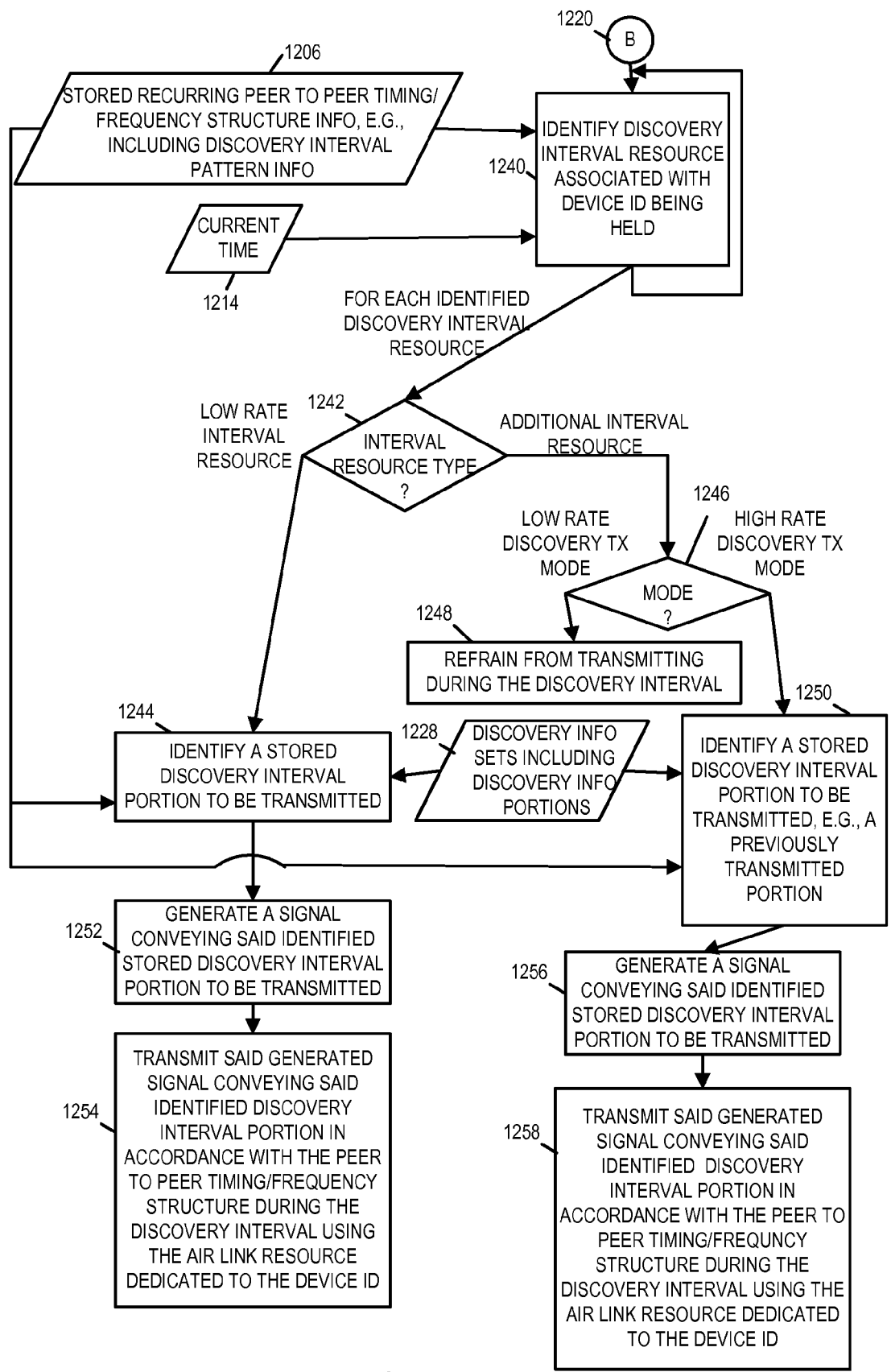

FIG. 12, comprising the combination of FIG. 12A and FIG. 12B, is a flowchart 1200 of an exemplary method of operating a wireless terminal, e.g., a mobile node supporting peer to peer communications, to communicate discovery information, in accordance with an exemplary embodiment. The wireless terminal is, e.g., one of the peer to peer communications devices (102, 104, 106, 108, 110) of system 100 of FIG. 1.

The exemplary method of flowchart 1200 starts in step 1202 and proceeds to step 1204, in which the wireless terminal stores peer to peer timing/frequency structure information as stored recurring peer to peer timing/frequency structure information 1206. The storing of step 1204 is, e.g., part of a wireless terminal configuration and/or wireless terminal initialization process. The stored peer to peer timing/frequency structure information 1206 includes, e.g., information identifying a plurality of discovery interval air link resources, information associating particular discovery interval air link resources with particular device identifiers and information indicating a discovery interval pattern. The stored recurring peer to peer timing/frequency structure information 1206 defines a peer discovery transmission structure, which includes a plurality of ordered transmission units available for transmitting peer discovery information. Information 1206 includes information indicating transmission units to be used for low rate discovery transmissions and additional transmission units to be used for high rate discovery transmissions, and indicates that more transmission units for high rate discovery transmissions than for low rate discovery transmissions. Information described in FIGS. 2, 3, 4, 5, 9 and/or 10 includes information that may be included as part of stored recurring peer to peer timing/frequency structure information.

Operation proceeds from step 1204 to step 1208, in which the wireless terminal receives a reference signal. For example, the wireless receives a beacon signal, e.g., an OFDM beacon signal, from beacon transmitter 116 of FIG. 1, wherein the beacon signal is used to coordinate timing with respect to a peer to peer timing structure being used in system 100. Operation proceeds from step 1208 to step 1210. In step 1210, the wireless terminal determines time with respect to the timing structure based on the received signal of step 1208. Operation proceeds from step 1210 to steps 1212 and 1216.

In step 1212, which is performed on an ongoing basis, the wireless terminal maintains timing and outputs current time 1214, which is utilized in other steps. Returning to step 1216, in step 1216 the wireless terminal checks and determines whether it holds a device ID associated with discovery interval air link resources. If it does not currently hold a device ID associated with discovery interval air link resources, then operation returns to the input of step 1216, for another check at a later point in time. However, if the wireless terminal does hold a device ID associated with discovery interval resources, then operation proceeds from step 1216 to step 1218 and step 1240, via connecting node B 1220.

Returning to step 1218, in step 1218 the wireless terminal processes discovery information 1222, using current time information 1214, to create discovery interval transmission portions. FIGS. 6 and 7 illustrate exemplary processing of discovery information and the generation of discovery interval transmission portions. Operation proceeds from step 1218 to step 1224, in which the wireless terminal stores discovery interval portions with time tag information as part of stored discovery information sets information 1228. An example of the output from step 1224 is presented for one set of information which includes stored discovery information transmission portion A 1230, stored discovery information transmission portion B 1232, stored discovery information portion C 1234, stored discovery information portion D 1236, and stored time tag information 1238. In other embodiments, a different number of portions may correspond to a set of discovery information. In some embodiments, time tag information is not stored directly with a set of discovery information, but rather indirectly, e.g., with a set of discovery information being stored in a set of memory locations which the wireless terminal associates with an index value, e.g., set N-2, set N-1, set N.

Returning to step 1240, in step 1240, which is performed on a recurring basis, the wireless terminal identifies, using stored recurring peer to peer timing/frequency structure information 1206 and current time information 1214, a discovery interval resource associated with the device ID currently being held by the wireless terminal. For each identified discovery interval resource associated with the device identifier being currently held by the wireless terminal, operation proceeds from step 1240 to step 1242. In step 1242, the wireless terminal determines the interval resource type of the identified discovery interval resource. If the identified interval resource is determined to be a low rate interval resource, then operation proceeds from step 1242 to step 1244. However, if the wireless terminal determines that the identified interval resource is an additional interval resource, then operation proceeds from step 1242 to step 1246.

Returning to step 1244, in step 1244 the wireless terminal identifies a stored discovery interval portion to be transmitted. Inputs to step 1244 include stored recurring peer to peer timing/frequency structure information 1206 and discovery information sets including discovery information portions 1228. Operation proceeds from step 1244 to step 1252. In step 1252 the wireless terminal generates a signal conveying the identified stored discovery interval portion to be transmitted from step 1244. Then, in step 1254 the wireless terminal transmits the generated signal conveying the identified discovery interval portion in accordance with the peer to peer timing structure during the discovery interval using the air link resource, e.g., segment, dedicated to the device ID currently being held by the wireless terminal.

Returning to step 1246, in step 1246 the wireless terminal determines the wireless terminal mode of operation with regard to transmitting discovery information. If the wireless terminal is in low rate discovery transmit mode, then operation proceeds from step 1246 to step 1248, where the device is controlled to refrain from transmitting during the discovery interval. However, if the device is in high rate discovery transmit mode, then operation proceeds from step 1246 to step 1250. In step 1250, the wireless terminal identifies a stored discovery interval portion to be transmitted. In some embodiments, the identified portion is a previously transmitted portion. Stored recurring peer to peer timing/frequency structure information 1206 and discovery information sets including discovery information portions 1228 are inputs to step 1250.

Operation proceeds from step 1250 to step 1256. In step 1256 the wireless terminal generates a signal conveying the identified stored discovery interval portion to be transmitted from step 1250. Then in step 1258, the wireless terminal transmits the generated signal conveying the identified discovery interval portion from step 1250 in accordance with the peer to peer timing/frequency structure during the discovery interval using the air link resource, e.g., segment, dedicated to the device ID being held by the wireless terminal.

In some embodiments, when in high rate discovery transmit mode, the wireless terminal executes 1 iteration of steps 1244, 1252 and 1254 for K iterations of steps 1250, 1256 and 1258. For example, in one exemplary embodiment where discovery information in generated in sets of 4 portions, there is 1 iteration of step 1244, 1252 and 1254 corresponding to 4 iterations of steps 1250, 1256 and 1258.

In some embodiments, e.g., embodiments supporting proxying techniques, discovery information portions are communicated using additional interval resources. For example, a discovery interval portion communicated in step 1258 may, and in some embodiments, is a discovery interval portion which has been previously transmitted in a low rate interval resource in step 1254.

In some other embodiments, different discovery interval portions are communicated when transmitting using a low rate interval resource than when using an additional interval resource. For example, a first set of discovery information is communicated using low rate discovery interval resources via the transmissions of multiple iterations of step 1254, and a second set of discovery information is communicated using the additional discovery interval resources via the transmissions of multiple iterations of step 1258. In one such embodiment there are more iterations of step 1258 than step 1254 for a given time interval.

Figure 13:
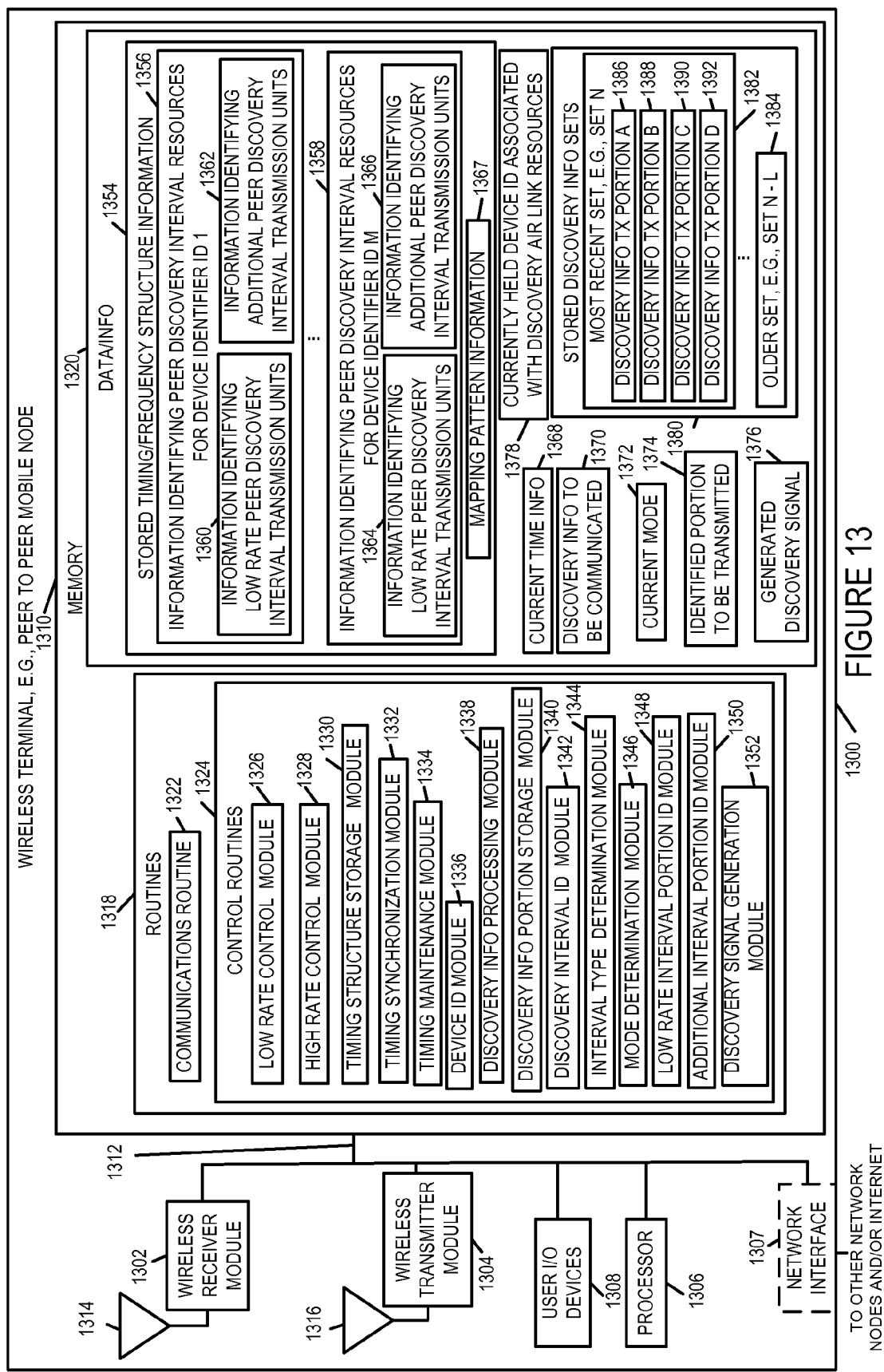
FIG. 13 is a drawing of an exemplary wireless terminal, e.g., peer to peer mobile node, which transmits discovery information portions in accordance with an exemplary embodiment.

FIG. 13 is a drawing of an exemplary wireless terminal 1300, e.g., a peer to peer mobile node which transmits discovery information, in accordance with an exemplary embodiment. Wireless terminal 1300 is, e.g., one of the peer to peer communications devices (102, 104, 106, 108, 110) of system 100 of FIG. 1. Exemplary wireless terminal 1300 includes a wireless receiver module 1302, a wireless transmitter module 1304, user I/O devices 1308, a processor 1306, a memory 1310 coupled together via a bus 1312 over which the various elements may interchange data and information. In some embodiments, wireless terminal 1300 also include network interface 1307 for coupling the wireless terminal to other network nodes and/or the Internet, e.g., via a wired backhaul network.

Memory 1310 includes routines 1318 and data/information 1320. The processor 1306, e.g., a CPU, executes the routines 1318 and uses the data/information 1320 in memory 1310 to control the operation of the wireless terminal 1300 and implement methods, e.g., the method of flowchart 1100 of FIG. 11 or the method of flowchart 1200 of FIG. 12.

Wireless receiver module 1302, e.g., an OFDM or CDMA receiver, is coupled to receive antenna 1314 via which the wireless terminal 1300 receives a timing reference signal, e.g., a beacon signal, used to synchronize to a peer to peer timing structure. Wireless receiver module 1302 also receives discovery information signals conveying discovery information portions from other wireless terminals which are the source of discovery information and/or from other nodes, e.g., assist nodes and/or server nodes which are assisting peer discovery by retransmitting portions of low rate peer discovery information.

Wireless transmitter module 1304, e.g., an OFDM or CDMA transmitter, is coupled to transmit antenna 1316 via which the wireless terminal 1300 transmits discovery signals. In low rate discovery transmit mode the wireless terminal 1300 transmits discovery information portions during low rate discovery intervals using low rate discovery interval transmission units associated with an identifier that it currently holds, while it refrains from transmitting discovery information portions during additional discovery intervals associated with the identifier that it currently holds. In high rate discovery mode the wireless terminal 1300 transmits discovery signal portions during the low rate discovery intervals using low rate discovery interval transmission units associated with the identifier that it currently holds and transmits discovery signal portions during the additional discovery intervals using the additional discovery interval transmission units associated with the identifier that it currently holds.

User I/O devices 1308 include, e.g., a microphone, keyboard, keypad, switches, camera, speaker, display, etc. User I/O devices 1308 allow a user of wireless terminal 1300 to input data/information, access output data/information, and control at least some functions of the wireless terminal, e.g., initiate the broadcasting of one or more types of discovery information. Network interface 1307, where included, allows the wireless terminal 1300 to be coupled to other network nodes and/or the Internet via a backhaul network.

Routines 1318 include a communications routine 1322 and control routines 1324. The communications routine 1322 implements the various communications protocols used by the wireless terminal 1300. The control routines 1324 include a low rate control module 1326, a high rate control module 1328, a timing structure storage module 1330, a timing synchronization module 1332, a timing maintenance module 1334, a device ID module 1336, a discovery information processing module 1338, a discovery information portion storage module 1340, a discovery interval identification module 1342, a interval type determination module 1344, a mode determination module 1346, a low rate interval portion identification module 1348, an additional interval portion identification module 1350, and a discovery signal generation module 1352.

Data/information 1320 includes stored timing/frequency structure information 1354, information identifying a currently held device identifier associated with discovery air link resources 1378, current time information 1368, discovery information to be communicated 1370, stored discovery information sets 1380, information identifying the current discovery information transmit mode 1372, an identified portion to be transmitted 1374, and a generated discovery signal 1376. Stored discovery information sets 1380 includes a most recent discovery information set 1382, e.g., set N, and older generated discovery information sets such older discovery information set 1384, e.g., set N-L, where N and L are integers. Each set of generated discovery information to be transmitted includes multiple portions. In this exemplary embodiment, set 1380 includes 4 portions (discovery information TX portion A 1386, discovery information TX portion B 1388, discovery information TX portion C 1390, discovery information TX portion D 1392).

The stored timing/frequency structure information 1354 includes a plurality of sets of information identifying peer discovery interval air link resources corresponding to different identifiers which may be temporarily associated with wireless terminal 1300 (information identifying peer discovery interval resources for device identifier ID 1 1356, . . . , information identifying peer discovery interval resources for device identifier ID M 1358), and mapping pattern information 1367. Information identifying peer discovery interval resources for device identifier ID 1 1356 includes information identifying low rate peer discovery interval transmission units associated with device ID 1 1360 and information identifying additional discovery interval transmission units associated with device ID 1 1362. Similarly, information identifying peer discovery interval resources for device identifier ID M 1358 includes information identifying low rate peer discovery interval transmission units associated with device identifier M 1364 and information identifying additional discovery interval transmission units associated with device identifier M 1366. Mapping pattern information 1367 includes information defining a mapping pattern of generated discovery portions to particular transmission units. Information described with respect to FIGS. 2, 3, 4, 5, 9 and/or 10 includes exemplary information included as part of the timing/frequency structure information 1354.

The stored timing/frequency structure information 1354 includes information defining a peer discovery transmission schedule, the structure indicating a plurality of ordered transmission units available for transmitting peer discovery information, the stored information including information indicating transmission units to be used for low rate discovery transmissions and additional transmission units to be used for high rate discovery transmissions, the stored information indicating more transmission units for high rate discovery transmissions than for low rate discovery transmissions. Information identifying low rate peer discovery interval transmission units 1360 identifies fewer transmission units, e.g., segments, than information identifying additional discovery interval transmission units 1362. Similarly, information identifying low rate peer discovery interval transmission units 1364 identifies fewer transmission units, e.g., segments, than information identifying additional discovery interval transmission units 1366. In one embodiment, the ratio between low rate peer discovery transmission units to additional transmission units is 1:4. See FIG. 5.

Low rate control module 1326 controls the wireless transmitter module 1304 to transmit a portion of peer discovery information in a set of peer discovery information using a transmission unit corresponding to a low rate discovery transmission. For example, consider that wireless terminal 1300 currently holds device identifier ID M, low rate control module 1354 controls the wireless transmitter module 1304 to transmit a discovery portion during an interval identified by information 1364 using a transmission unit identified by information 1364.

High rate control module 1328 controls the wireless transmitter module 1304 to transmit a previously transmitted portion of a set of peer discovery information using a transmission unit corresponding to high rate discovery transmissions. For example, consider that the wireless terminal 1300 currently holds device identifier ID M, high rate control module 1328 controls the wireless transmitter module 1304 to transmit a discovery portion during an interval identified by information 1366 using a transmission unit identified by information 1366, wherein a discovery information portion transmitted during an additional discovery interval has been previously transmitted during a prior low rate discovery interval.

Timing structure storage module 1330 stores information defining a peer discovery transmission structure, e.g., a recurring timing/frequency structure. In some embodiments, the storage is part of a device configuration operation and/or device initialization operation. Stored timing/frequency structure information 1354 represents an output of module 1330. The stored timing structure information 1354 includes information indicating a plurality of ordered transmission units available for transmitting peer discovery information, the stored information including information indicating transmission units to be used for low rate discovery transmissions and additional transmission units to be used for high rate discovery transmissions, the stored information indicating more transmission units for high rate discovery transmission than for low rate discovery transmissions.

Timing synchronization module 1332 synchronizes internal timing within wireless terminal 1300 with respect to an external reference, e.g., a received beacon signal, such that wireless terminal 1300 has its timing within the peer to peer recurring timing structure coordinated with respect to other peer to peer devices in the vicinity. Timing maintenance module 1334 maintains timing within wireless terminal 1300 on an ongoing basis, outputting current time information 1368.

Device ID module 1336 performs functions including acquiring a device identifier associated with a set of discovery interval air link resources to be used temporarily by wireless terminal 1300, determining whether or not wireless terminal 1300 currently holds such a device identifier, and relinquishing a currently held device identifier.

Discovery information processing module 1338 processes discovery information to be communicated 1370 to create discovery interval transmission portions. In some embodiments, the processing of module 1338 includes performing a secure hash function operation. FIG. 6 and FIG. 7 illustrate exemplary processing that may be performed by module 1338. Discovery information portion storage module 1340 stores the processing outputs from module 1338 in stored discovery information sets 1380.

Discovery information identification module 1342 determines whether or not a discovery interval air link resource in the recurring peer to peer timing/frequency structure is associated with a device identifier currently held by wireless terminal 1300. Interval type determination module 1344 determines whether a discovery interval air link resource is a low rate peer discovery interval air link resource or an additional discovery interval air link resource. Mode determination module 1346 determines the current mode 1372 of wireless terminal 1300 with regard to the transmission of discovery information, e.g., (i) a low rate discovery information transmit mode in which the wireless terminal 1300 transmits discovery information portions using low rate peer discovery interval air link resources but does not use additional discovery interval air link resources or (ii) a high rate discovery information transmit mode in which the wireless terminal 1300 transmits discovery information portions using both low rate peer discovery interval air link resources and additional discovery interval air link resources. The discovery interval air link resources are sometimes referred to alternatively as discovery interval transmission units or discovery interval segments.

Low rate portion identification module 1348 identifies a stored discovery interval portion to be transmitted during a low rate peer discovery interval by wireless terminal 1300 from the stored discovery information 1380 in accordance with the stored timing/frequency structure information 1354. Additional interval portion identification module 1350 identifies a stored discovery interval portion to be transmitted during an additional discovery interval by wireless terminal 1300 from the stored discovery information 1380 in accordance with the stored timing/frequency structure information 1354. A portion identified to be transmitted during an additional discovery interval is a portion which has been previously transmitted during a prior low rate peer discovery interval. Identified portion to be transmitted 1374 can be an output of either module 1348 or module 1350, and it is an input to discovery signal generation module 1352. Discovery signal generation module 1352 generates a discovery signal to convey an identified discovery interval portion to be transmitted. Generated discovery signal 1376 is an output of module 1352.

Wireless transmitter module 1304 transmits portions of peer discovery information. The low rate control module 1326 controls the wireless transmitter module 1304 to transmit a first portion of a set of peer discovery information using a transmission unit corresponding to low rate discovery transmissions. The high rate control module 1328 controls the wireless transmitter module 1304 to transmit a portion of a set of peer discovery information using a transmission unit corresponding to high rate discovery transmissions, e.g., a previously transmitted portion of a set of peer discovery information. For some cases, the previously transmitted portion of a set of peer discovery information corresponds to a different set of peer discovery information than the set of peer discovery information which includes the first portion. For some other cases, the previously transmitted portion of a set of peer discovery information corresponds to the same set of peer discovery information as the first portion. The high rate control module 1328, in some embodiments, controls the wireless transmitter module 1304 to transmit a previously transmitted portion following transmission of the first portion. At times, transmitting a previously transmitted portion precedes transmission of another portion of peer discovery information using another transmission unit corresponding to low rate discovery transmissions.

In various embodiments, the set of peer discovery information including the first portion includes a total of K portions, e.g., 4 portions. In some such embodiments, the wireless transmitter module 1302 is also for transmitting additional portions of peer discovery information in addition to said first portion and said previously transmitted portion. In some such embodiments, the high rate control module controls the wireless transmitter module 1302 to transmit K-1 additional portions of peer discovery information using transmission units corresponding to high rate discovery transmissions following transmission of said first portion and prior to transmission of said another portion. For example, consider that K=4. The wireless terminal 1300 transmits in order: (i) the first portion using a first low rate discovery transmission unit; (ii) a previously transmitted discovery portion using a first additional transmission unit associated with high rate transmissions; (iii) a second previously transmitted discovery portion using a second additional transmission unit associated with high rate transmissions; (iv) a third previously transmitted discovery portion associated with high rate transmissions; (v) a fourth previously transmitted discovery portion associated with high rate transmissions; and (vi) a second portion using a second low rate discovery transmission unit. The transmission sequence is such that during some times, the first portion transmitted using a low rate discovery transmission unit and the K-1 discovery portions using high rate discovery transmission units are all from the same set of peer discovery information.

In some embodiments, the previously transmitted portion and the K-1 additional portions are controlled to be transmitted consecutively using transmission units corresponding to high rate peer discovery transmissions following transmission of the first portion using a low rate discovery transmission unit. For some embodiments, the previously transmitted portion and the K-1 additional portions are all from the same set of peer discovery information. Refer to the example of FIG. 10. In some other embodiments, during some intervals of the recurring structure, the previously transmitted portion and the K-1 additional portions are all from the same set of peer discovery information, while during some other intervals in the recurring structure the previously transmitted portion and the K-1 additional portions include members from two different sets of discovery information. Refer to FIG. 9.

Figure 14:
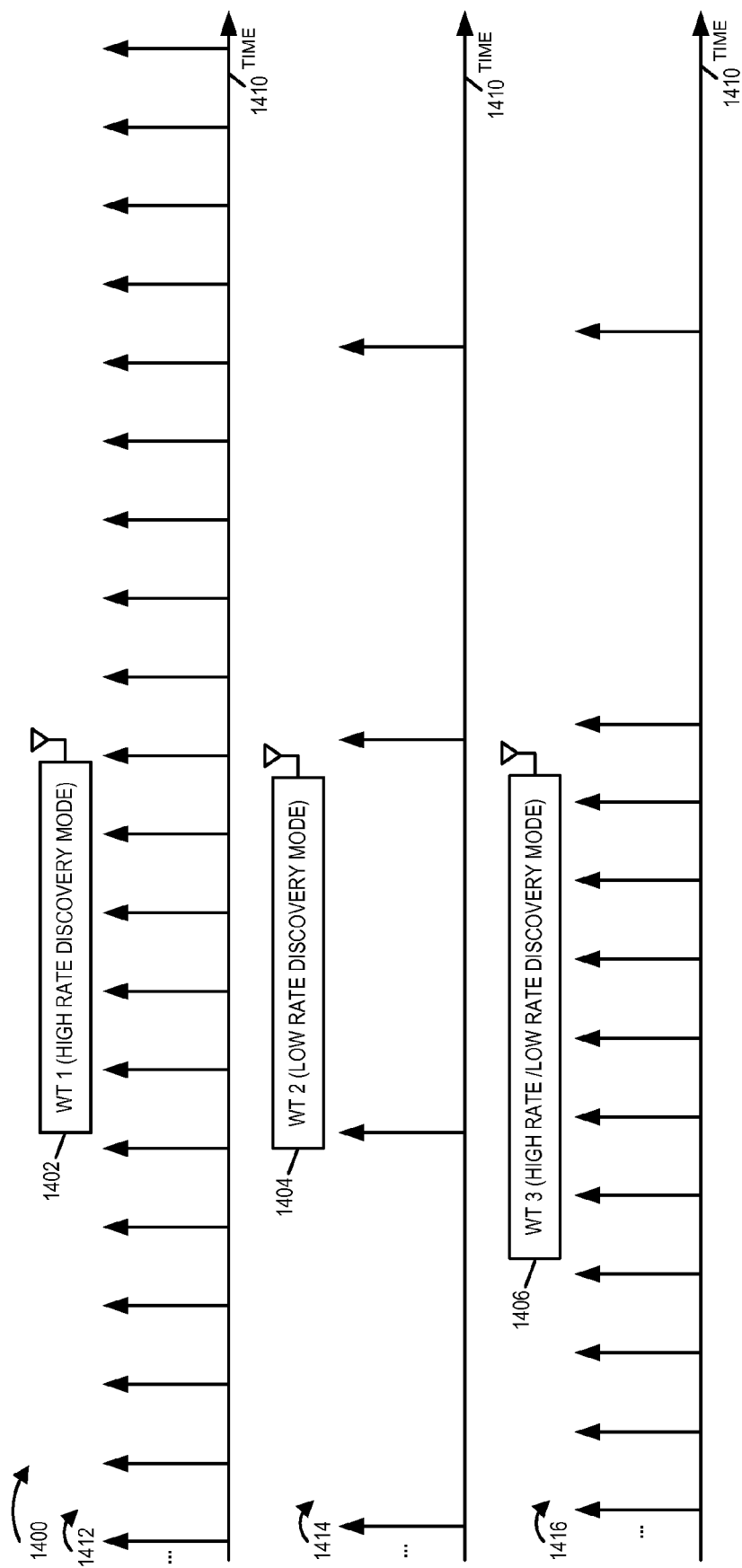
FIG. 14 is a drawing illustrating exemplary nodes in a peer to peer communications system and the transmission of discovery information at different rates.

FIG. 14 is a drawing 1400 illustrating exemplary nodes in a peer to peer communications system and the transmission of discovery information. The exemplary nodes are, e.g., any of the peer to peer communications devices (102, 104, 106, 108, 110) of FIG. 1. The exemplary nodes include a first wireless terminal 1402, e.g., a peer to peer mobile node, which is operating in a high rate discovery mode and which is transmitting discovery information at a high rate, as indicated by discovery signals 1412 being transmitted along time axis

1410. The exemplary nodes also include a second wireless terminal 1404, e.g., a second peer to peer mobile node, which is operating in a low rate discovery mode and which is transmitting discovery information at a low rate, as indicated by discovery signals 1414 being transmitted along time axis 1410. The exemplary nodes also include a third wireless terminal 1406, e.g., a third peer to peer mobile node, which is operating during a first time in a high rate discovery mode and is transmitting discovery information at a high rate, but then changes to operate in a low rate discovery mode and transmits discovery information at a low rate, as indicated by discovery signals 1416 being transmitted along time axis 1410. In some embodiments, at least some of the wireless terminals perform discovery information transmissions in one mode but not the other. In some embodiments, at least some of the wireless terminals are multi-mode with regard to the transmission of discovery information, e.g., transmitting at high rate at some times while transmitting at a low rate at other times.

Figure 15A:
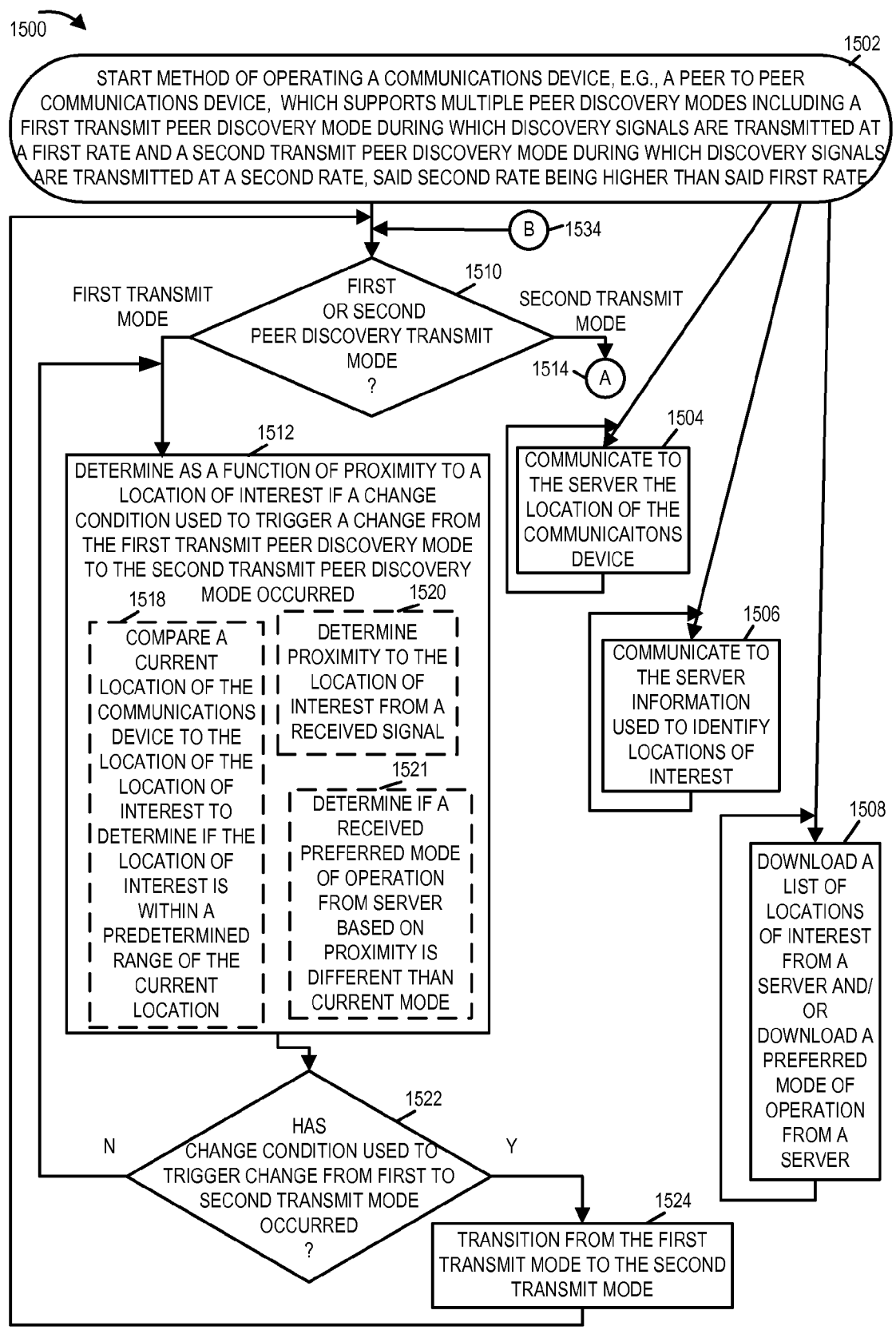
FIG. 15, comprising the combination of FIG. 15A and FIG. 15B, is a flowchart of an exemplary method of operating a communication device in accordance with an exemplary embodiment.

FIG. 15, comprising the combination of FIG. 15A and FIG. 15B is a flowchart 1500 of an exemplary method of operating a communications device, e.g., a peer to peer communications device, which supports multiple peer discovery modes in accordance with an exemplary embodiment. The multiple peer discovery modes include a first transmit peer discovery mode during which discovery signals are transmitted at a first rate and a second transmit peer discovery mode during which peer discovery signals are transmitted at a second rate, said second rate being higher than said first rate. Operation of the exemplary method starts in step 1502, where the communications device is powered on and initialized. In some embodiments, as part of the initialization the communications device is set into one of the first and second transmit peer discovery modes, e.g., the first transmit peer discovery mode. Operation proceeds from step 1502 to steps 1504, 1506, 1508 and 1510, which may be performed in parallel, in series or in a series/parallel combination.

In step 1504, which is performed on an ongoing basis, the communications device communicates to a server the location of the communications device. In some embodiments, the communications device, e.g., periodically, updates the server, e.g., once a half hour, and/or updates the server in response to a detected position change from the last reported position which has exceeded a limit, e.g., a predetermined limit. The communications device, in some embodiments, determines its location using a GPS, e.g. an embedded GPS. In some embodiments, the communications device may use another source to determine location information, e.g., a cell tower number, a building marker, a street address, a road marker, a received base station signal, an input from an operator, user, etc.

In step 1506, which is performed on an ongoing basis, the communications device communicates to the server information used to identify locations of interest. Communicated information used to identify locations of interest includes, e.g., one or more of the following: a name of a buddy, a type of business, a name of a business such as a name of a restaurant, a common interest, a name of a building or site, a name of a group, an application, a game, and a service.

In step 1508, which is performed on an ongoing basis, the communications device downloads a list of locations of interest from a server and/or downloads a preferred mode of operation from a server. The list of locations of interest may, and sometimes does include location of buddies, e.g., family members, friends, associates, group members. The list of locations of interest may, and sometimes does, include a location of a business, e.g. the location of a restaurant, the location of an ATM machine, the location of a store. The list of location of interest may, and sometimes does, include a location of a group meeting point, e.g., a mall, a library, a park area, a street corner. In some embodiments, the location of interest need not be static, e.g., the location of interest may a congregation site or waypoint which is updated and/or changed dynamically. In some embodiments, the downloaded locations are represented in GPS coordinates. In some embodiments, the downloaded locations are represented using a grid based coordinate system. In some embodiments, the downloaded preferred mode of operation from the server has been based on a proximity determination of the communications device with respect to a location of interest with the proximity determination being made by the server.

In some embodiments, the communications device need not get locations of interest from a server. For example, locations of interest can be, and sometimes are, pre pre-programmed in the communications device. In some embodiments, the operator of the communications device can, via user entry, tag a location or point, as a location of interest and store it in memory for future use, e.g., tag a home location, tag an office location. In some embodiments, the user of the communications device can also add and store time-tag information to be associated with a location of interest, e.g., a stored business site location is to be regarded as a location of interest during specified business hours of a workday. Historical information, e.g., position and/or time, corresponding to high rate peer discovery operations, can be stored and used to tag, define and/or quality a point of interest.

In some embodiments, step 1508 is performed periodically on an ongoing basis. In some other embodiments, step 1508 is performed in response to an event and/or following a request.

In step 1510, the communications device determines whether it is currently set to the first transmit peer discovery mode or the second transmit peer discovery mode and proceeds differently depending upon the current mode setting. If the communications device is in the first transmit peer discovery mode, then operation proceeds from step 1510 to step 1512. However, if the communications device is in the second transmit peer discovery mode, then operation proceeds from step 1510 via connecting node A 1514 to step 1516.

Returning to step 1512, in step 1512 the communications device determines as a function of proximity to a location of interest if a change condition used to trigger a change from the first transmit peer discovery mode to the second transmit peer discovery mode has occurred. The location of interest, at times, corresponds to a location of another communications device. The location of interest may, and sometimes is, a location included in the list of downloaded locations of interest. The location of interest may be, and sometimes is, a stored location of interest. For example, the stored location is one of a home location and an office location corresponding to a user of said communications device. In some embodiments, the change condition determination of step 1512 is also performed as a function of temporal information. For example, a change condition trigger may include a combination of location and time, e.g., an office location designated as a location of interest during a predetermined time interval of a business day.

In various embodiments, step 1512 includes one or more of sub-steps 1518, 1520 and 1521. In sub-step 1518 the communications device compares a current location of the communications device to the location of interest to determine if the location of interest is within a predetermined range of the current location. In sub-step 1520 the communications device determines proximity to the location of interest from a received signal. In some embodiments, for at least some locations of interest the received signal is transmitted from the location of interest. In some embodiments, for at least some locations of interest the received signal is transmitted from a location having a known position relative to the location of interest. In sub-step 1521 the communications device determines if a received preferred mode of operation communicated from the server via a received signal is different than the current mode of operation.

Operation proceeds from step 1512 to step 1522. In step 1522 the communications device proceeds based on the determination of step 1512. If the determination of step 1512 is that a change condition used to trigger a change from the first transmit peer discovery mode to the second transmit peer discovery mode has not occurred, then operation proceeds from step 1522 to step 1512. However, if the determination of step 1512 is that a change condition used to trigger a change from the first transmit peer discovery mode to the second transmit peer discovery mode has occurred, then operation proceeds from step 1522 to step 1524. In step 1524 the communications device transitions from the first transmit peer discovery mode to the second transmit peer discovery mode. Operation proceeds from step 1524 to step 1510.

Returning to step 1516, in step 1516 the communications device determines if a change condition used to trigger a transition from the second transmit peer discovery mode to the first transmit peer discovery mode has occurred. In some embodiments, step 1516 includes one or more of sub-steps 1526, 1528 and 1529. In step 1526 the communications device determines if the communications device is outside a second range of the location of interest. In some embodiments, the second range used in determining switching from the second transmit peer discovery mode to the first transmit peer discovery mode is different from a first range used to determine whether to switch into the second transmit peer discovery mode. In sub-step 1528 the communications device determines if the received signal which caused the transition into the second transmit peer discovery mode is no longer being detected or is below a predetermined threshold. In sub-step 1529 the communications device determines if a received preferred mode of operation from a server is different from the current mode of operation, where the received preferred mode of operation is based on a proximity determination performed by the server. In some embodiments, temporal information is used in the determination of step 1516. Operation proceeds from step 1516 to step 1530.

In step 1530 the communications device proceeds based on the determination of step 1516. If the determination of step 1516 is that a change condition used to trigger a change from the second transmit peer discovery mode to the first transmit peer discovery mode has not occurred, then operation proceeds from step 1530 to step 1516. However, if the determination of step 1516 is that a change condition used to trigger a change from the second transmit peer discovery mode to the first transmit peer discovery mode has occurred, then operation proceeds from step 1530 to step 1532. In step 1532 the communications device transitions from the second transmit peer discovery mode to the first transmit peer discovery mode. Operation proceeds from step 1532 via connecting node B 1534 to step 1510.

In some embodiments, the first rate is zero and the second rate is a non-zero rate. In some other embodiments the first and second rates are both non-zero rates which are different. In some embodiments, the communications device supports three peer discovery transmit rates including a zero rate and two non-zero rates.

Figure 16:
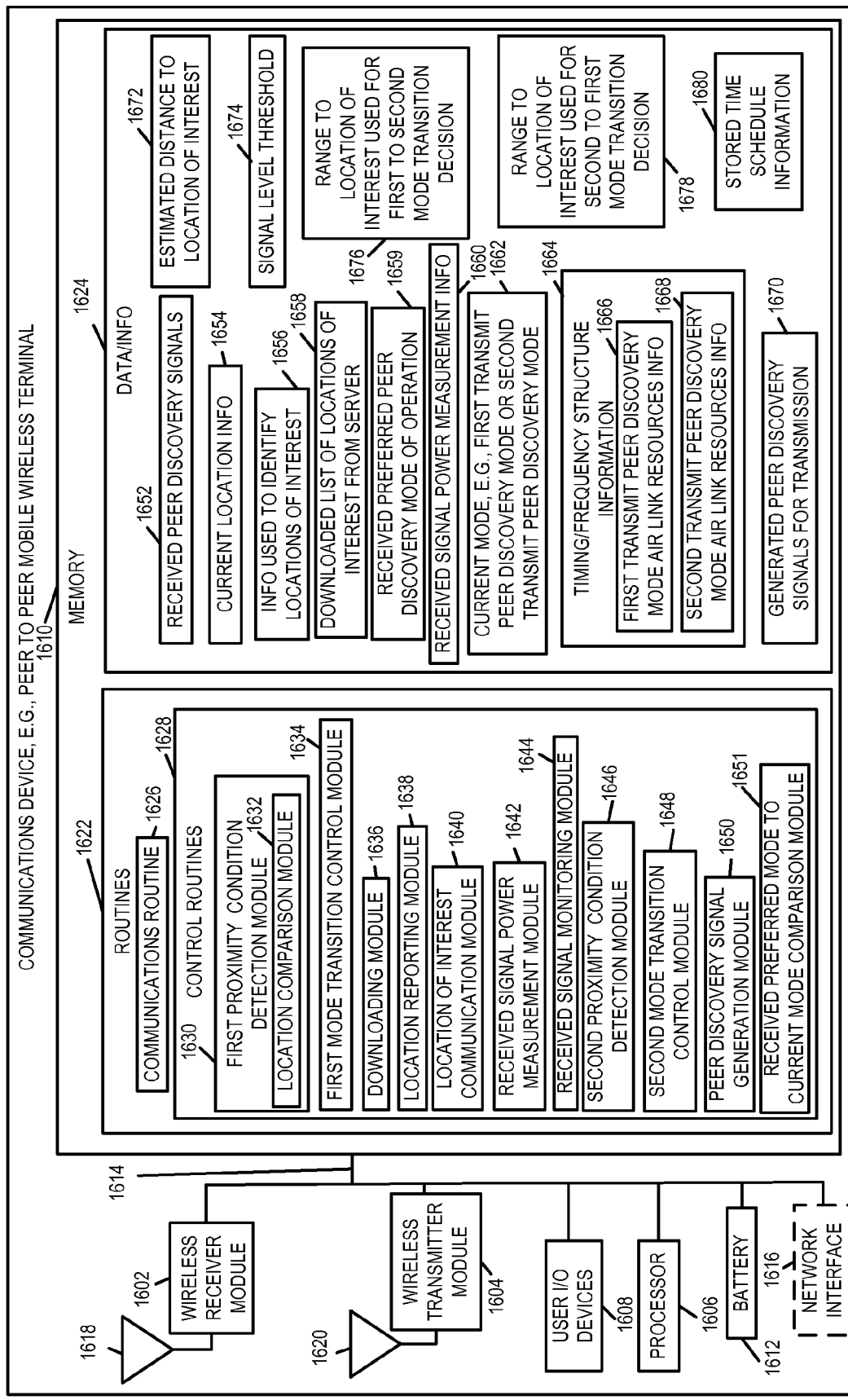
FIG. 16 is a drawing of an exemplary communications device, e.g., a peer to peer mobile wireless terminal, which supports a first transmit peer discovery mode and a second transmit peer discovery mode in accordance with an exemplary embodiment.

FIG. 16 is a drawing of an exemplary communications device 1600, e.g., a peer to peer mobile wireless terminal in accordance with an exemplary embodiment. Exemplary communications device 1600 is, e.g., one of communications devices 102, 104, 106, 108, 110 of FIG. 1. Communications device 1600 supports multiple peer discovery modes including a first transmit peer discovery mode during which peer discovery signals are transmitted at a first rate and a second transmit peer discovery mode during which peer discovery signals are transmitted at a second rate, said second rate being higher than said first rate.

Communications device 1600 includes a wireless receiver module 1602, a wireless transmitter module 1604, a processor 1606, user I/O devices 1608, a battery 1612, and a memory 1610 coupled together via a bus 1614 over which the various elements may interchange data and information. Bus 1614 includes a power distribution portion and a data signaling portion. Memory 1610 includes routines 1622 and data/information 1624. The processor 1606, e.g., a CPU, executes the routines 1622 and uses the data/information 1624 in memory 1610 to control the operation of the communications device 1600 and implement methods, e.g., the method of flowchart 1500 of FIG. 15.

Wireless receiver module 1602, e.g., an OFDM or CDMA receiver, is coupled to receive antenna 1618 via which the communications device 1600 receives signals over the airlink. Received signals include peer discovery signals, peer to peer traffic signals, lists of locations of interest, and signals indicating a preferred mode of operation. Received peer discovery signals 1652, downloaded list 1658 and received preferred peer discovery mode of operation 1659 have been received via wireless communications module 1602.

Wireless transmitter module 1604, e.g., an OFDM or CDMA transmitter, is coupled to transmit antenna 1620 via which the communications device 1600 transmits signals to other devices. Transmitted signals include peer discovery signals, signals conveying the current location information of device 1600, and signals conveying information used to identify locations of interest.

User I/O devices 1608 include, e.g., microphone, keyboard, keypad, switches, camera, speaker, display, etc. User I/O devices 1608 allow a user of communications device 1600 to input data/information, access output data/information, and control at least some functions of the communications device. Inputs received via user I/O devices 1608 include, e.g., position information of communications device 1600, position information of locations of interest, information used to derive the current location of communications device 1600 such as a street address or landmark information, information used to identify a location of interest, e.g., a buddy name, a business name, a landmark, a street address, a type of business, an application of interest, a service of interest, a group, an organization, a business, a game designation, etc.

Battery 1612 is used, at times to power communications device 1600. Supporting multiple peer discovery modes facilitates the implementation of methods and apparatus to efficiently use stored battery energy with regard to peer discovery operations, thus allowing increased operational duration between battery recharges.

In some embodiments, communications device 1600 also includes network interface 1616, which allows communications device to be coupled to other network nodes and/or the Internet via a wired backhaul network.

Routines 1622 includes a communications routine 1626 and control routines 1628. The communications routine 1626 implements the various communications protocols used by the communications device 1600. Control routines 1628 includes a first proximity condition detection module 1630, a first mode transition control module 1634, a downloading module 1636, a location reporting module 1638, a location of interest communications module 1640, a received signal power measurement module 1642, a received signal monitoring module 1644, a second proximity condition detection module 1646, a second mode transition control module, and a peer discovery signal generation module 1650, and a preferred mode to current mode comparison module 1651. First proximity condition detection module 1630 includes a location comparison module 1632.

Data/information 1624 includes received peer discovery signals 1652, current location information 1654, information used to identify locations of interest 1656, a downloaded list of locations of interest from a server 1658, received preferred peer discovery mode of operation 1659, received signal power measurement information 1660, a current mode 1662, timing/frequency structure information 1664, an estimated distance to a location of interest 1672, signal level threshold information 1674, range to location of interest information used for first to second mode transition decision 1676, range to location of interest information used for second to first mode transition decision 1678, stored time schedule information 1680, and generated peer discovery signals for transmission 1670.

First proximity condition detection module 1630 is configured to determine if a proximity based change condition used to trigger a change from the first transmit peer discovery mode to second transmit peer discovery mode has occurred, while the communications device 1600 is in the first transmit peer discovery mode of operation. First mode transition control module 1634 controls the communications device 1600 to transition from the first transmit peer discovery mode to second transmit peer discovery mode when the first proximity condition detection module 1630 detects that a proximity based change condition has occurred. The proximity based is, e.g., with respect to a location of interest. The location of interest may, and sometimes does correspond to a location of another communications device, which may be a fixed site communications device or a mobile communications device.

Location comparison module 1632 is configured to compare a current location of said communications device to a location of a location of interest to determine if the location of interest is within a predetermined range of the current location. Location comparison module uses current location information 1654 and location of interest information from downloaded list 1658 and range to location of interest information used for first to second mode transition decision 1676 to perform the comparison.

Downloading module 1636, in some embodiments, is configured to download a list of locations of interest from a server. Information 1658 is such a list which has been downloaded by downloading module 1636. The list of locations of interest may, and sometimes does, include locations of buddies. The list of locations of interest may, and sometimes does, include a location of a business. The list of locations of interest may, and sometimes does, include a location of a group meeting point.

Downloading module 1636, in some embodiments, is configured to download a preferred mode of operation. Received preferred mode of operation 1659, e.g., indicating one of a first transmit peer discovery mode and a second transmit peer discovery mode, has been downloaded by downloading module 1636.

Location reporting module 1638 is configured to communicate to a server the location of communications device 1600 and/or information used to derive the location of communications device 1600, e.g., GPS coordinate information, UTM coordinate information, a street address, landmark identification information, a zip code, etc. Location of interest communication module 1640 is configured to communicate to a server information used to identify a location of interest. Such information includes, e.g., a name of a buddy, a type of business, a name of a restaurant, a common interest, a service, etc.

Received signal power measurement module 1642 measures the power of a received signal, the received signal being transmitted from a position having a known position relationship to a location of interest. The position relationship may be such that the signal is transmitted from the location of interest. The position relationship may be such that the signal is transmitted from a predetermined known offset from the location of interest. In some embodiments, the received signal is a beacon signal, e.g., an OFDM beacon signal having a high power concentration on one or a few tones. In some embodiments, the received signal is a beacon signal from a peer device. In some embodiments, the received signal is a received peer discovery signal. In various embodiments, the first proximity condition detection module 1630 is configured to estimate the distance from the location of interest from the power of the received signal. Received signal power measurement information 1660 is an output of module 1642 which is used by first proximity condition detection module 1630 to determine estimated distance to location 1672.

Received signal monitoring module 1644 is configured to determine when a received signal which caused a transition into the second transmit peer discovery mode is no longer detected or is below a predetermined threshold, e.g., a threshold included in signal level threshold information 1674.

Second mode transition control module 1648 is configured to control the communications device to switch from the second transmit peer discovery mode to the first transmit peer discovery mode when the received signal monitoring module 1644 determines that the signal which caused transition into the second transmit peer discovery mode is no longer detected or is below a predetermined threshold.

Second proximity condition detection module 1646 is configured to determine if a proximity based change condition used to trigger a change from the second transmit peer discovery mode to the first transmit peer discovery mode occurred, while the communications device 1600 is in the second transmit peer discovery mode of operation. In some embodiments, determining if a proximity based change condition used to trigger a change from the second transmit peer discovery mode to the first transmit peer discovery mode includes determining if the communications device 1600 is outside a second range of said location of interest, the second range being different from a first range used to determine whether to switch into the second transmit peer discovery mode. Second mode transition control module 1648 controls the communications device 1600 to transition from the second transmit peer discovery mode to the first transmit peer discovery mode when the second proximity condition detection module 1646 detects that a proximity based change condition used to trigger a change from the second transmit peer discovery mode to the first transmit peer discovery mode has occurred.

Peer discovery signal generation module 1650 generates peer discovery signals 1670 to be transmitted by wireless transmitter module 1604. The generated peer discovery signals 1670 are transmitted at the first rate, e.g., low rate, when in the first transmit peer discovery mode as identified by current mode 1662 using first transmit peer discovery mode air link resources, e.g., peer discovery segments, identified by information 1666 and corresponding to a device identifier currently associated with the communications device 1600. The generated peer discovery signals 1670 are transmitted at the second rate, e.g., high rate, when in the second transmit peer discovery mode as identified by current mode 1662 using second transmit peer discovery mode air link resources, e.g., peer discovery segments, identified by information 1668 and corresponding to a device identifier currently associated with communications device 1600.

Preferred mode to current mode comparison module 1651 compares a received preferred peer discovery mode of operation to a current mode of operation of communication device 1600. The determination of the comparison of module 1651 is forwarded to the first proximity condition detection module 1630 and/or the second proximity condition detection module 1646, where it can be, and sometimes is, utilized to determine if a change condition has occurred to trigger a mode change.

Stored time schedule information 1680 includes time information which may be used in addition to or in place of location information in determining if a transition from a first transmit peer discovery mode to a second peer discovery mode should occur and/or if a transition from a second transmit peer discovery mode to a first transmit peer discovery mode should occur. For example, such information may be used by first proximity condition detection module. For example, stored time schedule information 1680 may include information correlating a window of time in which a set of buddies or locations of interest are to be considered when making a mode change determination. For example, the proximity of certain business associates may be of interest during certain business hours of work days but not during other times. As another example, the proximity of a member of a group may be of interest during a time interval designated for a group meeting or gathering but not during other times. Stored time schedule information 1680 may be input via the user interface and/or may be downloaded.

In some embodiments, the first rate is zero and the second rate is a non-zero rate. In some other embodiments the first and second rates are both non-zero rates which are different. In some embodiments, the communications device 1600 supports three peer discovery transmit rates including a zero rate and two non-zero rates.

Figure 17A:
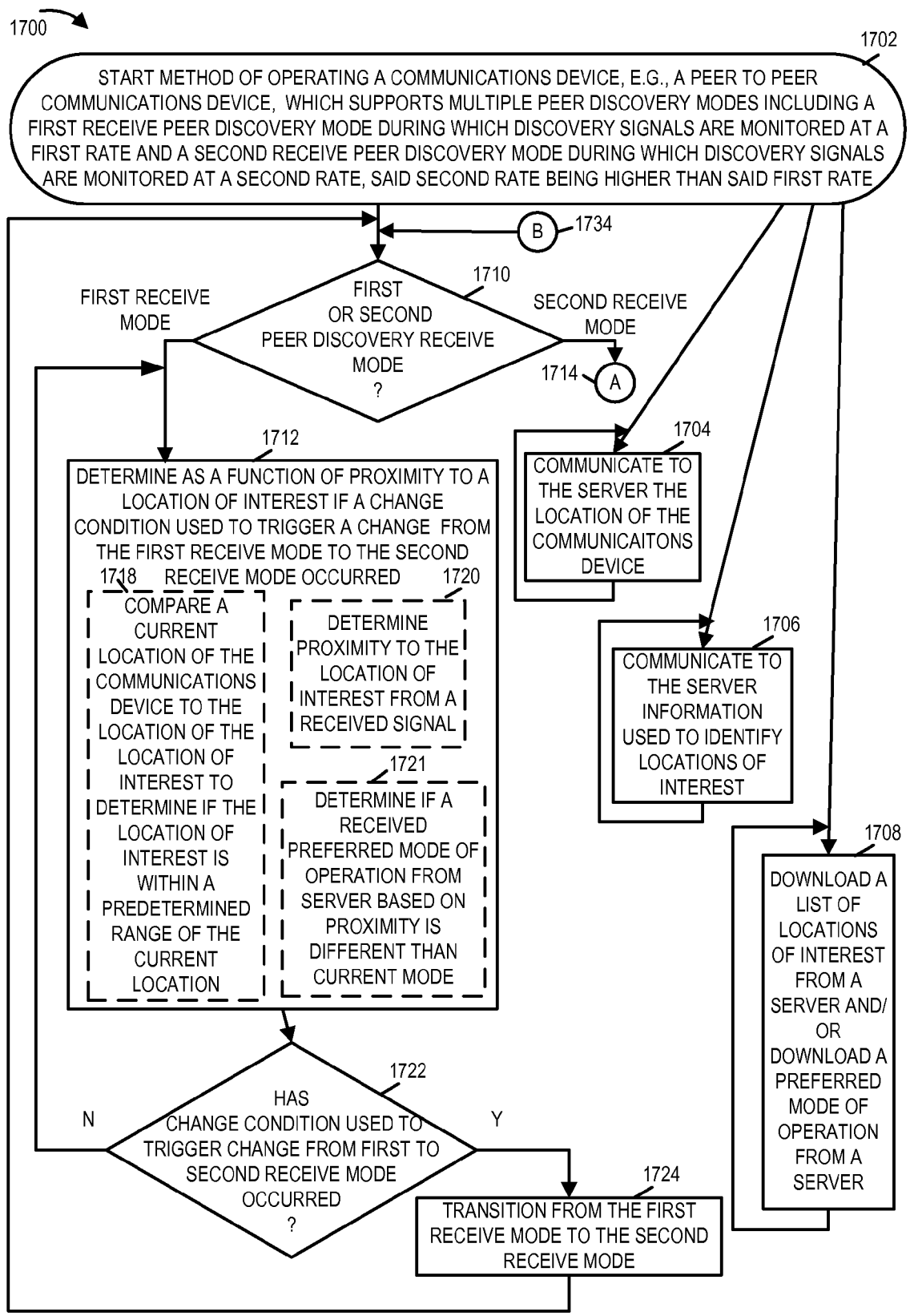
FIG. 17, comprising the combination of FIG. 17A and FIG. 17B, is a flowchart of an exemplary method of operating a communication device in accordance with an exemplary embodiment.

FIG. 17, comprising the combination of FIG. 17A and FIG. 17B is a flowchart 1700 of an exemplary method of operating a communications device, e.g., a peer to peer communications device, which supports multiple peer discovery modes in accordance with an exemplary embodiment. The multiple peer discovery mode include a first receive peer discovery mode during which discovery signals are monitored at a first rate and a second receive peer discovery mode during which peer discovery signals are monitored at a second rate, said second rate being higher than said first rate. Operation of the exemplary method starts in step 1702, where the communications device is powered on and initialized. In some embodiments, as part of the initialization the communications device is set into one of the first and second receive peer discovery modes, e.g., the first receive peer discovery mode. Operation proceeds from step 1702 to steps 1704, 1706, 1708 and 1710, which may be performed in parallel, in series or in a series/parallel combination.

In step 1704, which is performed in an ongoing basis, the communications device communicates to a server the location of the communications device. In step 1706, which is performed on an ongoing basis, the communications device communicates to the server information used to identify locations of interest. Communicated information used to identify locations of interest includes, e.g., one or more of the following: a name of a buddy, a type of business, a name of a business such as a name of a restaurant, a name of a building or site, a name of a group or association, a common interest, and a service. In step 1708, which is performed on an ongoing basis, the communications device downloads a list of locations of interest from a server and/or downloads a preferred mode of operation from a server. The list of locations of interest may, and sometimes does include location of buddies. The list of locations of interest may, and sometimes does, include a location of a business. The list of location of interest may, and sometimes does, include a location of a group meeting point. In some embodiments, the downloaded preferred mode of operation from the server has been based in a proximity determination of the communications device with respect to a location of interest with the proximity determination being made by the server. In some embodiments, step 1708 is performed periodically on an ongoing basis. In some other embodiments, step 1708 is performed in response to an event and/or following a request.

In step 1710, the communications device determines whether it is currently set to the first receive peer discovery mode or the second receive peer discovery mode and proceeds differently depending upon the current mode setting. If the communications device is in the first receive peer discovery mode, then operation proceeds from step 1710 to step 1712. However, if the communications device is in the second receive peer discovery mode, then operation proceeds from step 1710 via connecting node A 1714 to step 1716.

Returning to step 1712, in step 1712 the communications device determines as a function of proximity to a location of interest if a change condition used to trigger a change from the first receive peer discovery mode to the second receive peer discovery mode has occurred. The location of interest, at times, corresponds to a location of another communications device. The location of interest may, and sometimes is, a location included in the list of downloaded locations of interest. The location of interest may be, and sometimes is, a stored location of interest. For example, the stored location is one of a home location and an office location corresponding to a user of said communications device. In some embodiments, the change condition determination of step 1712 is also performed as a function of temporal information. For example, for a change condition trigger may include a combination of location proximity criteria and time criteria, e.g., proximity to an office location designated as a location of interest occurring during a predetermined time interval of a business day.

In various embodiments, step 1712 includes one or more of sub-steps 1718, 1720 and 1721. In sub-step 1718 the communications device compares a current location of the communications device to the location of the location of interest to determine if the location of interest is within a predetermined range of the current location. In sub-step 1720 the communications device determines proximity to the location of interest from a received signal. In some embodiments, for at least some locations of interest the received signal is transmitted from the location of interest. In some embodiments, for at least some locations of interest the received signal is transmitted from a location having a known position relative to the location of interest. In sub-step 1721 the communications device determines if a received preferred mode of operation communicated from the server via a received signal is different than the current mode of operation.

Operation proceeds from step 1712 to step 1722. In step 1722 the communications device proceeds based on the determination of step 1712. If the determination of step 1712 is that a change condition used to trigger a change from the first receive peer discovery mode to the second receive peer discovery mode has not occurred, then operation proceeds from step 1722 to step 1712. However, if the determination of step 1712 is that a change condition used to trigger a change from the first receive peer discovery mode to the second receive peer discovery mode has occurred, then operation proceeds from step 1722 to step 1724. In step 1724 the communications device transitions from the first receive peer discovery mode to the second receive peer discovery mode. Operation proceeds from step 1724 to step 1710.

Returning to step 1716, in step 1716 the communications device determines if a change condition used to trigger a transition from the second receive peer discovery mode to the first receive peer discovery mode has occurred. In some embodiments, step 1716 includes one or more of sub-steps 1726, 1728 and 1729. In step 1726 the communications device determines if the communications device is outside a second range of the location of interest. In some embodiments said second range used in determining whether or not to transition from the second receive peer discovery mode to the first receive peer discovery mode is different from a first range used in determining whether to switch into the second receive peer discovery mode. In sub-step 1728 the communications device determines if the received signal which caused the transition into the second receive peer discovery mode is no longer being detected or is below a predetermined threshold. In sub-step 1729 the communications device determines if a received preferred mode of operation from a server is different from the current mode of operation, where the received preferred mode of operation is based on a proximity determination performed by the server. In some embodiments, temporal information is used in the determination of step 1716. Operation proceeds from step 1716 to step 1730.

In step 1730 the communications device proceeds based on the determination of step 1716. If the determination of step 1716 is that a change condition used to trigger a change from the second receive peer discovery mode to the first receive peer discovery mode has not occurred, then operation proceeds from step 1730 to step 1716. However, if the determination of step 1716 is that a change condition used to trigger a change from the second receive peer discovery mode to the first receive peer discovery mode has occurred, then operation proceeds from step 1730 to step 1732. In step 1732 the communications device transitions from the second receive peer discovery mode to the first receive peer discovery mode. Operation proceeds from step 1732 via connecting node B 1734 to step 1710.

In some embodiments, the first rate is zero and the second rate is a non-zero rate. In some other embodiments the first and second rates are both non-zero rates which are different. In some embodiments, the communications device supports three peer discovery monitoring rates including a zero rate and two non-zero rates.

Figure 18:
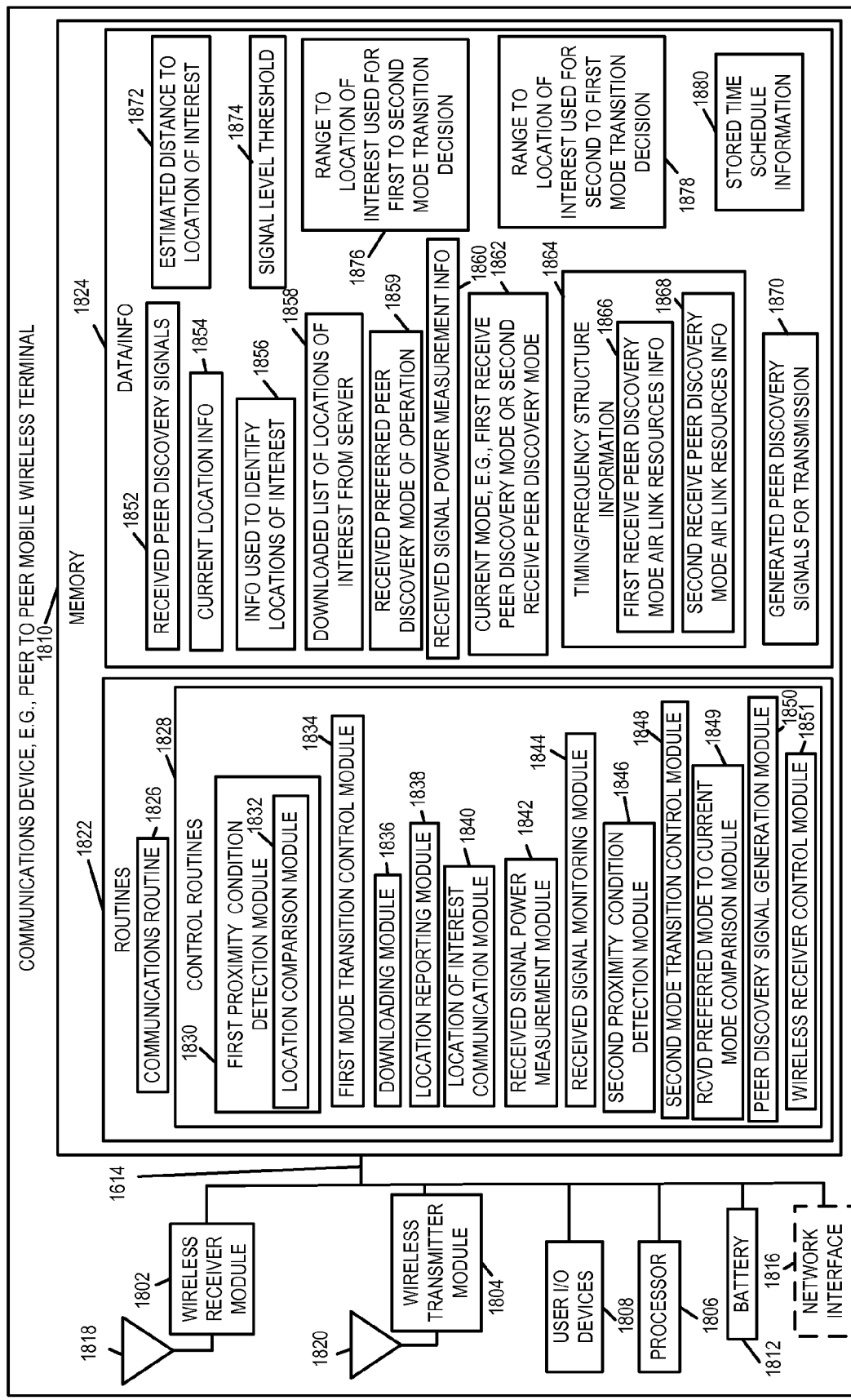
FIG. 18 is a drawing of an exemplary communications device, e.g., a peer to peer mobile wireless terminal, which supports a first receive peer discovery mode and a second receive peer discovery mode in accordance with an exemplary embodiment.

FIG. 18 is a drawing of an exemplary communications device 1800, e.g., a peer to peer mobile wireless terminal in accordance with an exemplary embodiment. Exemplary communications device 1800 is, e.g., one of communications devices 102, 104, 106, 108, 110 of FIG. 1. Communications device 1800 supports multiple peer discovery modes including a first receive peer discovery mode during which peer discovery signals are monitored at a first rate and a second receive peer discovery mode during which peer discovery signals are monitored at a second rate, said second rate being higher than said first rate.

Communications device 1800 includes a wireless receiver module 1802, a wireless transmitter module 1804, a processor 1806, user I/O devices 1808, a battery 1812, and a memory 1810 coupled together via a bus 1814 over which the various elements may interchange data and information. Bus 1814 includes a power distribution portion and a data signaling portion. Memory 1810 includes routines 1822 and data/information 1824. The processor 1806, e.g., a CPU, executes the routines 1822 and uses the data/information 1824 in memory 1810 to control the operation of the communications device 1800 and implement methods, e.g., the method of flowchart 1700 of FIG. 17.

Wireless receiver module 1802, e.g., an OFDM or CDMA receiver, is coupled to receive antenna 1818 via which the communications device 1800 receives signals over the airlink. Received signals include peer discovery signals, peer to peer traffic signals, lists of locations of interest, and signals indicating a preferred mode of operation. Received peer discovery signals 1852, downloaded list 1858 and received preferred peer discovery mode of operation 1859 have been received via wireless communications module 1802.

Wireless transmitter module 1804, e.g., an OFDM or CDMA transmitter, is coupled to transmit antenna 1820 via which the communications device 1800 transmits signals to other devices. Transmitted signals include peer discovery signals, signals conveying the current location information of device 1800, and signals conveying information used to identify locations of interest.

User I/O devices 1808 include, e.g., microphone, keyboard, keypad, switches, camera, speaker, display, etc. User I/O devices 1808 allow a user of communications device 1800 to input data/information, access output data/information, and control at least some functions of the communications device. Inputs received via user I/O devices 1808 include, e.g., position information of communications device 1800, position information of locations of interest, information used to derive the current location of communications device 1800 such as a street address or landmark information, information used to identify a location of interest, e.g., a buddy name, a business name, a landmark, a street address, a type of business, an application of interest, a service of interest, a group, an organization, a business, a game designation, etc.

Battery 1812 is used, at times to power communications device 1800. Supporting multiple peer discovery modes facilitates the implementation of methods and apparatus to efficiently use stored battery energy with regard to peer discovery operations, thus allowing increased operational duration between battery recharges.

In some embodiments, communications device 1800 also includes network interface 1816, which allows communications device to be coupled to other network nodes and/or the Internet via a wired backhaul network.

Routines 1822 includes a communications routine 1826 and control routines 1828. The communications routine 1826 implements the various communications protocols used by the communications device 1800. Control routines 1828 includes a first proximity condition detection module 1830, a first mode transition control module 1834, a downloading module 1836, a location reporting module 1838, a location of interest module 1840, a received signal power measurement module 1842, a received signal monitoring module 1844, a second proximity condition detection module 1846, a second mode transition control module 1848, a peer discovery signal generation module 1850, a wireless receiver control module 1851, and a received preferred mode to current mode comparison module 1849. First proximity condition detection module 1830 includes a location comparison module 1832.

Data/information 1824 includes received peer discovery signals 1852, current location information 1854, information used to identify locations of interest 1856, a downloaded list of locations of interest from a server 1858, received preferred peer discovery mode of operation 1859, received signal power measurement information 1860, a current mode 1862, timing/frequency structure information 1864, an estimated distance to a location of interest 1872, signal level threshold information 1874, range to location of interest information used for first to second mode transition decision 1876, range to location of interest information used for second to first mode transition decision 1878, stored time schedule information 1880, and generated peer discovery signals for transmission 1870.

First proximity condition detection module 1830 is configured to determine if a proximity based change condition used to trigger a change from the first receive peer discovery mode to second receive peer discovery mode has occurred, while the communications device 1800 is in the first receive peer discovery mode of operation. First mode transition control module 1834 controls the communications device 1800 to transition from the first receive peer discovery mode to second receive peer discovery mode when the first proximity condition detection module 1830 detects that a proximity based change condition has occurred. The proximity is, e.g., with respect to a location of interest. The location of interest may, and sometimes does correspond to a location of another communications device, which may be a fixed site communications device or a mobile communications device.

Location comparison module 1832 is configured to compare a current location of said communications device to a location of a location of interest to determine if the location of interest is within a predetermined range of the current location. Location comparison module 1832 uses current location information 1854 and location of interest information from downloaded list 1858 and range to location of interest information used for first to second mode transition decision 1876, e.g., a trigger criteria, to perform the comparison and make a determination.

Downloading module 1836, in some embodiments, is configured to download a list of locations of interest from a server. Information 1858 is such a list which has been downloaded by downloading module 1836. The list of locations of interest may, and sometimes does, include locations of buddies. The list of locations of interest may, and sometimes does, include a location of a business. The list of locations of interest may, and sometimes does, include a location of a group meeting point.

Downloading module 1836, in some embodiments, is configured to download a preferred mode of operation. Received preferred mode of operation 1859, e.g., indicating one of a first receive peer discovery mode and a second receive peer discovery mode, has been downloaded by downloading module 1836.

Location reporting module 1838 is configured to communicate to a server the location of communications device 1800 and/or information used to derive the location of communications device 1800, e.g., GPS coordinate information, UTM coordinate information, a street address, landmark identification information, a zip code, etc. Location of interest communication module 1840 is configured to communicate to a server information used to identify locations of interest. Such information includes, e.g., a name of a buddy, a type of business, a name of a restaurant, a common interest, a service, etc.

Received signal power measurement module 1842 measures the power of a received signal, the received signal being transmitted from a position having a known position relationship to a location of interest. The position relationship may be such that the signal is transmitted from the location of interest. The position relationship may be such that the signal is transmitted from a predetermined known offset from the location of interest. In some embodiments, the received signal is a beacon signal, e.g., an OFDM beacon signal having a high power concentration on one or a few tones. In some embodiments, the received signal is a beacon signal from a peer device. In some embodiments, the received signal is a received peer discovery signal. In various embodiments, the first proximity condition detection module 1830 is configured to estimate the distance from the location of interest from the power of the received signal. Received signal power measurement information 1860 is an output of module 1842 which is used by first proximity condition detection module 1830 to determined estimate distance to location 1872.

Received signal monitoring module 1844 is configured to determine when a received signal which caused a transition into the second receive peer discovery mode is no longer detected or is below a predetermined threshold, e.g., a threshold included in signal level threshold information 1874.

Second mode transition control module 1848 is configured to control the communications device to switch from the second receive peer discovery mode to the first receive peer discovery mode when the received signal monitoring module 1844 determines that the signal which caused transition into the second receive peer discovery mode is no longer detected or is below a predetermined threshold.

Second proximity condition detection module 1846 is configured to determine if a proximity based change condition used to trigger a change from the second receive peer discovery mode to the first receive peer discovery mode occurred, while the communications device 1800 is in the second receive peer discovery mode of operation. In some embodiments, determining if a proximity based change condition used to trigger a change from the second receive peer discovery mode to the first receive peer discovery mode includes determining if the communications device 1800 is outside a second range of said location of interest, the second range being different form a first range used to determine whether to switch into the second receive peer discovery mode. Second mode transition control module 1848 controls the communications device 1800 to transition from the second receive peer discovery mode to the first receive peer discovery mode when the second proximity condition detection module 1846 detects that a proximity based change condition used to trigger a change from the second receive peer discovery mode to the first receive peer discovery mode has occurred.

Peer discovery signal generation module 1850 generates peer discovery signals 1870 to be transmitted by wireless transmitter module 1804. Wireless receiver control module 1651 controls the wireless receiver module 1802 to monitor for discovery signals at a first rate, e.g., a low rate, when the current mode 1862 indicates that the communications device 1800 is operating in the first receive peer discovery mode using the air link resources, e.g., segments, identified by first receive peer discovery mode air link resource information 1866. Wireless receiver control module 1851 controls the wireless receiver module 1802 to monitor for discovery signals at a second rate, e.g., a high rate, when the current mode 1862 indicates that the communications device 1800 is operating in the second receive peer discovery mode using the air link resources, e.g., segments, identified by second receive peer discovery mode air link resource information 1868. Wireless receiver control module 1851, in some embodiments, controls the wireless receiver module 1802 to consume less average power while in the first receive peer discovery mode than while in the second receive peer discovery mode, thus conserving battery power, e.g., by shutting down some receiver functionality in the first receive peer discovery mode when not monitoring during the additional discovery intervals associated with the second receive peer discovery mode.

Received preferred mode to current mode comparison module 1849 compares a received preferred mode of operation to a current mode of operation of the communications device 1800. The determination of the comparison of module 1849 is forwarded to the first proximity condition detection module 1830 and/or the second proximity condition detection module 1846, where it can be, and sometimes is, utilized to determine if a change condition has occurred to trigger a mode change.

Stored time schedule information 1880 includes time information which may be used in addition to or in place of location information in determining if a transition from a first receive peer discovery mode to a second receive peer discovery mode should occur and/or if a transition from a second receive peer discovery mode to a first receive peer discovery mode should occur. For example, such information may be used by first proximity condition detection module 1830. For example, stored time schedule information 1880 may include information correlating a window of time in which a set of buddies or locations of interest are to be considered when making a mode change determination. For example, the proximity of certain business associates may be of interest during certain business hours of work days but not during other times. As another example, the proximity of a member of a group may be of interest during a time interval designated for a group meeting but not during other times. Stored time schedule information 1880 may be input via the user interface and/or may be downloaded.

In some embodiments, the first rate is zero and the second rate is a non-zero rate. In some other embodiments the first and second rates are both non-zero rates which are different. In some embodiments, the communications device 1800 supports three peer discovery monitoring rates including a zero rate and two non-zero rates.

Figure 19:
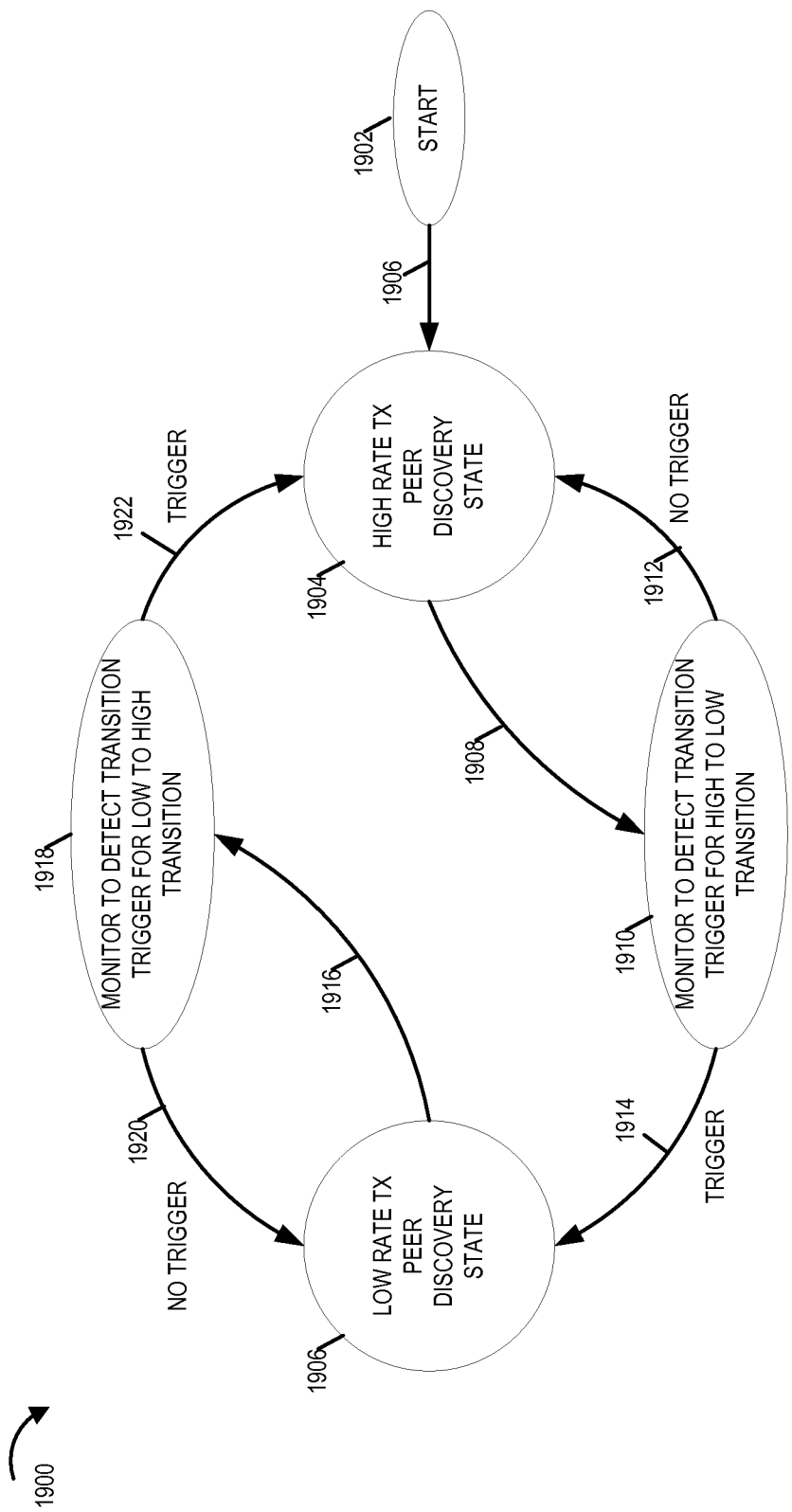
FIG. 19 is a drawing illustrating exemplary operations in a communications device supporting a high rate peer discovery transmit mode and a low rate peer discovery transmit mode in accordance with an exemplary embodiment.

FIG. 19 is a drawing 1900 illustrating exemplary operations in a communications device supporting a high rate peer discovery transmit mode and a low rate peer discovery transmit mode in accordance with an exemplary embodiment. Drawing 1900 may correspond to flowchart 1500 of FIG. 15 and/or communications device 1600 of FIG. 16.

Operation of the communications device starts in start step 1902, where the communications device is powered on an initialized. In this embodiment, following power on, the communications device is set into the high rate transmit peer discovery state 1904, as indicated by arrow 1906. While in the high rate transmit peer discovery state 1904, the communications device transmits discovery information signals conveying discovery information portions at a high rate. While in the high rate TX peer discovery state 1904, the communications device also, on an ongoing basis, performs monitoring to detect a transition trigger for a high to low transition as indicated by arrow 1908 and operation 1910. Some exemplary transition triggers are described with respect to block 1516 of flowchart 1500 of FIG. 15. If the monitoring of operation 1910 does not detect a trigger, then the communications device continues in high rate TX peer discovery state 1904 as indicated by arrow 1912. However, if the monitoring of operation 1910 does detect a trigger, then the communications device transitions to the low rate TX peer discovery state 1906 as indicated by arrow 1914.

While in the low rate transmit peer discovery state 1906, the communications device transmits discovery information signals conveying discovery information portions at a low rate. While in the low rate TX peer discovery state 1906, the communications device also, on an ongoing basis, performs monitoring to detect a transition trigger for a low to high transition as indicated by arrow 1916 and operation 1918. Some exemplary transition triggers are described with respect to block 1512 of flowchart 1500 of FIG. 15. If the monitoring of operation 1918 does not detect a trigger, then the communications device continues in low rate TX peer discovery state 1906 as indicated by arrow 1920. However, if the monitoring of operation 1918 does detect a trigger, then the communications device transitions to the high rate TX peer discovery state 1904 as indicated by arrow 1922.

Figure 20:
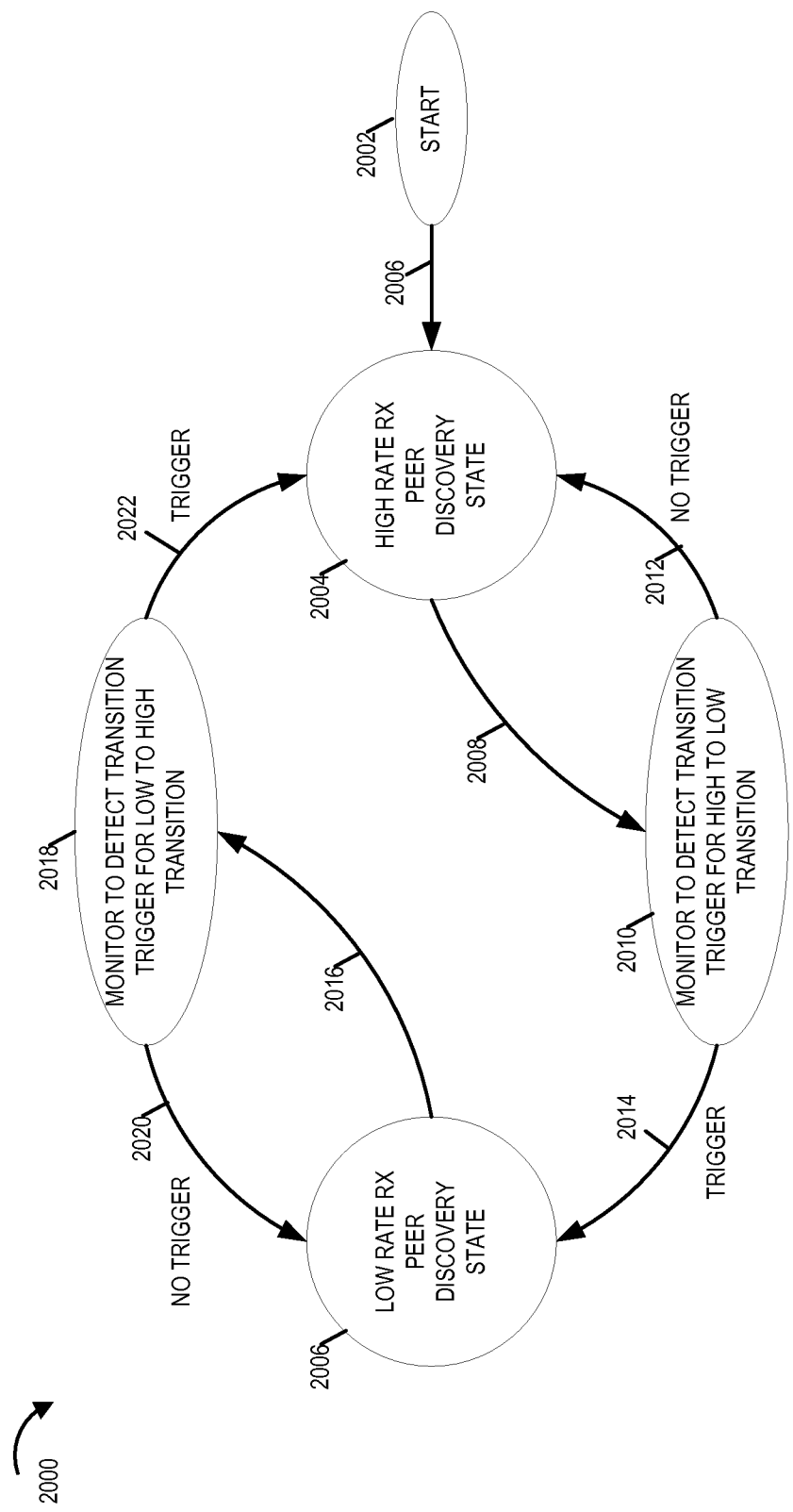
FIG. 20 is a drawing illustrating exemplary operations in a communications device supporting a high rate peer discovery receive mode and a low rate peer discovery receive mode in accordance with an exemplary embodiment.
Figure 21:
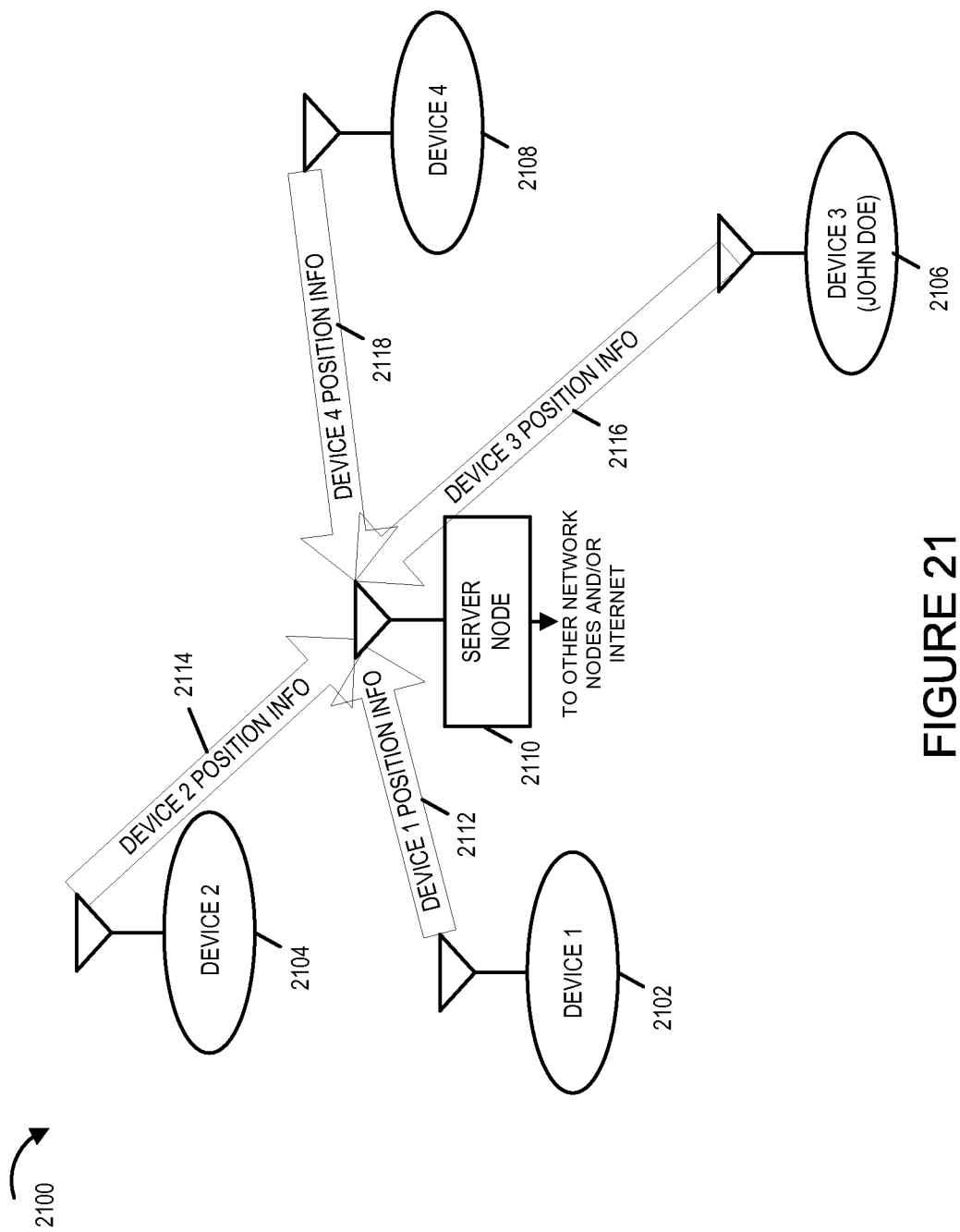
FIGS. 21-24 are used to describe features in one exemplary embodiment where a wireless communications device supporting multiple peer discovery modes determines mode transition decisions as a function of position information.

FIG. 20 is a drawing 2000 illustrating exemplary operations in a communications device supporting a high rate peer discovery receive mode and a low rate peer discovery receive mode in accordance with an exemplary embodiment. Drawing 2000 may correspond to flowchart 1700 of FIG. 17 and/or communications device 1800 of FIG. 18.

Operation of the communications device starts in start step 2002, where the communications device is powered on an initialized. In this embodiment, following power on, the communications device is set into the high rate receive peer discovery state 2004, as indicated by arrow 2006. While in the high rate receive peer discovery state 2004, the communications device monitors discovery information signals conveying discovery information portions at a high rate. While in the high rate RX peer discovery state 2004, the communications device also, on an ongoing basis, performs monitoring to detect a transition trigger for a high to low transition as indicated by arrow 2008 and operation 2010. Some exemplary transition triggers are described with respect to block 1716 of flowchart 1700 of FIG. 17. If the monitoring of operation 2010 does not detect a trigger, then the communications device continues in high rate RX peer discovery state 2004 as indicated by arrow 2012. However, if the monitoring of operation 2010 does detect a trigger, then the communications device transitions to the low rate RX peer discovery state 2006 as indicated by arrow 2014.

While in the low rate receive peer discovery state 2006, the communications device monitors discovery information signals conveying discovery information portions at a low rate. While in the low rate RX peer discovery state 2006, the communications device also, on an ongoing basis, performs monitoring to detect a transition trigger for a low to high transition as indicated by arrow 2016 and operation 2018. Some exemplary transition triggers are described with respect to block 1712 of flowchart 1700 of FIG. 17. If the monitoring of operation 2018 does not detect a trigger, then the communications device continues in low rate RX peer discovery state 2006 as indicated by arrow 2020. However, if the monitoring of operation 2018 does detect a trigger, then the communications device transitions to the high rate RX peer discovery state 2004 as indicated by arrow 2022.

In various embodiments, an exemplary communications device supports high and low rate TX peer discovery modes of operation and high and low rate RX peer discovery modes of operation. Thus a communications device may, and sometimes does, perform the methods of both flowchart 1500 of FIG. 15 and flowchart 1700 of FIG. 17 and/or include elements, e.g., a processor, modules and/or memory, etc., described with respect to communications device 1600 of FIG. 16 and communications device 1800 of FIG. 18. In some embodiments, the TX peer discovery modes and the RX peer discovery modes are independent, e.g., with different trigger criteria being implemented to determine transitions for TX modes and RX modes. In some such embodiments a communications device may be, at times, in a high rate transmit peer discovery mode while being in a low rate receive peer discovery mode, or the communications device may alternatively be in a low rate transmit peer discovery mode of operation while being in a high rate receive peer discovery mode of operation.

In some embodiments, TX peer discovery mode transitions are coupled with corresponding RX peer discovery mode transitions, e.g., with a communications device having a peer discovery mode which is applicable to both transmit operations and receive operations.

FIGS. 21-24 are used to describe features in one exemplary embodiment where a wireless communications device supporting multiple peer discovery modes determines mode transition decisions as a function of position information. Drawing 2100 includes exemplary communications devices (device 1 2102, device 2 2104, device 3 2106, and device 4 2108), and a server node 2110. The devices (2102, 2104, 2106, 2108) are, e.g., wireless communications devices, e.g., peer to peer mobile communications devices, implemented in accordance with FIG. 15, FIG. 16, FIG. 17 and/or FIG. 18. Device 3 2106 is currently associated with operator John Doe. Each of the communications devices (2102, 2104, 2106, 2108) determines its current position, e.g., from an output of an embedded GPS receiver, and communicates its position to the server as indicated by signals (2112, 2114, 2116, 2118), respectively. The server node 2110 receives the communicated device position information and stores it for future use.

Figure 22:
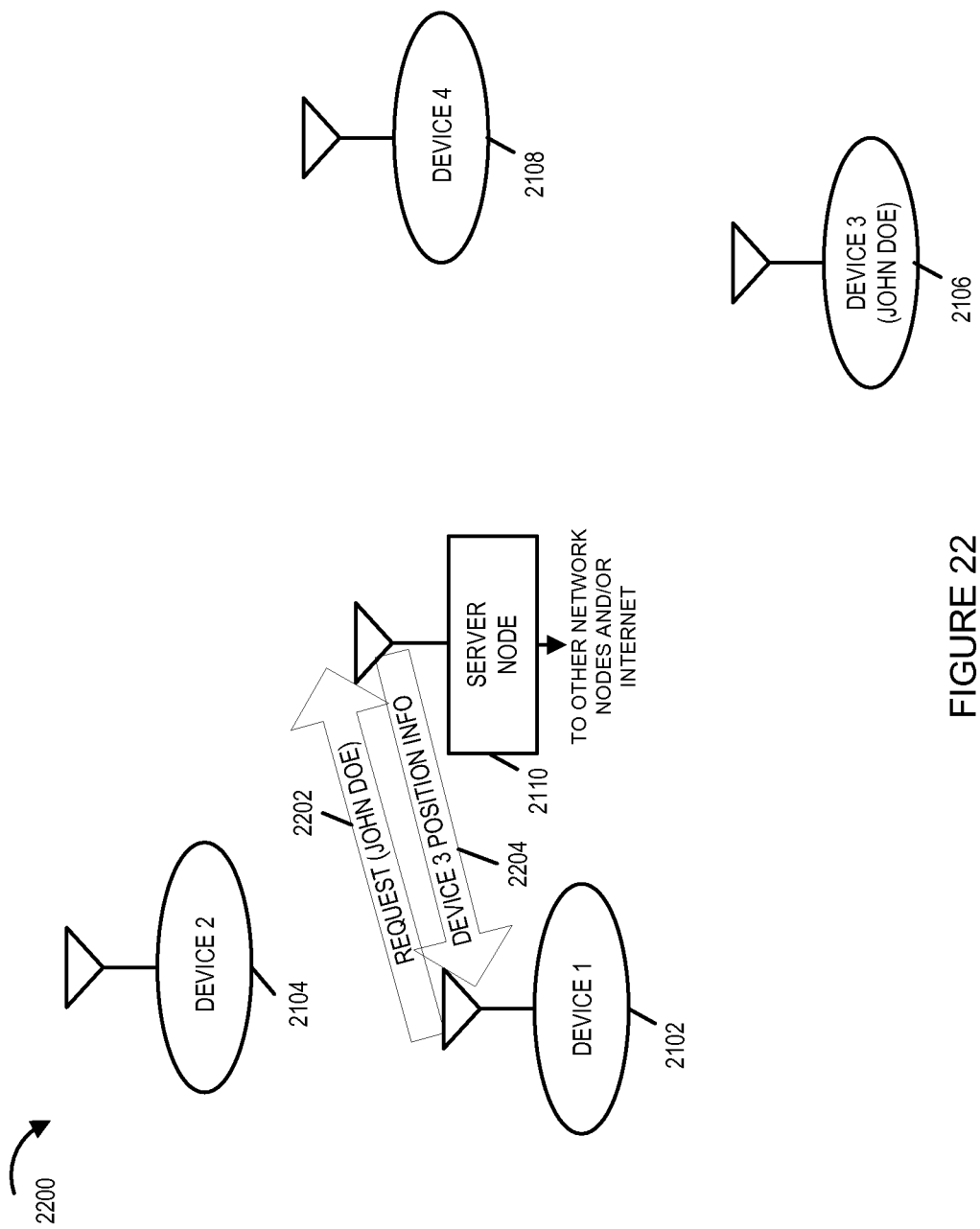

Drawing 2200 of FIG. 22 illustrates an exchange of signaling between device 1 2102 and the server node 2110. In some embodiments, the signaling exchange is a direct wireless communications exchange. In some embodiments, the signaling exchange between device 1 2102 and server node 2110 is via any number of intermediate nodes. In some embodiments, the server does not include a wireless interface. In some such embodiments, the server is coupled via a wired network node to a wide area network node which supports both wired and wireless communications, e.g., a base station. In such an embodiment, the base station can be an intermediate node between the wireless device, e.g., device 1 2102 and the server node. Device 1 2102, which happens to be in a low rate peer discovery mode, decides that it would like to communicate with a buddy, John Doe. Device 1 2102 generates and transmits an information request signal 2202 to server node 2110 including information identifying that it would like to know the position of the device being operated by John Doe. Server node 2110 retrieves the stored device 3 identification information, generates a signal 2204 and transmits signal 2204 conveying information identifying the location of device 3 which corresponds to John Doe.

Figure 23:
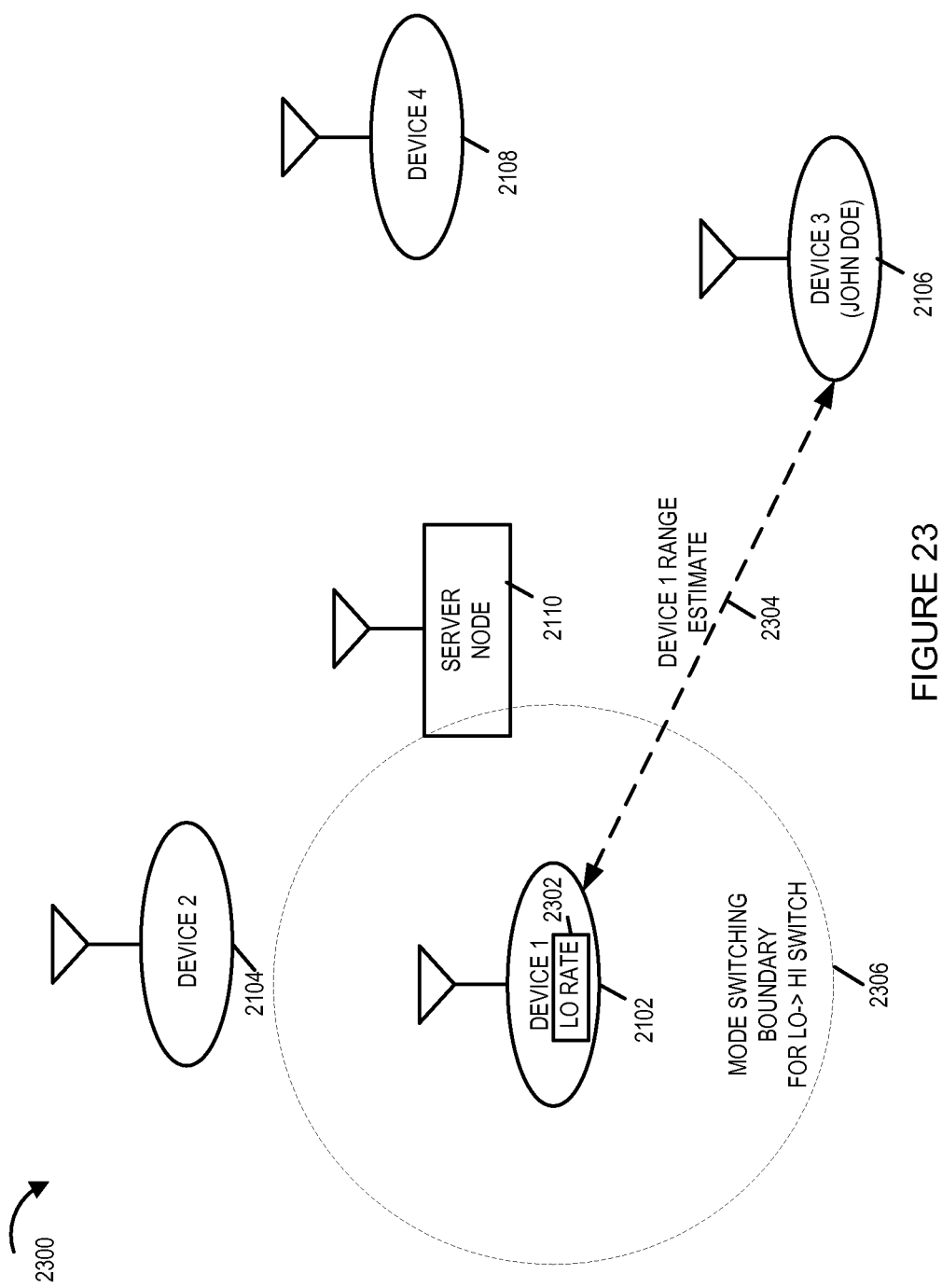

Drawing 2300 of FIG. 23 illustrates that device 1 2102 is in a low rate discovery mode as indicated by block 2302. Device 1 2102 performs a range estimate to device 3 2106 as indicated by arrow 2304. The range estimate is performed using its own determined current position and the position information downloaded from the server node 2110 in signal 2204. Device 1 2102 determines whether or not it should change to a high rate discovery mode based on a comparison between its range estimate 2304 and a low to high mode switching boundary criteria 2306. At this point in time the range 2304 exceeds the boundary 2306, so device 1 2102 remains in low rate peer discovery mode.

Figure 24:
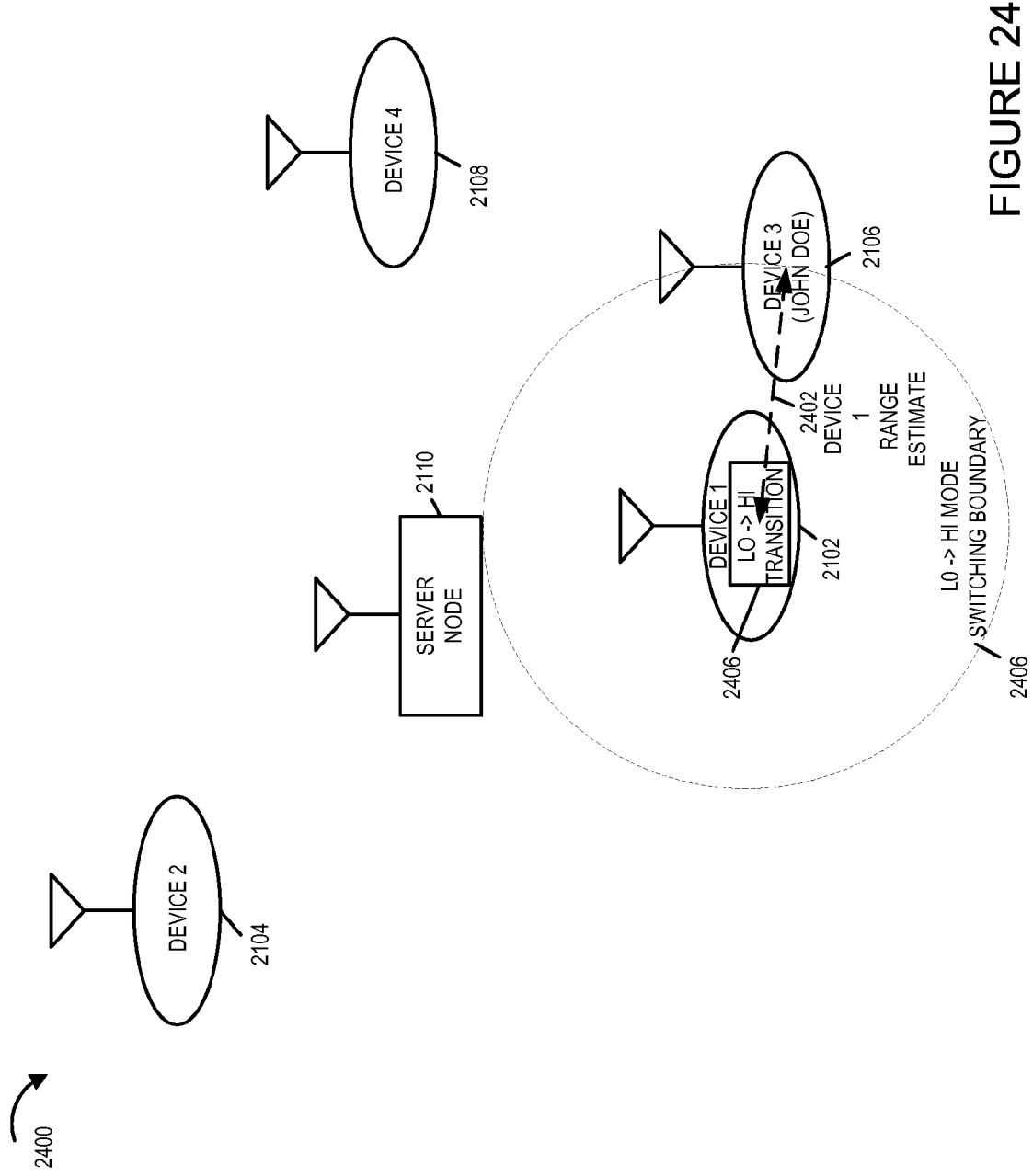

Drawing 2400 of FIG. 24 illustrates a later point in time, at which device 1 2102 is closer to device 3 2106. In this case device 1 range estimate 2402 is equal to or less than low to high mode switching boundary 2406, so device 1 2102 decides to switch from the low rate peer discovery mode to the high rate peer discovery mode as indicated by block 2406.

Typically a different change condition criteria is implemented for switching from a high rate peer discovery mode to a low rate peer discovery mode, e.g., to avoid toggling back and forth between modes when being at a boundary. In some embodiments, the wireless devices implement first and second transmit peer discovery modes in which the set of FIGS. 21-24 are applicable to operations with regard to transmit peer discovery. In some embodiments, the wireless devices implement first and second receive peer discovery modes in which the set of FIGS. 21-24 are applicable to operations with regard to receive peer discovery. In some embodiments wireless devices implement first and second peer discovery modes, wherein the first peer discovery mode applies to both transmit and receive operations and wherein the second peer discovery mode applies to both transmit and receive operations, and the set of FIGS. 21-24 are applicable to such operations.

In some embodiments, the first rate of transmitting and/or monitoring associated with a first peer discovery mode of operation and the second rate of transmitting and/or monitoring associated with the second peer discovery mode of operation are both non-zero rates. In other embodiments, the first rate is a zero rate while the second rate is a non-zero rate.

Figure 26:
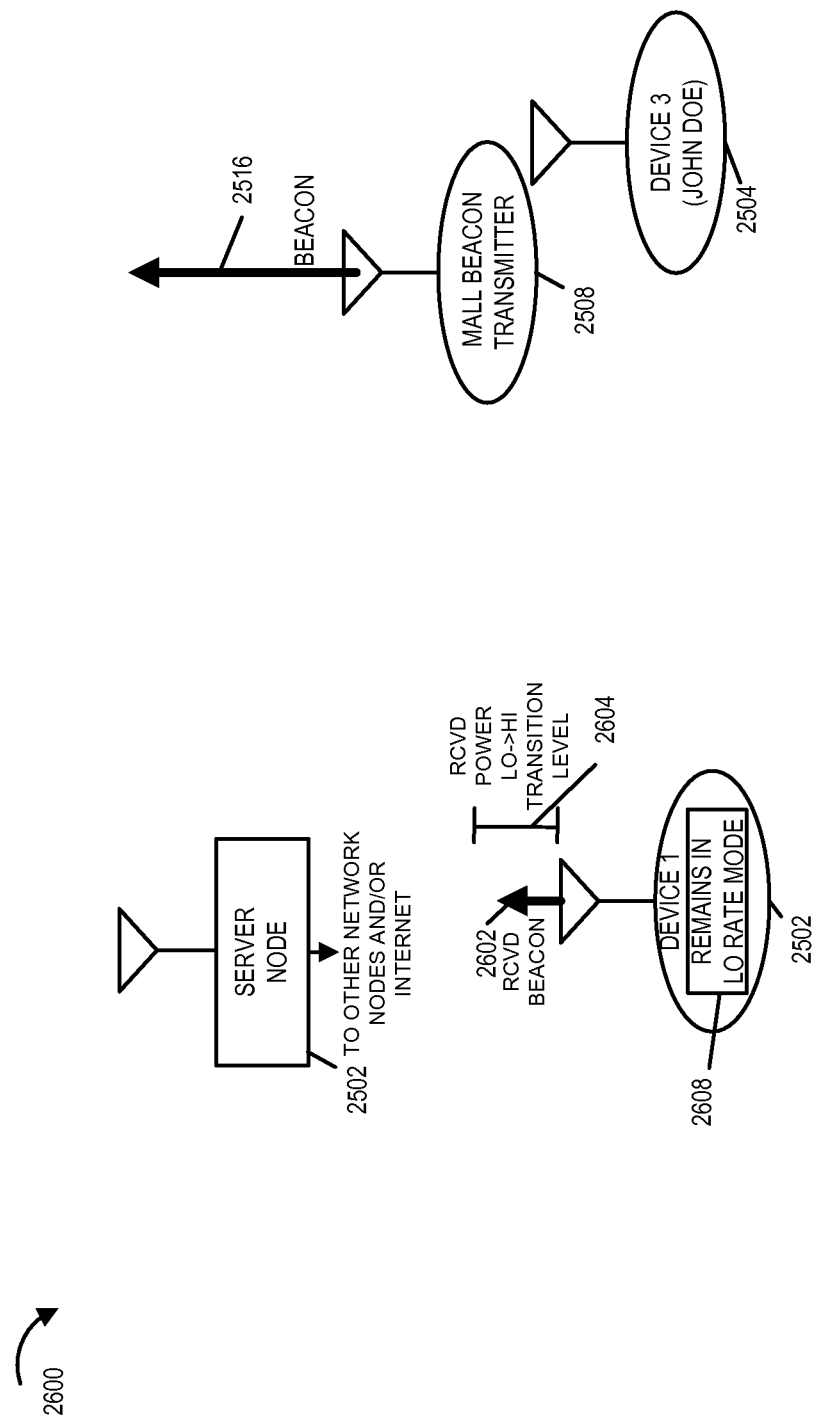
Figure 27:
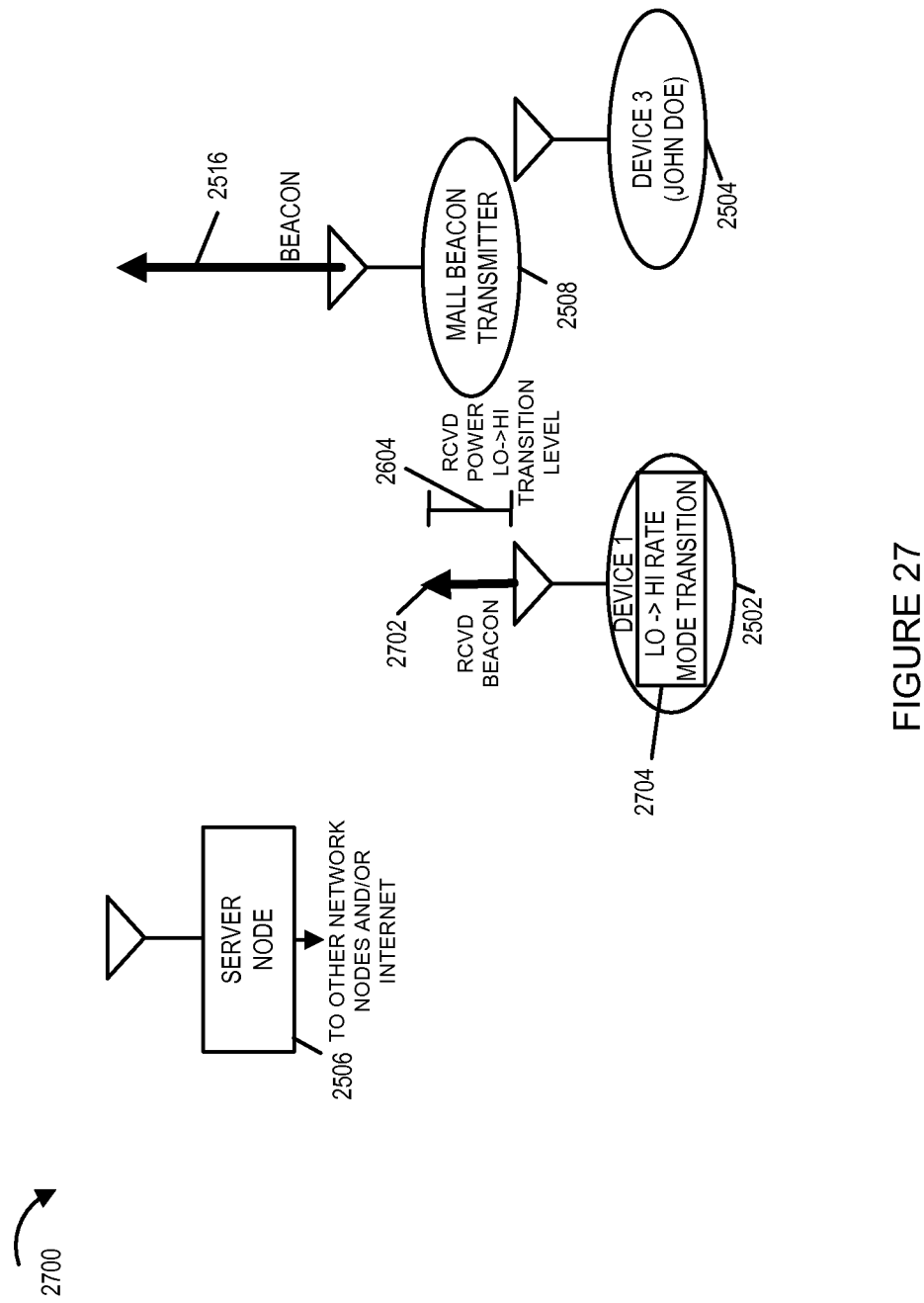

FIGS. 25-27 are used to describe features in one exemplary embodiment where a wireless communications device supporting multiple peer discovery modes determines mode transition decisions as a function of proximity based on received signal strength measurements. Drawing 2500 of FIG. 25 includes a plurality of wireless communications devices (device 1 2502, device 3 2504), a server node 2506, and location of interest signal transmitter, e.g., a shopping mall beacon transmitter 2508. The devices (2502, 2504) are, e.g., wireless communications devices, e.g., peer to peer mobile communications devices, implemented in accordance with FIG. 15, FIG. 16, FIG. 17 and/or FIG. 18. Mall beacon transmitter 2508 transmits beacon signal 2516, e.g., an OFDM beacon signal. In the example, of FIGS. 25-28 the transmitter at the location of interest transmits a beacon signal. However, it is to be understood that more generally the transmitter at the location of interest transmits a proximity detection signal, e.g., a beacon signal such as an OFDM beacon signal, a CDMA related acquisition signal, or some other broadcast information, e.g., including cell ID. In some embodiments, the proximity dection signal is a peer discovery signal form an access point.

In some embodiments, the proximity detection signal is transmitted at a known power level. In some embodiments, the proximity detection signal transmission power level can be adjusted, e.g., dynamically. In some embodiments, different transmitters of proximity detection signals are set to different transmit power levels. For instance the transmit power level from a transmitter at a mall may be different from the transmit power level at an airport, e.g., with a particular site setting being adjusted to accommodate the characteristics of the location and/or intended detection area.

In this example, assume that the operator of device 1 2502 has planned to meet a buddy or buddies at the mall. John Doe, who is using device 3 2504 is already at the predetermined meet site. Device 1 2502, which is currently operating in a low rate peer discovery mode as indicated by block 2510 sends an information request signal 2512 to server node 2506 requesting information about a site of interest which happens to be the mall. The server node 2506 responds by sending signal 2514 which communicates information used to identify the mall beacon signal, e.g., information used to identify the tone or tones representing the mall beacon signal. Other alternatives are possible and implemented in some embodiments. For example, the information used to identify a particular proximity detection signal from a site of interest can be pre-provisioned, configured and/or obtained or derived from input information.

At this point in time device 1 2502 is sufficiently far enough away from the mall beacon transmitter 2508 that it is not able to detect the mall beacon signal 2516 and so it remains in low rate peer discovery mode.

Drawing 2600 of FIG. 26 illustrates that device 1 2502 has detected transmitted mall beacon signal 2516 as indicated by received beacon 2602; however, the received power level is below threshold level 2604 corresponding to the a low to high transition, so device 1 remains in the lo rate peer discovery mode as indicated by block 2608.

Drawing 2700 of FIG. 27 illustrates that device 1 2502 has detected transmitted mall beacon signal 2516 as indicated by received beacon 2702; and the received power level is above threshold level 2604, so device 1 2502 decides to transition from the low rate peer discovery mode to the high rate peer discovery mode as indicated by block 2704. Now device 1 2502 can more quickly discover device 3 2504, which is also in the vicinity of the designated site of interest, and/or attempt to establish a peer to peer connection as planned.

Typically a different change condition criteria is implemented for switching from a high rate peer discovery mode to a low rate peer discovery mode, e.g., to avoid toggling back and forth between modes when being at a boundary. In some embodiments, the wireless devices implement first and second transmit peer discovery mode in which the set of FIGS. 25-27 are applicable to operations with regard to transmit peer discovery. In some embodiments, the wireless devices implement first and second receive peer discovery modes in which the set of FIGS. 25-27 are applicable to operations with regard to receive peer discovery. In some embodiments wireless devices implement first and second peer discovery mode, wherein the first peer discovery mode applies to both transmit and receive operations and wherein the second peer discovery mode applies to both transmit and receive operations, and the set of FIGS. 25-27 are applicable to such operations.

In some embodiments, the first rate of transmitting and/or monitoring associated with a first peer discovery mode of operation and the second rate of transmitting and/or monitoring associated with the second peer discovery mode of operation are both non-zero rates. In other embodiments, the first rate is a zero rate while the second rate is a non-zero rate.

Figure 28:
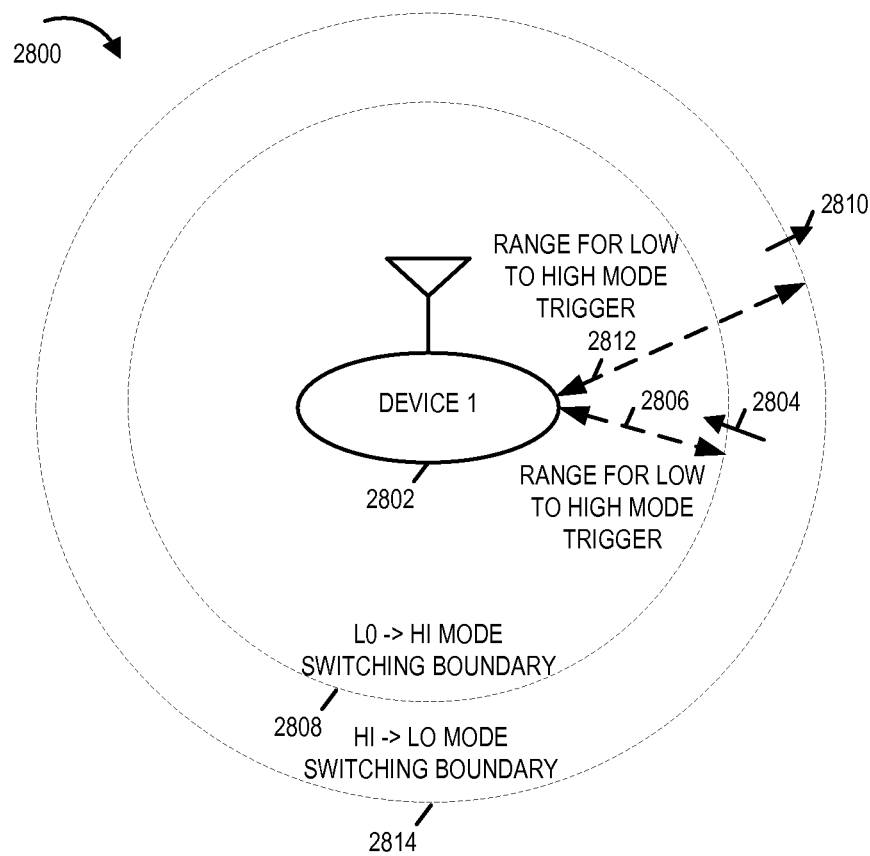
FIG. 28 illustrate a feature of in which a wireless communications device performs peer discovery mode switching as a function of range information and uses a different switching criteria to trigger a first mode to second mode transition than to trigger a second mode to first mode transition.

Drawing 2800 of FIG. 28 illustrates a feature of some embodiments in which a wireless communications device supports multiple modes of peer discovery, performs peer discovery mode switching as a function of range information, and uses a different switching criteria to trigger a first mode to second mode transition than to trigger a second mode to first mode transition. This implementation of different switching criteria incorporates hysteresis and mitigates problems of toggling back and forth between modes when operating at a boundary condition.

Consider that device 1 2802 is, e.g., one of the wireless devices described with respect to FIG. 15, FIG. 16, and/or FIGS. 21-24. Now consider that device 1 2802 supports: (i) a first peer discovery mode in which the device transmits peer discovery information at a low rate and/or monitors for peer discovery information at a low rate and (ii) a second peer discovery mode in which the device transmits peer discovery information at a high rate and/or monitors for peer discovery information at a high rate.

Consider that device 1 2802 is in a low rate peer discovery mode of operation, but is closing in on a point of interest, as indicated by arrow 2804. As the range between device 1 2802 and the point of interest decreases, the range 2806 is obtained where the range crosses over the low to high rate mode switching boundary 2814. At this point, device 1 2802 switches into a high rate peer discovery mode. Device 1 2802 remains in the high rate peer discovery mode until the range between device 1 2802 and the point of interest increases, as indicated by arrow 2810, to the range for the low rate to high rate mode switching value 2812 and crosses over the high to low rate mode switching boundary 2814. At this point device 1 2802 switches from the high rate peer discovery mode to the low rate peer discovery mode.

Figure 29:
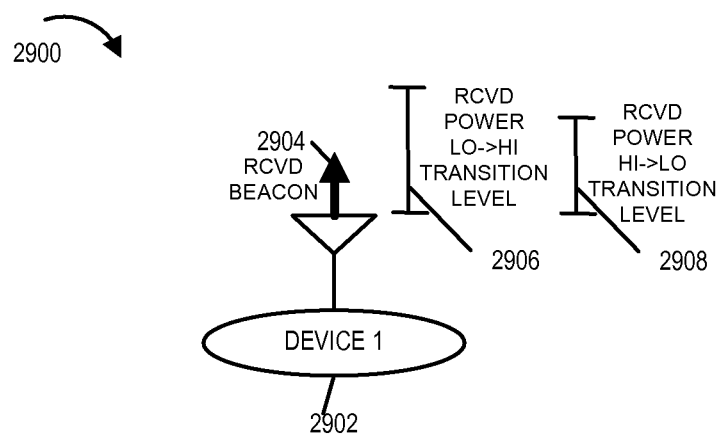
FIG. 29 illustrate a feature in which a wireless communications device performs peer discovery mode switching as a function of received signal strength and uses a different switching criteria to trigger a first mode to second mode transition than to trigger a second mode to first mode transition.

Drawing 2900 of FIG. 29 illustrate a feature of some embodiments in which a wireless communications device supports multiple modes of peer discovery, performs peer discovery mode switching as a function of received signal strength, and uses a different switching criteria to trigger a first mode to second mode transition than to trigger a second mode to first mode transition. This implementation of different switching criteria incorporates hysteresis and mitigates problems of toggling back and forth between modes when operating at a boundary condition.

Consider that device 1 2902 is, e.g., one of the wireless devices described with respect to FIG. 17, FIG. 18, and/or FIGS. 25-27. Now consider that device 1 2902 supports: (i) a first peer discovery mode in which the device transmits peer discovery information at a low rate and/or monitors for peer discovery information at a low rate and (ii) a second peer discovery mode in which the device transmits peer discovery information at a high rate and/or monitors for peer discovery information at a high rate.

Consider that device 1 2902 is in a low rate peer discovery mode of operation, but is closing in on a point of interest. Assume that as the range between device 1 2902 and the point of interest decreases, the received beacon signal 2904 strength increases. At some point the received beacon strength exceeds the received power low to high rate mode trigger transition level 2906, and device 1 2902 switches into a high rate peer discovery mode. Now device 1 2902 remains in the high rate peer discovery mode until the received beacon signal 2904 strength falls below the received power high rate mode to low rate mode transition level threshold 2908. When the received beacon signal power falls below threshold 2908, then device 1 2902 transitions from the high rate peer discovery mode to the low rate peer discovery mode.

Various embodiments are related to methods and apparatus for use in a mobile wireless system that enables direct wireless communications between subscriber devices, e.g., an ad hoc peer-to-peer network. In some embodiments, a process referred to as peer discovery enables autonomous detection of peers, networks and/or services of interest to a particular subscriber device. In some instance implemented peer discovery methods and apparatus support multiple rates of sending and/or monitoring peer discovery information. Thus at a given location and time, some subscriber devices may be performing peer discovery at one rate, e.g., a low rate, while other devices may be performing peer discovery at another rate, e.g., a high rate. In general, performing peer discovery operations at a higher rate has the benefit of reducing latency at the cost of utilizing more communications resources and expending more power, e.g., reducing battery lifetime. In accordance with a feature of some embodiments, a subscriber device, participating in peer discovery dynamically adapts its rate of sending and/or monitoring peer discovery information as a function of proximity to particular entities or points of interest, e.g., relative position with respect to the positions of a set of buddies.

In one instance a subscriber device determines its geographic position, e.g., via GPS, and periodically uploads its position information to a server. A subscriber device also periodically downloads the position information of one or more other entities, e.g., buddies and/or points of interest. Subsequent to downloading the position information of other entities and/or points of interest, some of which may be periodically uploaded, a subscriber device compares its own position, e.g., determined via GPS, with the downloaded position information. Then the device determines the rate at which to send and/or monitor peer discovery information based on its proximity or relative position to other entities and/or points of interest. Thus a subscriber device can conserve peer discovery communication resources and/or power when there are no entities or points of interest within discovery range. In some instances, proximity is determined by means other than comparing geographic positions, e.g., receiving a predetermined signal with signal strength above a predetermined threshold. Note that in some instances, scenarios, and/or configurations it can be determined that the rate of sending and/or monitoring peer discovery information should be zero, e.g., peer discovery operations should be suspended. In some instances, it is also possible to control different portions of peer discovery information independently, e.g., sending one identity but suspending sending of a second identity or sending different identities at different rates.

In some embodiments, it is possible to independently control the rate of sending peer discovery information and the rate of monitoring peer discovery information. However, in some embodiments, it may be beneficial to couple the rate of sending and monitoring, and the rate of sending and monitoring are controllably coupled.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, determining as a function of proximity to a location of interest if a change condition used to trigger a change from a first transmit peer discovery mode to a second transmit peer discovery mode has occurred, transitioning from the first transmit peer discovery mode to the second transmit peer discovery mode, communicating location information to a server, communicating information corresponding to a location of interest to a server, downloading a location of information list from a server, measuring power of a received signal, estimating proximity to a location of interest, etc. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a communications device which supports multiple peer discovery modes the method comprising: transmitting, while operating in a first transmit peer discovery mode, peer discovery signals at a first rate;
determining, while operating in said first transmit peer discovery mode, as a function of proximity to a location of interest if a change condition used to trigger a change from the first transmit peer discovery mode to a second transmit peer discovery mode occurred, said second transmit peer discovery mode being a peer discovery mode during which peer discovery signals are transmitted at a second rate which is higher than the first rate; upon detecting that said change condition used to trigger a change from the first transmit peer discovery mode to the second transmit peer discovery mode has occurred, transitioning from the first transmit peer discovery mode to the second transmit peer discovery mode.

2. The method of claim 1, further comprising: downloading a list of locations of interest from a server, said location of interest being a location in said list of downloaded locations of interest.

3. The method of claim 2, further comprising: communicating to said server the location of said communications device.

4. The method of claim 2, further comprising: communicating to said server information used to identify locations of interest.

5. The method of claim 1, wherein determining as a function of proximity to a location of interest if a change condition used to trigger a change from the first transmit peer discovery mode to the second transmit peer discovery mode occurred, includes comparing a current location of said communications device to said location of interest to determine if said location of interest is within a predetermined range of said current location.

6. The method of claim 1, wherein determining as a function of proximity to a location of interest if a change condition used to trigger a change from the first transmit peer discovery mode to the second transmit peer discovery mode occurred, includes determining proximity to said location of interest from a received signal.

7. The method of claim 6, further comprising: switching from the second transmit peer discovery mode to the first transmit peer discovery mode occurs when said received signal which caused said transition into the second transmit peer discovery mode is no longer detected or is below a predetermined threshold.

8. The method of claim 1, further comprising: communicating to a server the location of said communications device; and receiving from the server information indicating a preferred mode of operation for the communications device.

9. A communications device which supports multiple peer discovery modes the communications device comprising: a first proximity condition detection module configured to determine, while said device is in a first transmit peer discovery mode of operation, if a proximity based change condition used to trigger a change from the first transmit peer discovery mode to a second transmit peer discovery mode occurred, said second transmit peer discovery mode being a peer discovery mode during which peer discovery signals are transmitted at a second rate which is higher than the first rate: and a first mode transition control module for controlling said communications device to transition from the first transmit peer discovery mode to the second transmit peer discovery mode when said first proximity condition detection module detects that said proximity based change condition has occurred, transitioning from the first transmit peer discovery mode to the second transmit peer discovery mode.

10. The communications device of claim 9, further comprising: a downloading module configured to download a list of locations of interest from a server, said location of interest being a location in said list of downloaded locations of interest.

11. The communications device of claim 10, further comprising: a location reporting module configured to communicate to said server the location of said communications device.

12. The communications device of claim 9, wherein the first proximity condition detection module includes: a location comparison module configured to compare a current location of said communications device to said location of interest to determine if said location of interest is within a predetermined range of said current location.

13. The communications device of claim 9, further comprising: a received signal power measurement module for measuring the power of the received signal, said received signal being transmitted from a position having a known position relationship to the location of interest; and wherein said proximity detection module is configured to estimate the distance from said location of interest from the power of the received signal.

14. A communications device which supports multiple peer discovery modes the communications device comprising: first proximity condition detection means for determining, while said device is in a first transmit peer discovery mode of operation, if a proximity based change condition used to trigger a change from the first transmit peer discovery mode to a second transmit peer discovery mode occurred, while said second transmit peer discovery mode being a peer discovery mode during which peer discovery signals are transmitted at a second rate which is higher than the first rate: and first mode transition control means for controlling said communications device to transition from the first transmit peer discovery mode to the second transmit peer discovery mode when said first proximity condition detection means detects that said proximity based change condition has occurred, transitioning from the first transmit peer discovery mode to the second transmit peer discovery mode.

15. The communications device of claim 14, wherein said proximity refers to the proximity of a location of interest with respect to a location of said communications device and wherein said location of interest corresponds to a location of another communications device.

16. The communications device of claim 14, further comprising: downloading means for download a list of locations of interest from a server, said location of interest being a location in said list of downloaded locations of interest.

17. The communications device of claim 16, wherein said list of locations of interest includes locations of buddies.

18. The communications device of claim 16, further comprising: location reporting means for communicating to said server the location of said communications device.

19. A computer program product for use in a communications device which supports multiple peer discovery modes the computer program product comprising: non-transitory computer-readable medium comprising: code for causing a computer to transmit, while operating in a first transmit peer discovery mode, peer discovery signals at a first rate; code for causing said computer to determine while operating in said first transmit peer discovery mode, as a function of proximity to a location of interest if a change condition used to trigger a change from the first transmit peer discovery mode to a second transmit peer discovery mode occurred, said second transmit peer discovery mode being a peer discovery mode during which peer discovery signals are transmitted at a second rate which is higher than the first rate; upon detecting that said change condition used to trigger a change from the first transmit peer discovery mode to the second transmit peer discovery mode has occurred, transitioning from the first transmit peer discovery mode to the second transmit peer discovery mode.

20. A method of operating a communications device which supports multiple peer discovery modes the method comprising: monitoring at a first rate, while operating in a first receive peer discovery mode, for peer discovery signals; and determining, while operating in said first receive peer discovery mode, as a function of proximity to a location of interest if a change condition used to trigger a change from the first receive peer discovery mode to a second receive peer discovery mode occurred, said second receive peer discovery mode being a peer discovery mode during which peer discovery signals are monitored at a second rate which is higher than the first rate; upon detecting that said change condition used to trigger a change from the first transmit peer discovery mode to the second transmit peer discovery mode has occurred, transitioning from the first transmit peer discovery mode to the second transmit peer discovery mode.

21. The method of claim 20, further comprising: upon detecting that said change condition used to trigger a change from the first receive peer discovery mode to the second receive peer discovery mode has occurred, transitioning from the first receive peer discovery mode to the second receive peer discovery mode.

22. The method of claim 21, further comprising: downloading a list of locations of interest from a server, said location of interest being a location in said list of downloaded locations of interest.

23. The method of claim 22, further comprising: communicating to said server the location of said communications device.

24. The method of claim 22, further comprising: communicating to said server information used to identify locations of interest.

25. The method of claim 21, further comprising: communicating to a server the location of said communications device; and receiving from the server information indicating a preferred mode of operation for the communications device.

26. The method of claim 20, wherein determining as a function of proximity to a location of interest if a change condition used to trigger a change from the first receive peer discovery mode to the second receive peer discovery mode occurred, includes comparing a current location of said communications device to said location of interest to determine if said location of interest is within a predetermined range of said current location.

27. The method of claim 20, wherein determining as a function of proximity to a location of interest if a change condition used to trigger a change from the first receive peer discovery mode to the second receive peer discovery mode occurred, includes determining proximity to said location of interest from a received signal.

28. The method of claim 27, further comprising: switching from the second receive peer discovery mode to the first receive peer discovery mode occurs when said received signal which caused said transition into the second receive peer discovery mode is no longer detected or is below a predetermined threshold.

29. A communications device which supports multiple peer discovery modes the communications device comprising: a first proximity condition detection module configured to determine, while said device is in a first receive peer discovery mode of operation, if a proximity based change condition used to trigger a change from the first receive peer discovery mode to a second receive peer discovery mode occurred, said second receive peer discovery mode being a peer discovery mode during which peer discovery signals are monitored at a second rate which is higher than the first rate while and a first mode transition control module for controlling said communications device to transition from the first receive peer discovery mode to the second receive peer discovery mode when said first proximity condition detection module detects that said proximity based change condition has occurred, transitioning from the first transmit peer discovery mode to the second transmit peer discovery mode.

30. The communications device of claim 29, further comprising: a downloading module configured to download a list of locations of interest from a server, said location of interest being a location in said list of downloaded locations of interest.

31. The communications device of claim 30, further comprising: a location reporting module configured to communicate to said server the location of said communications device.

32. The communications device of claim 29, wherein the first proximity condition detection module includes: a location comparison module configured to compare a current location of said communications device to said location of interest to determine if said location of interest is within a predetermined range of said current location.

33. The communications device of claim 29, further comprising: a received signal power measurement module for measuring the power of a received signal, said received signal being transmitted from a position having a known position relationship to the location of interest; and wherein said proximity detection module is configured to estimate the distance from said location of interest from the power of the received signal.

34. A communications device which supports multiple peer discovery modes the communications device comprising: first proximity condition detection means for determining, while said device is in a first receive peer discovery mode of operation, if a proximity based change condition used to trigger a change from the first receive peer discovery mode to the second receive peer discovery mode occurred, said second receive peer discovery mode being a peer discovery mode during which peer discovery signals are monitored at a second rate which is higher than the first rate while and first mode transition control means for controlling said communications device to transition from the first receive peer discovery mode to the second receive peer discovery mode when said first proximity condition detection means detects that said proximity based change condition has occurred, transitioning from the first transmit peer discovery mode to the second transmit peer discovery mode.

35. The communications device of claim 34, wherein said proximity refers to the proximity of a location of interest with respect to a location of said communications device and wherein said location of interest corresponds to a location of another communications device.

36. The communications device of claim 34, further comprising: downloading means for downloading a list of locations of interest from a server, said location of interest being a location in said list of downloaded locations of interest.

37. The communications device of claim 36, wherein said list of locations of interest includes locations of buddies.

38. The communications device of claim 36, further comprising: location reporting means for communicating to said server the location of said communications device.

39. A computer program product for use in a communications device which supports multiple peer discovery modes the computer program product comprising: non-transitory computer-readable medium comprising: code for causing a computer to monitor at a first rate, while operating in a first receive peer discover mode, for peer discovery signals; and code for causing a computer to determine, while said communications device is operating in the first receive peer discovery mode, as a function of proximity to a location of interest if a change condition used to trigger a change from the first receive peer discovery mode to a second receive peer discovery mode occurred, said second receive peer discovery mode being a peer discovery mode during which peer discovery signals are monitored at a second rate which is higher than the first rate; upon detecting that said change condition used to trigger a change from the first transmit peer discovery mode to the second transmit peer discovery mode has occurred, transitioning from the first transmit peer discovery mode to the second transmit peer discovery mode.

* * * * *